US007729806B2

(12) United States Patent
Ohira

(10) Patent No.: US 7,729,806 B2

(45) Date of Patent: Jun. 1, 2010

(54) ELEVATOR CONTROLLER

(75) Inventor: Katsumi Ohira, Nagoya (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 434 days.

(21) Appl. No.: 10/581,198

(22) PCT Filed: May 25, 2004

(86) PCT No.: PCT/JP2004/007447

§ 371 (c)(1),
(2), (4) Date: Jun. 1, 2006

(87) PCT Pub. No.: WO2005/115898

PCT Pub. Date: Dec. 8, 2005

(65) Prior Publication Data

US 2007/0125604 A1 Jun. 7, 2007

(51) Int. Cl.

| | |
|---|---|
| ***G05D 23/00*** | (2006.01) |
| ***B66B 1/28*** | (2006.01) |
| ***G05B 15/00*** | (2006.01) |
| ***B66B 1/34*** | (2006.01) |

(52) U.S. Cl. ....................... 700/275; 187/247; 187/391; 187/393

(58) Field of Classification Search ................. 187/247, 187/391, 393; 700/275
See application file for complete search history.

(56) References Cited

U.S. PATENT DOCUMENTS

| | | | | |
|---|---|---|---|---|
| 3,961,688 | A * | 6/1976 | Maynard | 187/289 |
| 4,326,606 | A * | 4/1982 | Kuzunuki et al. | 187/248 |
| 4,345,670 | A | 8/1982 | Kaneko et al. | |
| 4,367,811 | A * | 1/1983 | Yoneda et al. | 187/389 |
| 4,378,059 | A * | 3/1983 | Hatakeyama et al. | 187/293 |
| 4,401,192 | A * | 8/1983 | Trosky et al. | 187/391 |
| 4,512,442 | A * | 4/1985 | Moore et al. | 187/393 |
| 4,555,689 | A * | 11/1985 | Brick et al. | 187/393 |
| 4,567,560 | A | 1/1986 | Polis et al. | |
| 4,568,909 | A * | 2/1986 | Whynacht | 187/393 |
| 4,698,780 | A * | 10/1987 | Mandel et al. | 187/393 |
| 4,750,591 | A * | 6/1988 | Coste et al. | 187/391 |

(Continued)

FOREIGN PATENT DOCUMENTS

JP 56-75355 6/1981

(Continued)

OTHER PUBLICATIONS

Wikipedia definition for "RAM"; 5 pages.*

(Continued)

*Primary Examiner*—Ronald D Hartman, Jr.
(74) *Attorney, Agent, or Firm*—Oblon, Spivak, McClelland, Maier & Neustadt, L.L.P.

(57) ABSTRACT

In an elevator control apparatus, a control apparatus main body includes a program storage portion for storing a program concerning operational control of an elevator and a processing portion for performing a plurality of calculation processings based on the program. Further, the control apparatus main body writes pieces of processed information corresponding to the calculation processings, respectively, into the RAM when the calculation processings are performed, and monitors whether or not a sequence of performance of the calculation processings is normal by reference to a pattern of the pieces of the processed information written into the RAM.

12 Claims, 37 Drawing Sheets

U.S. PATENT DOCUMENTS

| | | | | |
|---|---|---|---|---|
| 4,775,957 | A | 10/1988 | Yakuwa et al. | |
| 4,930,604 | A * | 6/1990 | Schienda et al. | 187/393 |
| 5,431,252 | A * | 7/1995 | Morrison | 187/394 |
| 5,760,350 | A * | 6/1998 | Pepin et al. | 187/316 |
| 5,787,020 | A * | 7/1998 | Molliere et al. | 702/183 |
| 5,817,993 | A * | 10/1998 | Kamani et al. | 187/316 |
| 6,304,257 | B1 * | 10/2001 | Viskari | 715/764 |
| 6,330,936 | B1 * | 12/2001 | Lence Barreiro et al. | 187/393 |
| 6,854,565 | B2 * | 2/2005 | Perala et al. | 187/393 |
| 2003/0000777 | A1 * | 1/2003 | Lence Barreiro et al. | 187/391 |
| 2006/0175153 | A1 * | 8/2006 | Hubbard et al. | 188/1.11 E |
| 2007/0012523 | A1 * | 1/2007 | Chiba | 187/393 |

FOREIGN PATENT DOCUMENTS

| | | |
|---|---|---|
| JP | 58-6885 | 1/1983 |
| JP | 4-313581 | 11/1992 |
| JP | 6-324914 | 11/1994 |
| JP | 09110320 A * | 4/1997 |
| JP | 11-60102 | 3/1999 |
| JP | 11-102294 | 4/1999 |
| JP | 2000-076081 | 3/2000 |
| JP | 2000-163343 | 6/2000 |

OTHER PUBLICATIONS

Wikipedia definition for “Elevator”; 23 pages.*

Translation of JP 09110320 A; 2 pages; printed from Internet on Mar. 22, 2009.*

* cited by examiner

FIG. 34

| TBL | | |
|---|---|---|
| | [0] | 1 |
| | [1] | 2 |
| | [2] | 3 |
| | [3] | 4 |
| | [4] | 5 |
| | [5] | 6 |
| | [6] | 7 |
| | [7] | 0 |
| | [8] | 0 |
| | [9] | 0 |

FIG. 35

| TBL | | |
|---|---|---|
| | [0] | 0 |
| | [1] | 0 |
| | [2] | 0 |
| | [3] | 0 |
| | [4] | 0 |
| | [5] | 0 |
| | [6] | 0 |
| | [7] | 0 |
| | [8] | 0 |
| | [9] | 0 |

ELEVATOR CONTROLLER

TECHNICAL FIELD

The present invention relates to an elevator control apparatus that performs calculations for controlling an operation of an elevator by using a computer.

BACKGROUND ART

In a conventional terminal slowdown apparatus for an elevator as disclosed in, for example, JP 58-6885 A, when a terminal detector operates, a terminal slowdown command signal is generated in accordance with a distance from a position of the elevator corresponding to the operation of the terminal detector to the terminal floor. Such the terminal slowdown command signal is generated through a calculation carried out by a digital computer.

However, in an attempt to perform various calculation processings for controlling the operation of the elevator by using the computer, the calculation processings may be performed out of sequence for reasons of a program abnormality, a problem concerning hardware capacity, and the like. In this case, the elevator continues to be operated as it is until a secondary abnormality is detected. In particular, a self-looping abnormality ascribable to the program abnormality cannot be detected with ease.

DISCLOSURE OF THE INVENTION

The present invention has been made to solve the problems as discussed above. Therefore, it is an object of the invention to obtain an elevator control apparatus capable of swiftly detecting an abnormality in a sequence of the performance of calculation processings and thereby carrying out calculations pertinent to the control for the operation of an elevator more reliably by using a computer while enhancing overall reliability.

To this end, according to one aspect of the present invention, there is provided an elevator control apparatus comprising: a RAM; and a control apparatus main body having a program storage portion for storing a program concerning operational control of an elevator and a processing portion for performing a plurality of calculation processings based on the program, wherein the control apparatus main body writes pieces of processed information corresponding to the calculation processings, respectively, into the RAM when the calculation processings are performed, and monitors whether or not a sequence of performance of the calculation processings is normal with reference to a pattern of the pieces of the processed information written into the RAM.

BRIEF DESCRIPTION OF THE DRAWINGS

FIG. 34 is an explanatory diagram showing a normal pattern of processed information that has been written into a RAM of FIG. 31.

FIG. 35 is an explanatory diagram showing a state in which TBL's [0] to [9] of FIG. 34 have been initialized.

BEST MODE FOR CARRYING OUT THE INVENTION

Hereinbelow, preferred embodiments of the present invention are described with reference to the drawings.

Embodiment 1

Figure 1:
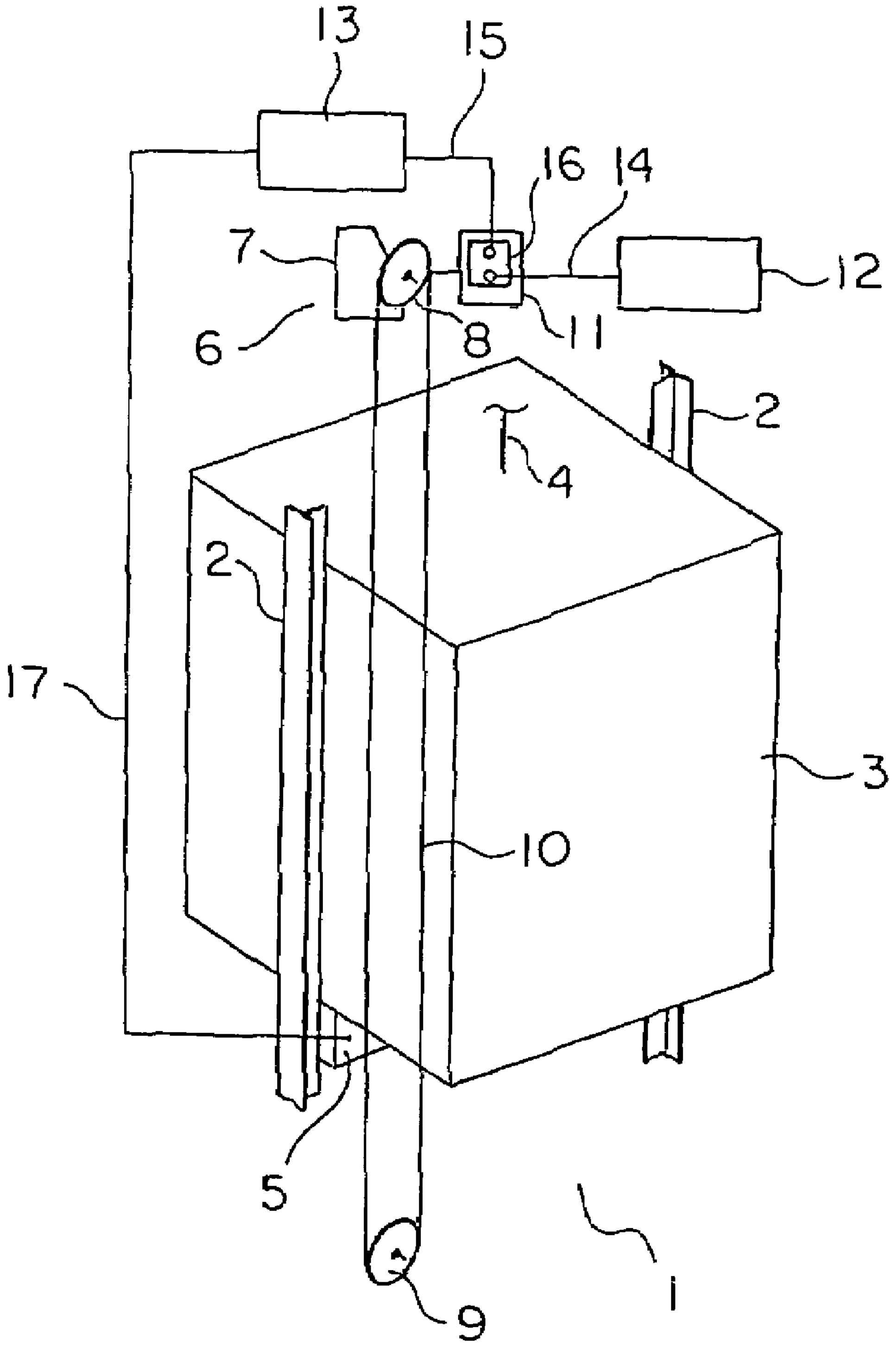
FIG. 1 is a schematic diagram showing an elevator apparatus according to Embodiment 1 of the present invention.

FIG. 1 is a schematic diagram showing an elevator apparatus according to Embodiment 1 of the present invention. Referring to FIG. 1, a pair of car guide rails 2 are arranged within a hoistway 1. A car 3 is guided by the car guide rails 2 as it is raised and lowered in the hoistway 1. Arranged at the upper end portion of the hoistway 1 is a hoisting machine (not shown) for raising and lowering the car 3 and a counterweight (not shown). A main rope 4 is wound around a drive sheave of the hoisting machine. The car 3 and the counterweight are suspended in the hoistway 1 by means of the main rope 4. Mounted to the car 3 are a pair of safety gears opposed to the respective guide rails 2 and serving as braking means. The safety gears 5 are arranged on the underside of the car 3. Braking is applied to the car 3 upon actuating the safety gears 5.

Also arranged at the upper end portion of the hoistway 1 is a governor 6 serving as a car speed detecting means for detecting the ascending/descending speed of the car 3. The governor 6 has a governor main body 7 and a governor sheave 8 rotatable with respect to the governor main body 7. A rotatable tension pulley 9 is arranged at a lower end portion of the hoistway 1. Wound between the governor sheave 8 and the tension pulley 9 is a governor rope 10 connected to the car 3. The connecting portion between the governor rope 10 and the car 3 undergoes vertical reciprocating motion as the car 3 travels. As a result, the governor sheave 8 and the tension pulley 9 are rotated at a speed corresponding to the ascending/descending speed of the car 3.

The governor 6 is adapted to actuate a braking device of the hoisting machine when the ascending/descending speed of the car 3 has reached a preset first overspeed. Further, the governor 6 is provided with a switch portion 11 serving as an output portion through which an actuation signal is output to the safety gears 5 when the descending speed of the car 3 reaches a second overspeed (set overspeed) higher than the first overspeed. The switch portion 11 has a contact 16 which is mechanically opened and closed by means of an overspeed lever that is displaced according to the centrifugal force of the rotating governor sheave 8. The contact 16 is electrically connected to a battery 12, which is an uninterruptible power supply capable of feeding power even in the event of a power failure, and to a control panel 13 that controls the drive of an elevator, through a power supply cable 14 and a connection cable 15, respectively.

A control cable (movable cable) is connected between the car 3 and the control panel 13. The control cable includes, in addition to multiple power lines and signal lines, an emergency stop wiring 17 electrically connected between the control panel 13 and each safety gear 5. By closing of the contact 16, power from the battery 12 is supplied to each safety gear 5 by way of the power supply cable 14, the switch portion 11, the connection cable 15, a power supply circuit within the control panel 13, and the emergency stop wiring 17. It should be noted that transmission means consists of the connection cable 15, the power supply circuit within the control panel 13, and the emergency stop wiring 17.

Figure 2:
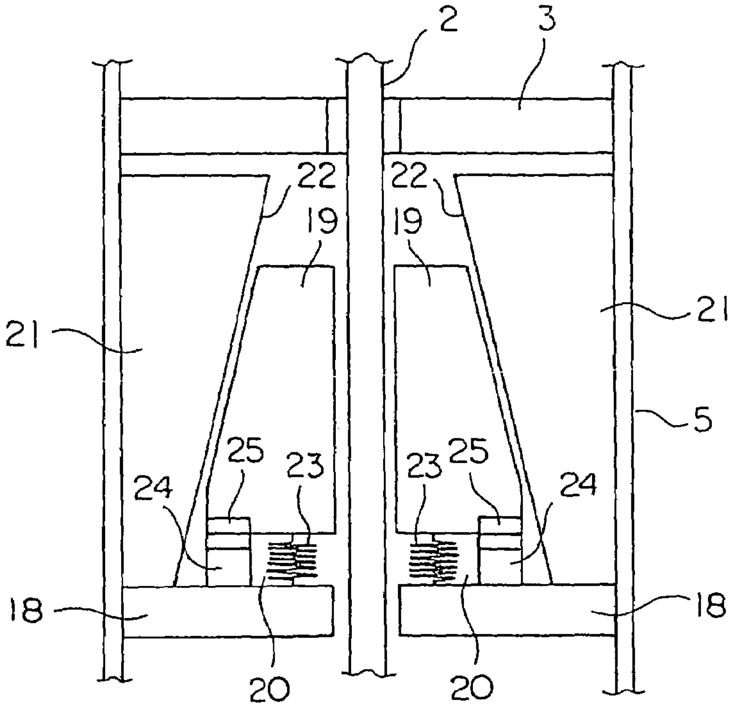
FIG. 2 is a front view showing the safety gear of FIG. 1.
Figure 3:
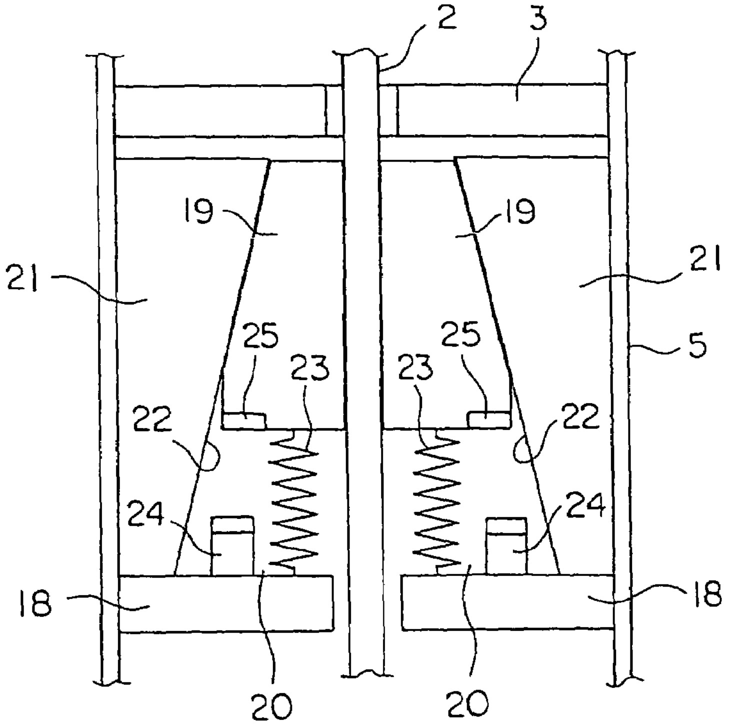
FIG. 3 is a front view showing the safety gear of FIG. 2 that has been actuated.

FIG. 2 is a front view showing the safety gear 5 of FIG. 1, and FIG. 3 is a front view showing the safety gear 5 of FIG. 2 that has been actuated. Referring to the figures, a support member 18 is fixed in position below the car 3. The safety gear 5 is fixed to the support member 18. Further, each safety gear 5 includes a pair of actuator portions 20, which are connected to a pair of wedges 19 serving as braking members and capable of moving into and away from contact with the car guide rail 2 to displace the wedges 19 with respect to the car 3, and a pair of guide portions 21 which are fixed to the support member 18 and guide the wedges 19 displaced by the actuator portions 20 into contact with the car guide rail 2. The pair of wedges 19, the pair of actuator portions 20, and the pair of guide portions 21 are each arranged symmetrically on both sides of the car guide rail 2.

Each guide portion 21 has an inclined surface 22 inclined with respect to the car guide rail 2 such that the distance between it and the car guide rail 2 decreases with increasing proximity to its upper portion. The wedge 19 is displaced along the inclined surface 22. Each actuator portion 20 includes a spring 23 serving as an urging portion that urges the wedge 19 upward toward the guide portion 21 side, and an electromagnet 24 which, when supplied with electric current, generates an electromagnetic force for displacing the wedge 19 downward away from the guide member 21 against the urging force of the spring 23.

The spring 23 is connected between the support member 18 and the wedge 19. The electromagnet 24 is fixed to the support member 18. The emergency stop wiring 17 is connected to the electromagnet 24. Fixed to each wedge 19 is a permanent magnet 25 opposed to the electromagnet 24. The supply of electric current to the electromagnet 24 is performed from the battery 12 (see FIG. 1) by the closing of the contact 16 (see FIG. 1). The safety gear 5 is actuated as the supply of electric current to the electromagnet 24 is cut off by the opening of the contact 16 (see FIG. 1). That is, the pair of wedges 19 are displaced upward due to the elastic restoring force of the spring 23 to be pressed against the car guide rail 2.

Next, operation is described. The contact 16 remains closed during normal operation. Accordingly, power is supplied from the battery 12 to the electromagnet 24. The wedge 19 is attracted and held onto the electromagnet 24 by the electromagnetic force generated upon this power supply, and thus remains separated from the car guide rail 2 (FIG. 2).

When, for instance, the speed of the car 3 rises to reach the first overspeed due to a break in the main rope 4 or the like, this actuates the braking device of the hoisting machine. When the speed of the car 3 rises further even after the actuation of the braking device of the hoisting machine and reaches the second overspeed, this triggers closure of the contact 16. As a result, the supply of electric current to the electromagnet 24 of each safety gear 5 is cut off, and the wedges 19 are displaced by the urging force of the springs 23 upward with respect to the car 3. At this time, the wedges 19 are displaced along the inclined surface 22 while in contact with the inclined surface 22 of the guide portions 21. Due to this displacement, the wedges 19 are pressed into contact with the car guide rail 2. The wedges 19 are displaced further upward as they come into contact with the car guide rail 2, to become wedged in between the car guide rail 2 and the guide portions 21. A large frictional force is thus generated between the car guide rail 2 and the wedges 19, braking the car 3 (FIG. 3).

To release the braking on the car 3, the car 3 is raised while supplying electric current to the electromagnet 24 by the closing of the contact 16. As a result, the wedges 19 are displaced downward, thus separating from the car guide rail 2.

In the above-described elevator apparatus, the switch portion 11 connected to the battery 12 and each safety gear 5 are electrically connected to each other, whereby an abnormality in the speed of the car 3 detected by the governor 6 can be transmitted as an electrical actuation signal from the switch portion 11 to each safety gear 5, making it possible to brake the car 3 in a short time after detecting an abnormality in the speed of the car 3. As a result, the braking distance of the car 3 can be reduced. Further, synchronized actuation of the respective safety gears 5 can be readily effected, making it possible to stop the car 3 in a stable manner. Also, each safety gear 5 is actuated by the electrical actuation signal, thus preventing the safety gear 5 from being erroneously actuated due to shaking of the car 3 or the like.

Additionally, each safety gear 5 has the actuator portions 20 which displace the wedge 19 upward toward the guide portion 21 side, and the guide portions 21 each including the inclined surface 22 to guide the upwardly displaced wedge 19 into contact with the car guide rail 2, whereby the force with which the wedge 19 is pressed against the car guide rail 2 during descending movement of the car 3 can be increased with reliability.

Further, each actuator portion 20 has a spring 23 that urges the wedge 19 upward, and an electromagnet 24 for displacing the wedge 19 downward against the urging force of the spring 23, thereby enabling displacement of the wedge 19 by means of a simple construction.

Embodiment 2

Figure 4:
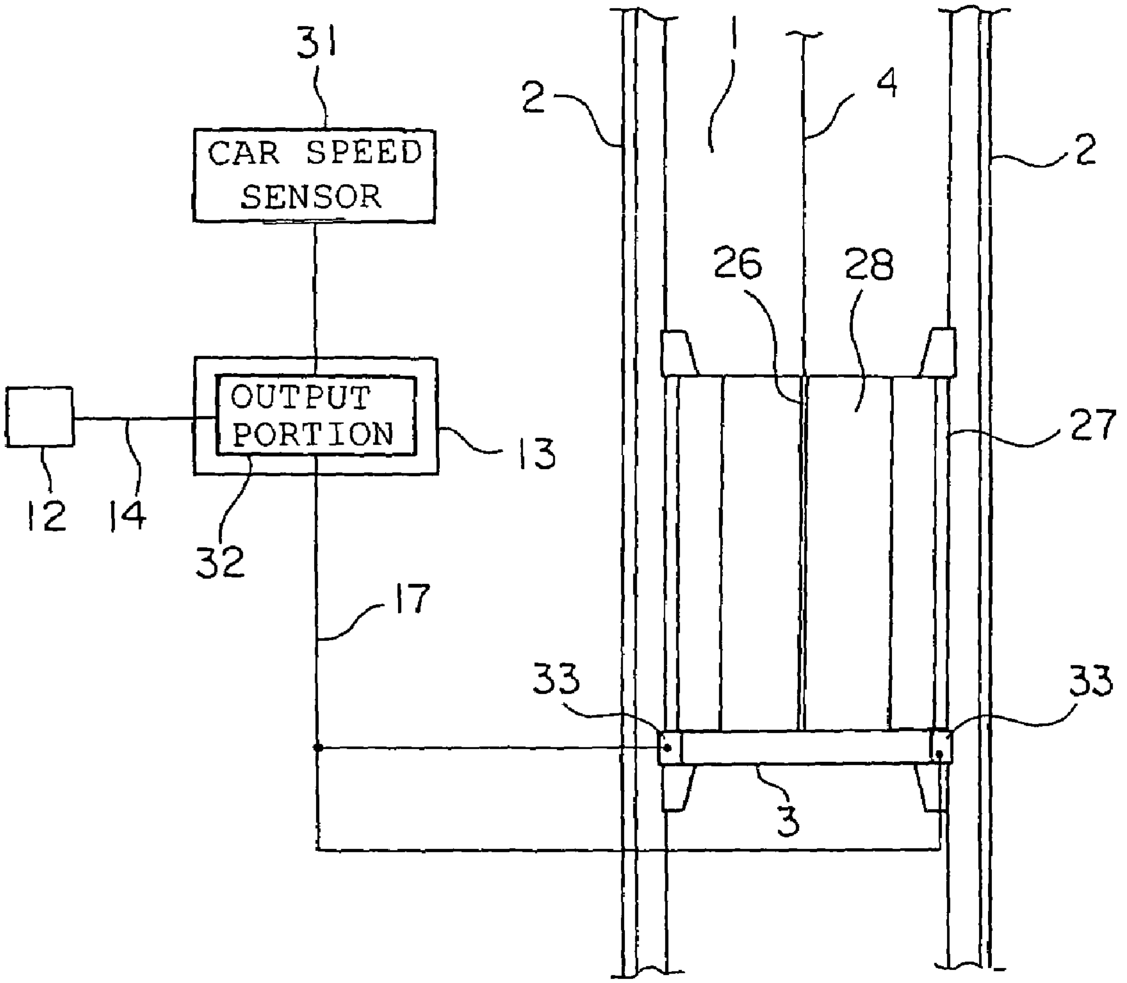
FIG. 4 is a schematic diagram showing an elevator apparatus according to Embodiment 2 of the present invention.

FIG. 4 is a schematic diagram showing an elevator apparatus according to Embodiment 2 of the present invention. Referring to FIG. 4, the car 3 has a car main body 27 provided with a car entrance 26, and a car door 28 that opens and closes the car entrance 26. Provided in the hoistway 1 is a car speed sensor 31 serving as car speed detecting means for detecting the speed of the car 3. Mounted inside the control panel 13 is an output portion 32 electrically connected to the car speed sensor 31. The battery 12 is connected to the output portion 32 through the power supply cable 14. Electric power used for detecting the speed of the car 3 is supplied from the output portion 32 to the car speed sensor 31. The output portion 32 is input with a speed detection signal from the car speed sensor 31.

Mounted on the underside of the car 3 are a pair of safety gears 33 serving as braking means for braking the car 3. The output portion 32 and each safety gear 33 are electrically connected to each other through the emergency stop wiring 17. When the speed of the car 3 is at the second overspeed, an actuation signal, which is the actuating power, is output to each safety gear 33. The safety gears 33 are actuated upon input of this actuation signal.

Figure 5:
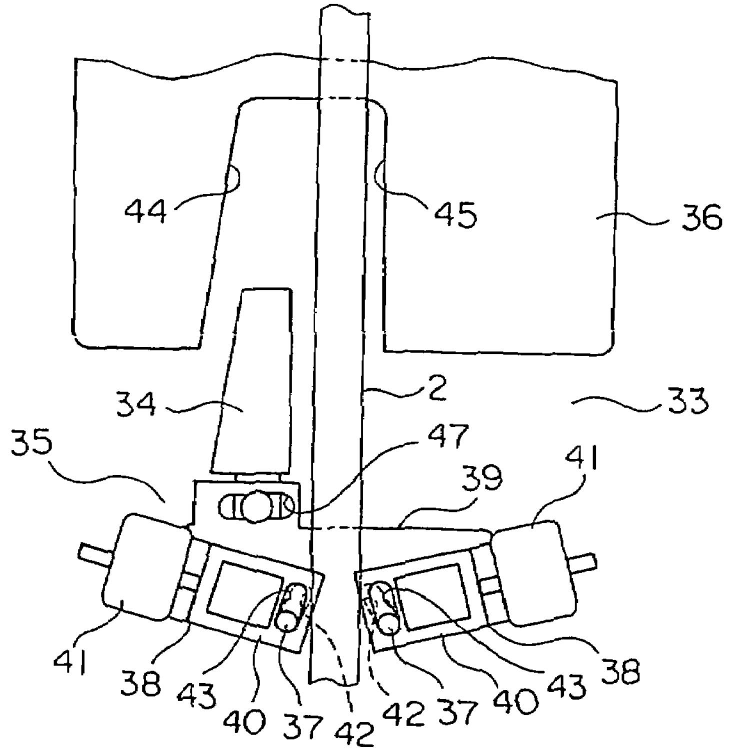
FIG. 5 is a front view showing the safety gear of FIG. 4.
Figure 6:
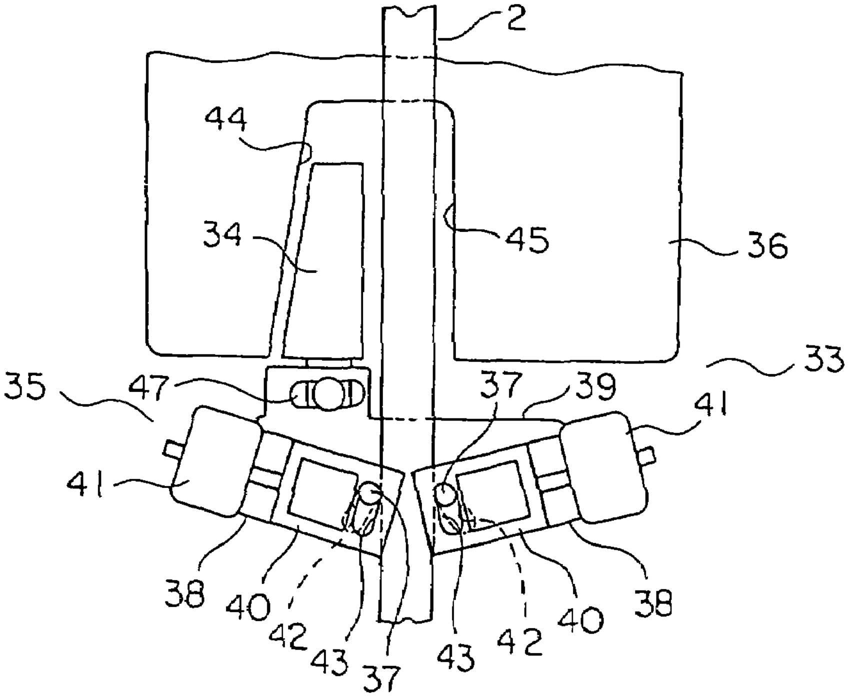
FIG. 6 is a front view showing the safety gear of FIG. 5 that has been actuated.

FIG. 5 is a front view showing the safety gear 33 of FIG. 4, and FIG. 6 is a front view showing the safety gear 33 of FIG. 5 that has been actuated. Referring to the figures, the safety gear 33 has a wedge 34 serving as a braking member and capable of moving into and away from contact with the car guide rail 2, an actuator portion 35 connected to a lower portion of the wedge 34, and a guide portion 36 arranged above the wedge 34 and fixed to the car 3. The wedge 34 and the actuator portion 35 are capable of vertical movement with respect to the guide portion 36. As the wedge 34 is displaced upward with respect to the guide portion 36, that is, toward the guide portion 36 side, the wedge 34 is guided by the guide portion 36 into contact with the car guide rail 2.

The actuator portion 35 has a cylindrical contact portion 37 capable of moving into and away from contact with the car guide rail 2, an actuating mechanism 38 for displacing the contact portion 37 into and away from contact with the car guide rail 2, and a support portion 39 supporting the contact portion 37 and the actuating mechanism 38. The contact portion 37 is lighter than the wedge 34 so that it can be readily displaced by the actuating mechanism 38. The actuating mechanism 38 has a movable portion 40 capable of reciprocating displacement between a contact position where the contact portion 37 is held in contact with the car guide rail 2 and a separated position where the contact portion 37 is separated from the car guide rail 2, and a drive portion 41 for displacing the movable portion 40.

The support portion 39 and the movable portion 40 are provided with a support guide hole 42 and a movable guide hole 43, respectively. The inclination angles of the support guide hole 42 and the movable guide hole 43 with respect to the car guide rail 2 are different from each other. The contact portion 37 is slidably fitted in the support guide hole 42 and the movable guide hole 43. The contact portion 37 slides within the movable guide hole 43 according to the reciprocating displacement of the movable portion 40, and is displaced along the longitudinal direction of the support guide hole 42. As a result, the contact portion 37 is moved into and away from contact with the car guide rail 2 at an appropriate angle. When the contact portion 37 comes into contact with the car guide rail 2 as the car 3 descends, braking is applied to the wedge 34 and the actuator portion 35, displacing them toward the guide portion 36 side.

Mounted on the upperside of the support portion 39 is a horizontal guide hole 47 extending in the horizontal direction. The wedge 34 is slidably fitted in the horizontal guide hole 47. That is, the wedge 34 is capable of reciprocating displacement in the horizontal direction with respect to the support portion 39.

The guide portion 36 has an inclined surface 44 and a contact surface 45 which are arranged so as to sandwich the car guide rail 2 therebetween. The inclined surface 44 is inclined with respect to the car guide rail 2 such that the distance between it and the car guide rail 2 decreases with increasing proximity to its upper portion. The contact surface 45 is capable of moving into and away from contact with the car guide rail 2. As the wedge 34 and the actuator portion 35 are displaced upward with respect to the guide portion 36, the wedge 34 is displaced along the inclined surface 44. As a result, the wedge 34 and the contact surface 45 are displaced so as to approach each other, and the car guide rail 2 becomes lodged between the wedge 34 and the contact surface 45.

Figure 7:
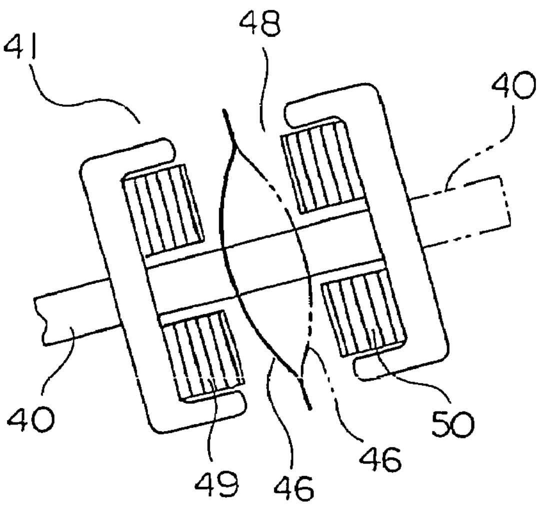
FIG. 7 is a front view showing the drive portion of FIG. 6.

FIG. 7 is a front view showing the drive portion 41 of FIG. 6. Referring to FIG. 7, the drive portion 41 has a disc spring 46 serving as an urging portion and attached to the movable portion 40, and an electromagnet 48 for displacing the movable portion 40 by an electromagnetic force generated upon supply of electric current thereto.

The movable portion 40 is fixed to the central portion of the disc spring 46. The disc spring 46 is deformed due to the reciprocating displacement of the movable portion 40. As the disc spring 46 is deformed due to the displacement of the movable portion 40, the urging direction of the disc spring 46 is reversed between the contact position (solid line) and the separated position (broken line). The movable portion 40 is retained at the contact or separated position as it is urged by the disc spring 46. That is, the contact or separated state of the contact portion 37 with respect to the car guide rail 2 is retained by the urging of the disc spring 46.

The electromagnet 48 has a first electromagnetic portion 49 fixed to the movable portion 40, and a second electromagnetic portion 50 opposed to the first electromagnetic portion 49. The movable portion 40 is displaceable relative to the second electromagnetic portion 50. The emergency stop wiring 17 is connected to the electromagnet 48. Upon inputting an actuation signal to the electromagnet 48, the first electromagnetic portion 49 and the second electromagnetic portion 50 generate electromagnetic forces so as to repel each other. That is, upon input of the actuation signal to the electromagnet 48, the first electromagnetic portion 49 is displaced away from contact with the second electromagnetic portion 50, together with the movable portion 40.

It should be noted that for recovery after the actuation of the safety gear 5, the output portion 32 outputs a recovery signal during the recovery phase. Input of the recovery signal to the electromagnet 48 causes the first electromagnetic portion 49 and the second electromagnetic portion 50 to attract each other. Otherwise, this embodiment is of the same construction as Embodiment 1.

Next, operation is described. During normal operation, the movable portion 40 is located at the separated position, and the contact portion 37 is urged by the disc spring 46 to be separated away from contact with the car guide rail 2. With the contact portion 37 thus being separated from the car guide rail 2, the wedge 34 is separated from the guide portion 36, thus maintaining the distance between the wedge 34 and the guide portion 36.

When the speed detected by the car speed sensor 31 reaches the first overspeed, this actuates the braking device of the hoisting machine. When the speed of the car 3 continues to rise thereafter and the speed as detected by the car speed sensor 31 reaches the second overspeed, an actuation signal is output from the output portion 32 to each safety gear 33. Inputting this actuation signal to the electromagnet 48 triggers the first electromagnetic portion 49 and the second electromagnetic portion 50 to repel each other. The electromagnetic repulsion force thus generated causes the movable portion 40 to be displaced into the contact position. As this happens, the contact portion 37 is displaced into contact with the car guide rail 2. By the time the movable portion 40 reaches the contact position, the urging direction of the disc spring 46 reverses to that for retaining the movable portion 40 at the contact position. As a result, the contact portion 37 is pressed into contact with the car guide rail 2, thus braking the wedge 34 and the actuator portion 35.

Since the car 3 and the guide portion 36 descend with no braking applied thereon, the guide portion 36 is displaced downward towards the wedge 34 and actuator 35 side. Due to this displacement, the wedge 34 is guided along the inclined surface 44, causing the car guide rail 2 to become lodged between the wedge 34 and the contact surface 45. As the wedge 34 comes into contact with the car guide rail 2, it is displaced further upward to wedge in between the car guide rail 2 and the inclined surface 44. A large frictional force is thus generated between the car guide rail 2 and the wedge 34, and between the car guide rail 2 and the contact surface 45, thus braking the car 3.

During the recovery phase, the recovery signal is transmitted from the output portion 32 to the electromagnet 48. This causes the first electromagnetic portion 49 and the second electromagnetic portion 50 to attract each other, thus displacing the movable portion 40 to the separated position. As this happens, the contact portion 37 is displaced to be separated away from contact with the car guide rail 2. By the time the movable portion 40 reaches the separated position, the urging direction of the disc spring 46 reverses, allowing the movable portion 40 to be retained at the separated position. As the car 3 ascends in this state, the pressing contact of the wedge 34 and the contact surface 45 with the car guide rail 2 is released.

In addition to providing the same effects as those of Embodiment 1, the above-described elevator apparatus includes the car speed sensor 31 provided in the hoistway 1 to detect the speed of the car 3. There is thereby no need to use a speed governor and a governor rope, making it possible to reduce the overall installation space for the elevator apparatus.

Further, the actuator portion 35 has the contact portion 37 capable of moving into and away from contact with the car guide rail 2, and the actuating mechanism 38 for displacing the contact portion 37 into and away from contact with the car guide rail 2. Accordingly, by making the weight of the contact portion 37 smaller than that of the wedge 34, the drive force to be applied from the actuating mechanism 38 to the contact portion 37 can be reduced, thus making it possible to miniaturize the actuating mechanism 38. Further, the lightweight construction of the contact portion 37 allows increases in the displacement rate of the contact portion 37, thereby reducing the time required until generation of a braking force.

Further, the drive portion 41 includes the disc spring 46 adapted to hold the movable portion 40 at the contact position or the separated position, and the electromagnet 48 capable of displacing the movable portion 40 when supplied with electric current, whereby the movable portion 40 can be reliably held at the contact or separated position by supplying electric current to the electromagnet 48 only during the displacement of the movable portion 40.

Embodiment 3

Figure 8:
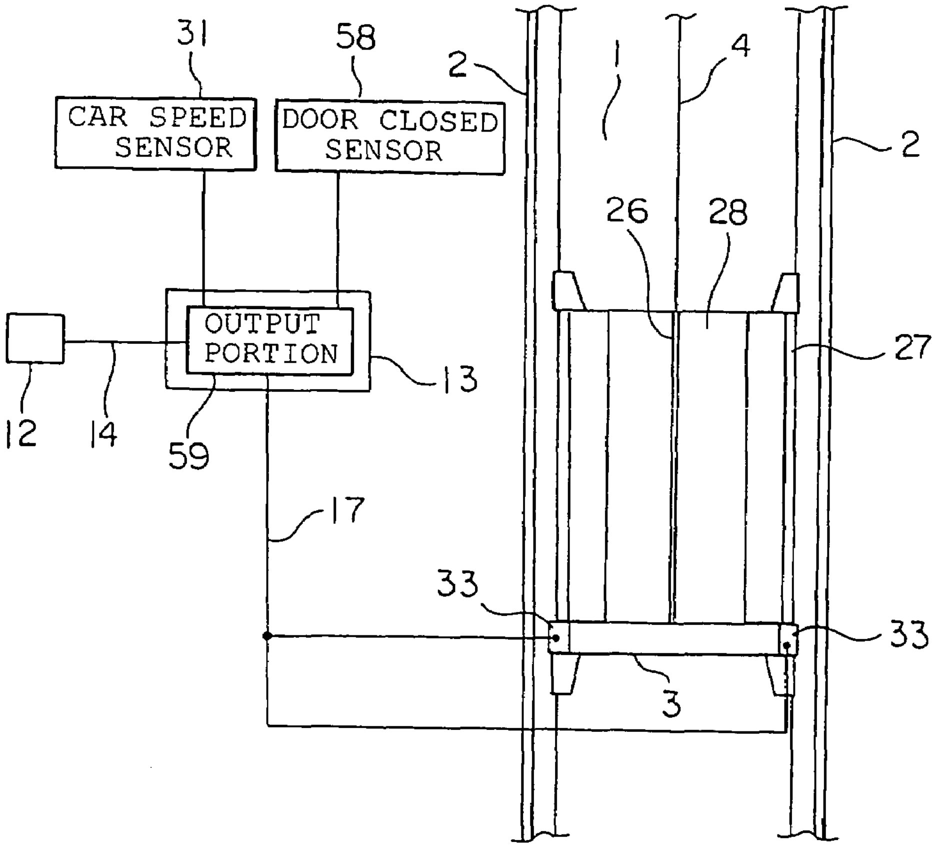
FIG. 8 is a schematic diagram showing an elevator apparatus according to Embodiment 3 of the present invention.

FIG. 8 is a schematic diagram showing an elevator apparatus according to Embodiment 3 of the present invention. Referring to FIG. 8, provided at the car entrance 26 is a door closed sensor 58, which serves as a door closed detecting means for detecting the open or closed state of the car door 28. An output portion 59 mounted on the control panel 13 is connected to the door closed sensor 58 through a control cable. Further, the car speed sensor 31 is electrically connected to the output portion 59. A speed detection signal from the car speed sensor 31 and an open/closed detection signal from the door closed sensor 58 are input to the output portion 59. On the basis of the speed detection signal and the open/closed detection signal thus input, the output portion 59 can determine the speed of the car 3 and the open or closed state of the car entrance 26.

The output portion 59 is connected to each safety gear 33 through the emergency stop wiring 17. On the basis of the speed detection signal from the car speed sensor 31 and the opening/closing detection signal from the door closed sensor 58, the output portion 59 outputs an actuation signal when the car 3 has descended with the car entrance 26 being open. The actuation signal is transmitted to the safety gear 33 through the emergency stop wiring 17. Otherwise, this embodiment is of the same construction as Embodiment 2.

In the elevator apparatus as described above, the car speed sensor 31 that detects the speed of the car 3, and the door closed sensor 58 that detects the open or closed state of the car door 28 are electrically connected to the output portion 59, and the actuation signal is output from the output portion 59 to the safety gear 33 when the car 3 has descended with the car entrance 26 being open, thereby preventing the car 3 from descending with the car entrance 26 being open.

It should be noted that safety gears vertically reversed from the safety gears 33 may be mounted to the car 3. This construction also makes it possible to prevent the car 3 from ascending with the car entrance 26 being open.

Embodiment 4

Figure 9:
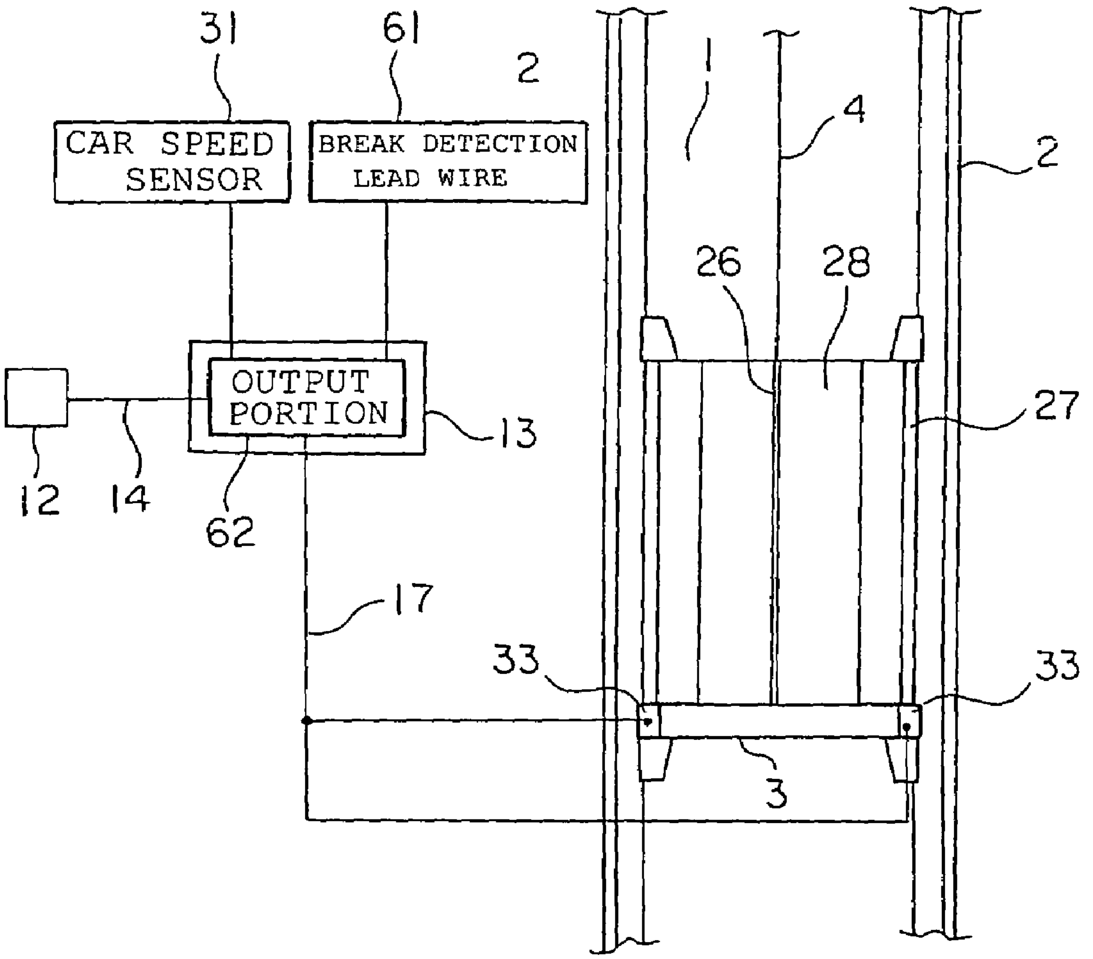
FIG. 9 is a schematic diagram showing an elevator apparatus according to Embodiment 4 of the present invention.

FIG. 9 is a schematic diagram showing an elevator apparatus according to Embodiment 4 of the present invention. Referring to FIG. 9, passed through the main rope 4 is a break detection lead wire 61 serving as a rope break detecting means for detecting a break in the rope 4. A weak current flows through the break detection lead wire 61. The presence of a break in the main rope 4 is detected on the basis of the presence or absence of this weak electric current passing therethough. An output portion 62 mounted on the control panel 13 is electrically connected to the break detection lead wire 61. When the break detection lead wire 61 breaks, a rope break signal, which is an electric current cut-off signal of the break detection lead wire 61, is input to the output portion 62. The car speed sensor 31 is also electrically connected to the output portion 62.

The output portion 62 is connected to each safety gear 33 through the emergency stop wiring 17. If the main rope 4 breaks, the output portion 62 outputs an actuation signal on the basis of the speed detection signal from the car speed sensor 31 and the rope break signal from the break detection lead wire 61. The actuation signal is transmitted to the safety gear 33 through the emergency stop wiring 17. Otherwise, this embodiment is of the same construction as Embodiment 2.

In the elevator apparatus as described above, the car speed sensor 31 which detects the speed of the car 3 and the break detection lead wire 61 which detects a break in the main rope 4 are electrically connected to the output portion 62, and, when the main rope 4 breaks, the actuation signal is output from the output portion 62 to the safety gear 33. By thus detecting the speed of the car 3 and detecting a break in the main rope 4, braking can be more reliably applied to a car 3 that is descending at abnormal speed.

While in the above example the method of detecting the presence or absence of an electric current passing through the break detection lead wire 61, which is passed through the main rope 4, is employed as the rope break detecting means, it is also possible to employ a method of, for example, measuring changes in the tension of the main rope 4. In this case, a tension measuring instrument is installed on the rope fastening.

Embodiment 5

Figure 10:
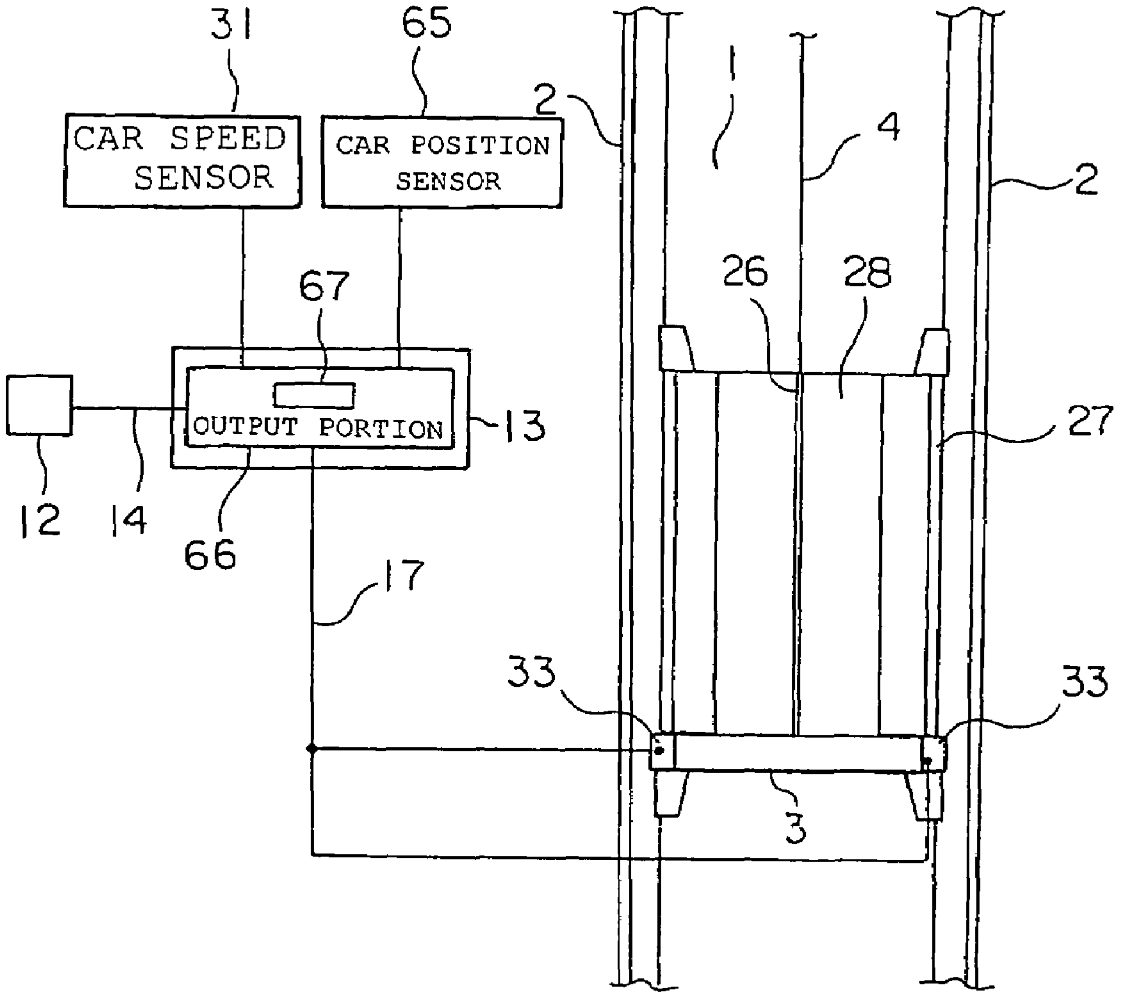
FIG. 10 is a schematic diagram showing an elevator apparatus according to Embodiment 5 of the present invention.

FIG. 10 is a schematic diagram showing an elevator apparatus according to Embodiment 5 of the present invention. Referring to FIG. 10, provided in the hoistway 1 is a car position sensor 65 serving as car position detecting means for detecting the position of the car 3. The car position sensor 65 and the car speed sensor 31 are electrically connected to an output portion 66 mounted on the control panel 13. The output portion 66 has a memory portion 67 storing a control pattern containing information on the position, speed, acceleration/deceleration, floor stops, etc., of the car 3 during normal operation. Inputs to the output portion 66 are a speed detection signal from the car speed sensor 31 and a car position signal from the car position sensor 65.

The output portion 66 is connected to the safety gear 33 through the emergency stop wiring 17. The output portion 66 compares the speed and position (actual measured values) of the car 3 based on the speed detection signal and the car position signal with the speed and position (set values) of the car 3 based on the control pattern stored in the memory portion 67. The output portion 66 outputs an actuation signal to the safety gear 33 when the deviation between the actual measured values and the set values exceeds a predetermined threshold. Herein, the predetermined threshold refers to the minimum deviation between the actual measurement values and the set values required for bringing the car 3 to a halt through normal braking without the car 3 colliding against an end portion of the hoistway 1. Otherwise, this embodiment is of the same construction as Embodiment 2.

In the elevator apparatus as described above, the output portion 66 outputs the actuation signal when the deviation between the actual measurement values from each of the car speed sensor 31 and the car position sensor 65 and the set values based on the control pattern exceeds the predetermined threshold, making it possible to prevent collision of the car 3 against the end portion of the hoistway 1.

Embodiment 6

Figure 11:
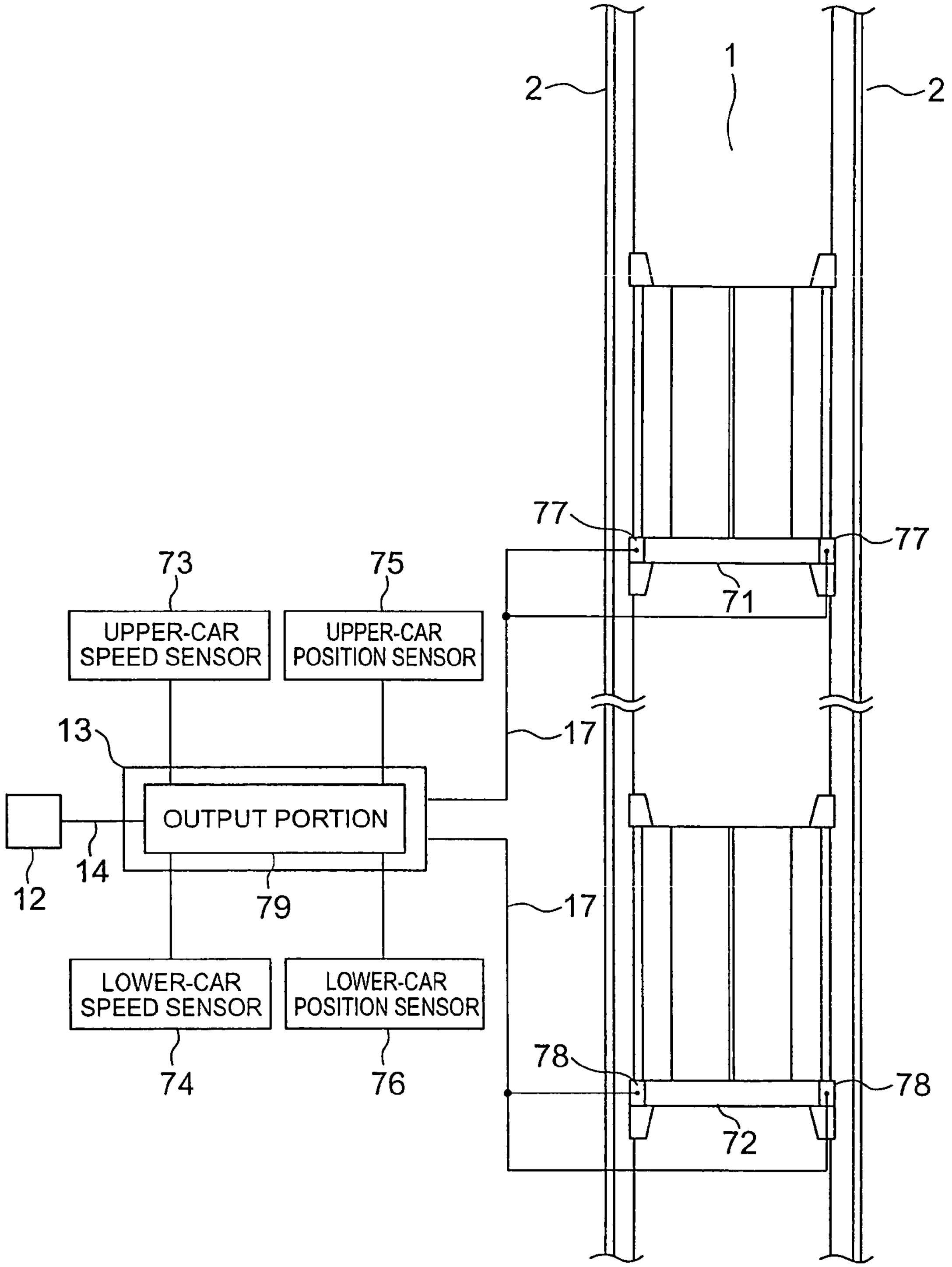
FIG. 11 is a schematic diagram showing an elevator apparatus according to Embodiment 6 of the present invention.

FIG. 11 is a schematic diagram showing an elevator apparatus according to Embodiment 6 of the present invention. Referring to FIG. 11, arranged within the hoistway 1 are an upper car 71 that is a first car and a lower car 72 that is a second car located below the upper car 71. The upper car 71 and the lower car 72 are guided by the car guide rail 2 as they ascend and descend in the hoistway 1. Installed at the upper end portion of the hoistway 1 are a first hoisting machine (not shown) for raising and lowering the upper car 71 and an upper-car counterweight (not shown), and a second hoisting machine (not shown) for raising and lowering the lower car 72 and a lower-car counterweight (not shown). A first main rope (not shown) is wound around the drive sheave of the first hoisting machine, and a second main rope (not shown) is wound around the drive sheave of the second hoisting machine. The upper car 71 and the upper-car counterweight are suspended by the first main rope, and the lower car 72 and the lower-car counterweight are suspended by the second main rope.

In the hoistway 1, there are provided an upper-car speed sensor 73 and a lower-car speed sensor 74 respectively serving as car speed detecting means for detecting the speed of the upper car 71 and the speed of the lower car 72. Also provided in the hoistway 1 are an upper-car position sensor 75 and a lower-car position sensor 76 respectively serving as car position detecting means for detecting the position of the upper car 71 and the position of the lower car 72.

It should be noted that car operation detecting means includes the upper-car speed sensor 73, the lower-car sped sensor 74, the upper-car position sensor 75, and the lower-car position sensor 76.

Mounted on the underside of the upper car 71 are upper-car safety gears 77 serving as braking means of the same construction as that of the safety gears 33 used in Embodiment 2. Mounted on the underside of the lower car 72 are lower-car safety gears 78 serving as braking means of the same construction as that of the upper-car safety gears 77.

An output portion 79 is mounted inside the control panel 13. The upper-car speed sensor 73, the lower-car speed sensor 74, the upper-car position sensor 75, and the lower-car position sensor 76 are electrically connected to the output portion 79. Further, the battery 12 is connected to the output portion 79 through the power supply cable 14. An upper-car speed detection signal from the upper-car speed sensor 73, a lower-car speed detection signal from the lower-car speed sensor 74, an upper-car position detecting signal from the upper-car position sensor 75, and a lower-car position detection signal from the lower-car position sensor 76 are input to the output portion 79. That is, information from the car operation detecting means is input to the output portion 79.

The output portion 79 is connected to the upper-car safety gear 77 and the lower-car safety gear 78 through the emergency stop wiring 17. Further, on the basis of the information from the car operation detecting means, the output portion 79 predicts whether or not the upper car 71 or the lower car 72 will collide against an end portion of the hoistway 1 and whether or not collision will occur between the upper car 71 and the lower car 72; when it is predicted that such collision will occur, the output portion 79 outputs an actuation signal to each the upper-car safety gears 77 and the lower-car safety gears 78. The upper-car safety gears 77 and the lower-car safety gears 78 are each actuated upon input of this actuation signal.

It should be noted that a monitoring portion includes the car operation detecting means and the output portion 79. The running states of the upper car 71 and the lower car 72 are monitored by the monitoring portion. Otherwise, this embodiment is of the same construction as Embodiment 2.

Next, operation is described. When input with the information from the car operation detecting means, the output portion 79 predicts whether or not the upper car 71 and the lower car 72 will collide against an end portion of the hoistway 1 and whether or not collision between the upper car and the lower car 72 will occur. For example, when the output portion 79 predicts that collision will occur between the upper car 71 and the lower car 72 due to a break in the first main rope suspending the upper car 71, the output portion 79 outputs an actuation signal to each the upper-car safety gears 77 and the lower-car safety gears 78. The upper-car safety gears 77 and the lower-car safety gears 78 are thus actuated, braking the upper car 71 and the lower car 72.

In the elevator apparatus as described above, the monitoring portion has the car operation detecting means for detecting the actual movements of the upper car 71 and the lower car 72 as they ascend and descend in the same hoistway 1, and the output portion 79 which predicts whether or not collision will occur between the upper car 71 and the lower car 72 on the basis of the information from the car operation detecting means and, when it is predicted that the collision will occur, outputs the actuation signal to each of the upper-car safety gears 77 and the lower-car emergency devices 78. Accordingly, even when the respective speeds of the upper car 71 and the lower car 72 have not reached the set overspeed, the upper-car safety gears 77 and the lower-car emergency devices 78 can be actuated when it is predicted that collision will occur between the upper car 71 and the lower car 72, thereby making it possible to avoid a collision between the upper car 71 and the lower car 72.

Further, the car operation detecting means has the upper-car speed sensor 73, the lower-car speed sensor 74, the upper-car position sensor 75, and the lower-car position sensor 76, the actual movements of the upper car 71 and the lower car 72 can be readily detected by means of a simple construction.

Figure 12:
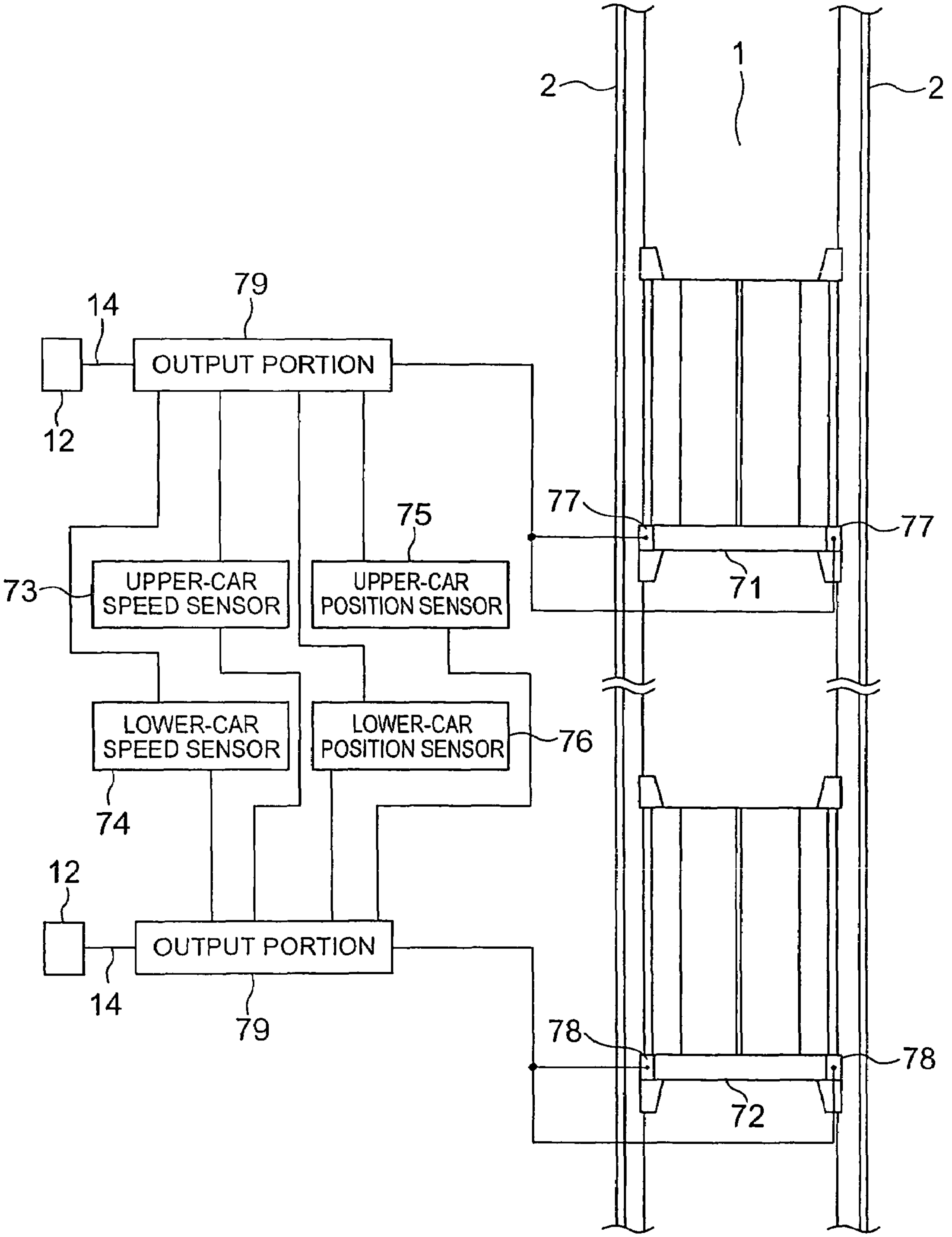
FIG. 12 is a schematic diagram showing another example of the elevator apparatus shown in FIG. 11.

While in the above-described example the output portion 79 is mounted inside the control panel 13, an output portion 79 may be mounted on each of the upper car 71 and the lower car 72. In this case, as shown in FIG. 12, the upper-car speed sensor 73, the lower-car speed sensor 74, the upper-car position sensor 75, and the lower-car position sensor 76 are electrically connected to each of the output portions 79 mounted on the upper car 71 and the lower car 72.

While in the above-described example the output portions 79 outputs the actuation signal to each the upper-car safety gears 77 and the lower-car safety gears 78, the output portion 79 may, in accordance with the information from the car operation detecting means, output the actuation signal to only one of the upper-car safety gear 77 and the lower-car safety gear 78. In this case, in addition to predicting whether or not collision will occur between the upper car 71 and the lower car 72, the output portions 79 also determine the presence of an abnormality in the respective movements of the upper car 71 and the lower car 72. The actuation signal is output from an output portion 79 to only the safety gear mounted on the car which is moving abnormally.

Embodiment 7

Figure 13:
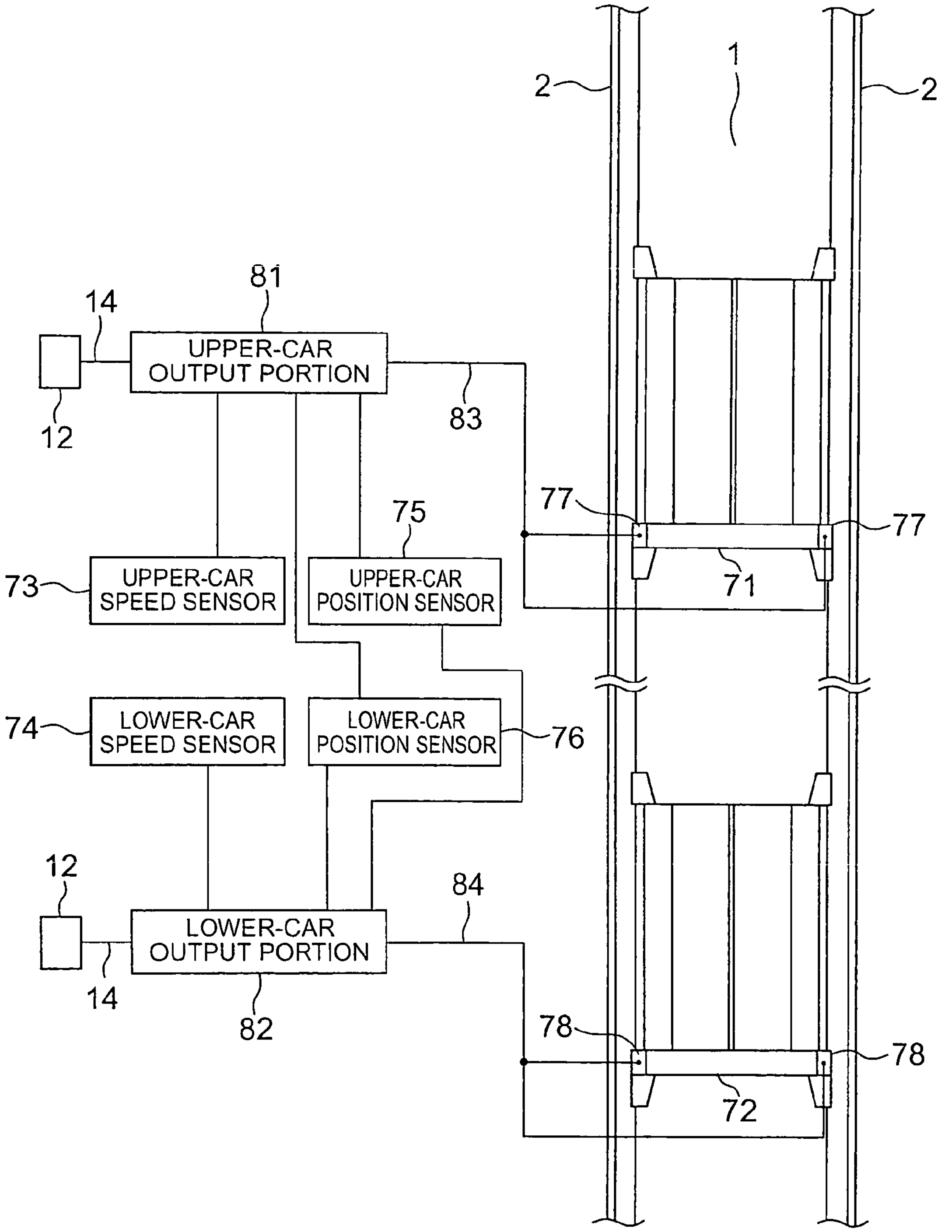
FIG. 13 is a schematic diagram showing an elevator apparatus according to Embodiment 7 of the present invention.

FIG. 13 is a schematic diagram showing an elevator apparatus according to Embodiment 7 of the present invention. Referring to FIG. 13, an upper-car output portion 81 serving as an output portion is mounted on the upper car 71, and a lower-car output portion 82 serving as an output portion is mounted on the lower car 72. The upper-car speed sensor 73, the upper-car position sensor 75, and the lower-car position sensor 76 are electrically connected to the upper-car output portion 81. The lower-car speed sensor 74, the lower-car position sensor 76, and the upper-car position sensor 75 are electrically connected to the lower-car output portion 82.

The upper-car output portion 81 is electrically connected to the upper-car safety gears 77 through an upper-car emergency stop wiring 83 serving as transmission means installed on the upper car 71. Further, the upper-car output portion 81 predicts, on the basis of information (hereinafter referred to as "upper-car detection information" in this embodiment) from the upper-car speed sensor 73, the upper-car position sensor 75, and the lower-car position sensor 76, whether or not the upper car 71 will collide against the lower car 72, and outputs an actuation signal to the upper-car safety gears 77 upon predicting that a collision will occur. Further, when input with the upper-car detection information, the upper-car output portion 81 predicts whether or not the upper car 71 will collide against the lower car 72 on the assumption that the lower car 72 is running toward the upper car 71 at its maximum normal operation speed.

The lower-car output portion 82 is electrically connected to the lower-car safety gears 78 through a lower-car emergency stop wiring 84 serving as transmission means installed on the lower car 72. Further, the lower-car output portion 82 predicts, on the basis of information (hereinafter referred to as "lower-car detection information" in this embodiment) from the lower-car speed sensor 74, the lower-car position sensor 76, and the upper-car position sensor 75, whether or not the lower car 72 will collide against the upper car 71, and outputs an actuation signal to the lower-car safety gears 78 upon predicting that a collision will occur. Further, when input with the lower-car detection information, the lower-car output portion 82 predicts whether or not the lower car 72 will collide against the upper car 71 on the assumption that the upper car 71 is running toward the lower car 72 at its maximum normal operation speed.

Normally, the operations of the upper car 71 and the lower car 72 are controlled such that they are sufficiently spaced away from each other so that the upper-car safety gears 77 and the lower-car safety gears 78 do not actuate. Otherwise, this embodiment is of the same construction as Embodiment 6.

Next, operation is described. For instance, when, due to a break in the first main rope suspending the upper car 71, the upper car 71 falls toward the lower car 72, the upper-car output portion 81 and the lower-car output portion 82 both predict the impending collision between the upper car 71 and the lower car 72. As a result, the upper-car output portion 81 and the lower-car output portion 82 each output an actuation signal to the upper-car safety gears 77 and the lower-car safety gears 78, respectively. This actuates the upper-car safety gears 77 and the lower-car safety gears 78, thus braking the upper car 71 and the lower car 72.

In addition to providing the same effects as those of Embodiment 6, the above-described elevator apparatus, in which the upper-car speed sensor 73 is electrically connected to only the upper-car output portion 81 and the lower-car speed sensor 74 is electrically connected to only the lower-car output portion 82, obviates the need to provide electrical wiring between the upper-car speed sensor 73 and the lower-car output portion 82 and between the lower-car speed sensor 74 and the upper-car output portion 81, making it possible to simplify the electrical wiring installation.

Embodiment 8

Figure 14:
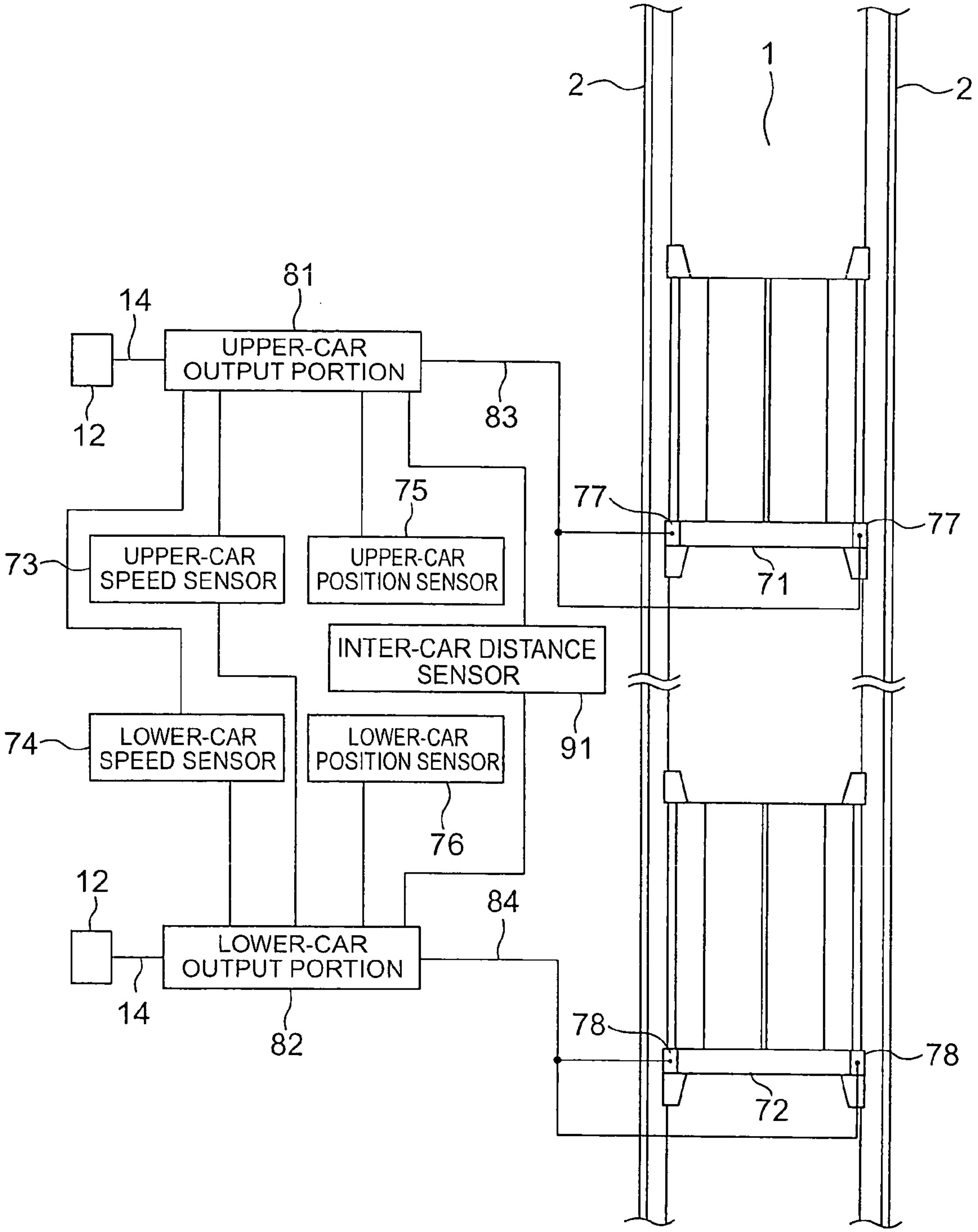
FIG. 14 is a schematic diagram showing an elevator apparatus according to Embodiment 8 of the present invention.

FIG. 14 is a schematic diagram showing an elevator apparatus according to Embodiment 8 of the present invention. Referring to FIG. 14, mounted to the upper car 71 and the lower car 72 is an inter-car distance sensor 91 serving as inter-car distance detecting means for detecting the distance between the upper car 71 and the lower car 72. The inter-car distance sensor 91 includes a laser irradiation portion mounted on the upper car 71 and a reflection portion mounted on the lower car 72. The distance between the upper car 71 and the lower car 72 is obtained by the inter-car distance sensor 91 based on the reciprocation time of laser light between the laser irradiation portion and the reflection portion.

The upper-car speed sensor 73, the lower-car speed sensor 74, the upper-car position sensor 75, and the inter-car distance sensor 91 are electrically connected to the upper-car output portion 81. The upper-car speed sensor 73, the lower-car speed sensor 74, the lower-car position sensor 76, and the inter-car distance sensor 91 are electrically connected to the lower-car output portion 82.

The upper-car output portion 81 predicts, on the basis of information (hereinafter referred to as "upper-car detection information" in this embodiment) from the upper-car speed sensor 73, the lower-car speed sensor 74, the upper-car position sensor 75, and the inter-car distance sensor 91, whether or not the upper car 71 will collide against the lower car 72, and outputs an actuation signal to the upper-car safety gears 77 upon predicting that a collision will occur.

The lower-car output portion 82 predicts, on the basis of information (hereinafter referred to as "lower-car detection information" in this embodiment) from the upper-car speed sensor 73, the lower-car speed sensor 74, the lower-car position sensor 76, and the inter-car distance sensor 91, whether or not the lower car 72 will collide against the upper car 71, and outputs an actuation signal to the lower-car safety gear 78 upon predicting that a collision will occur. Otherwise, this embodiment is of the same construction as Embodiment 7.

In the elevator apparatus as described above, the output portion 79 predicts whether or not a collision will occur between the upper car 71 and the lower car 72 based on the information from the inter-car distance sensor 91, making it possible to predict with improved reliability whether or not a collision will occur between the upper car 71 and the lower car 72.

It should be noted that the door closed sensor 58 of Embodiment 3 may be applied to the elevator apparatus as described in Embodiments 6 through 8 so that the output portion is input with the open/closed detection signal. It is also possible to apply the break detection lead wire 61 of Embodiment 4 here as well so that the output portion is input with the rope break signal.

Figure 15:
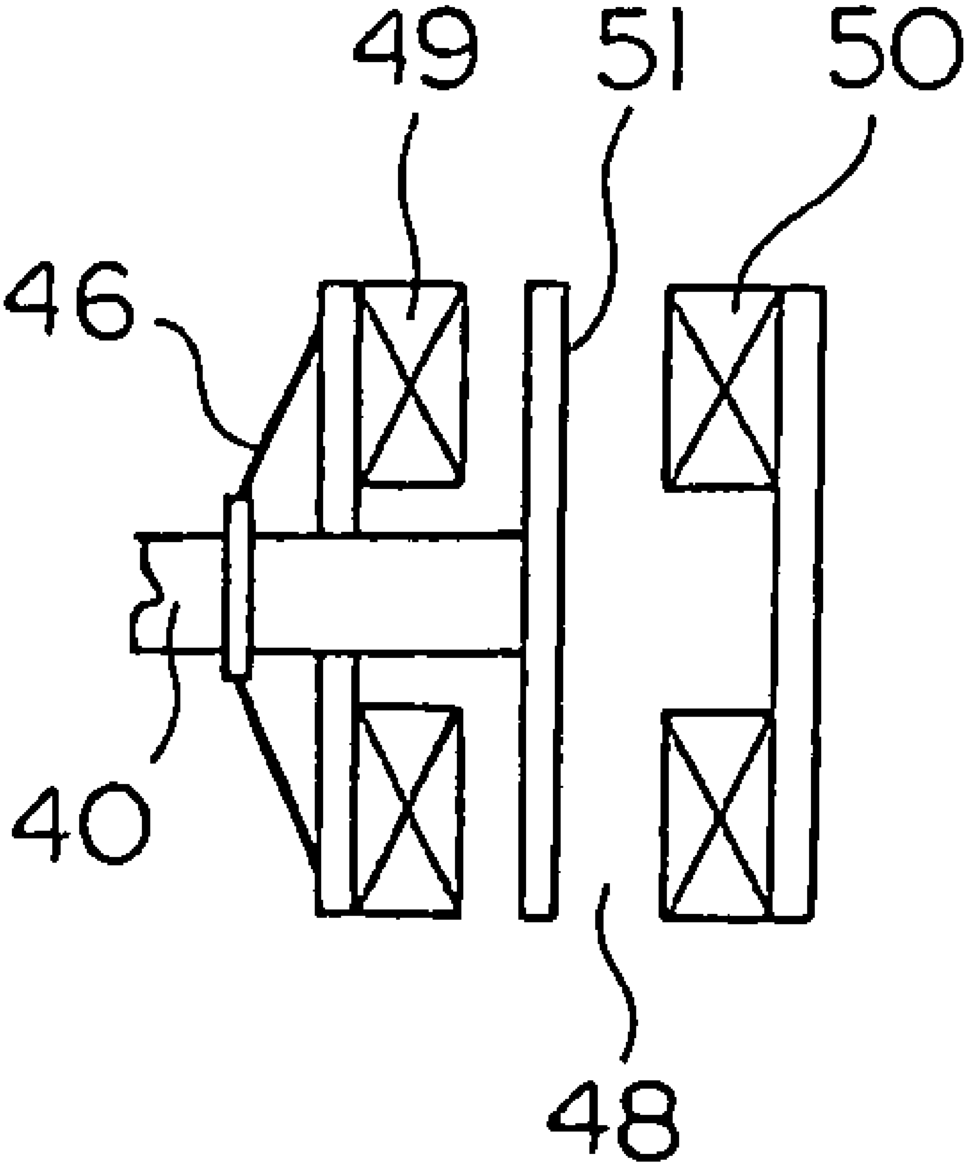
FIG. 15 is a front view showing another example of the drive portion shown in FIG. 7.

While the drive portion in Embodiments 2 through 8 described above is driven by utilizing the electromagnetic repulsion force or the electromagnetic attraction force between the first electromagnetic portion 49 and the second electromagnetic portion 50, the drive portion may be driven by utilizing, for example, an eddy current generated in a conductive repulsion plate. In this case, as shown in FIG. 15, a pulsed current is supplied as an actuation signal to the electromagnet 48, and the movable portion 40 is displaced through the interaction between an eddy current generated in a repulsion plate 51 fixed to the movable portion 40 and the magnetic field from the electromagnet 48.

While in Embodiments 2 through 8 described above the car speed detecting means is provided in the hoistway 1, it may also be mounted on the car. In this case, the speed detection signal from the car speed detecting means is transmitted to the output portion through the control cable.

Embodiment 9

Figure 16:
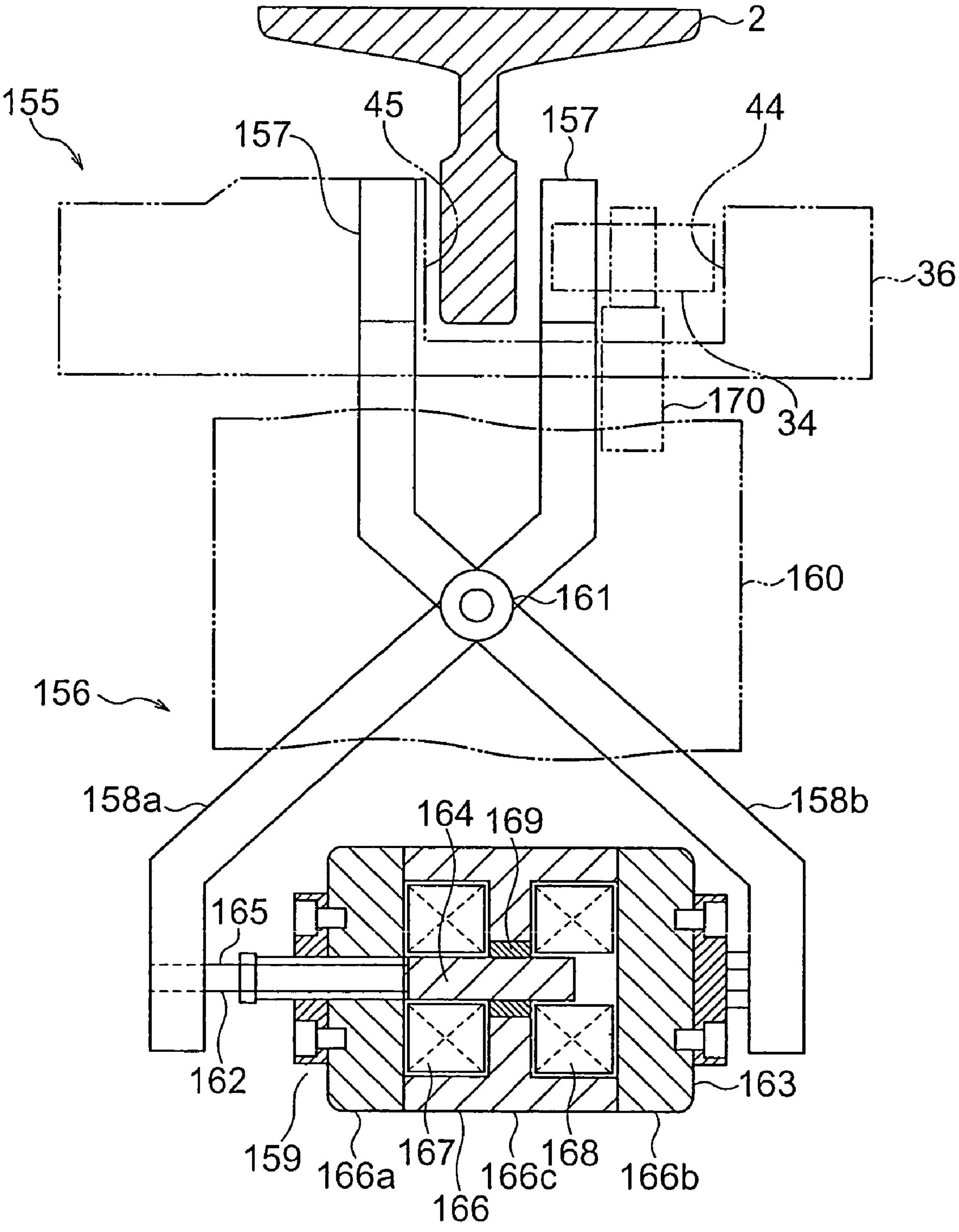
FIG. 16 is a plan view showing a safety gear according to Embodiment 9 of the present invention.

FIG. 16 is a plan view showing a safety gear according to Embodiment 9 of the present invention. Here, a safety gear 155 has the wedge 34, an actuator portion 156 connected to a lower portion of the wedge 34, and the guide portion 36 arranged above the wedge 34 and fixed to the car 3. The actuator portion 156 is vertically movable with respect to the guide portion 36 together with the wedge 34.

The actuator portion 156 has a pair of contact portions 157 capable of moving into and away from contact with the car guide rail 2, a pair of link members 158*a*, 158*b* each connected to one of the contact portions 157, an actuating mechanism 159 for displacing the link member 158*a* relative to the other link member 158*b* such that the respective contact portions 157 move into and away from contact with the car guide rail 2, and a support portion 160 supporting the contact portions 157, the link members 158*a*, 158*b*, and the actuating mechanism 159. A horizontal shaft 170, which passes through the wedge 34, is fixed to the support portion 160. The wedge 34 is capable of reciprocating displacement in the horizontal direction with respect to the horizontal shaft 170.

The link members 158*a*, 158*b* cross each other at a portion between one end to the other end portion thereof. Further, provided to the support portion 160 is a connection member 161 which pivotably connects the link member 158*a*, 158*b* together at the portion where the link members 158*a*, 158*b* cross each other. Further, the link member 158*a* is provided so as to be pivotable with respect to the other link member 158*b* about the connection member 161.

As the respective other end portions of the link member 158*a*, 158*b* are displaced so as to approach each other, each contact portion 157 is displaced into contact with the car guide rail 2. Likewise, as the respective other end portions of the link member 158*a*, 158*b* are displaced so as to separate away from each other, each contact portion 157 is displaced away from the car guide rail 2.

The actuating mechanism 159 is arranged between the respective other end portions of the link members 158*a*, 158*b*.

Further, the actuating mechanism 159 is supported by each of the link members 158*a*, 158*b*. Further, the actuating mechanism 159 includes a rod-like movable portion 162 connected to the link member 158*a*, and a drive portion 163 fixed to the other link member 158*b* and adapted to displace the movable portion 162 in a reciprocating manner. The actuating mechanism 159 is pivotable about the connection member 161 together with the link members 158*a*, 158*b*.

The movable portion 162 has a movable iron core 164 accommodated within the drive portion 163, and a connecting rod 165 connecting the movable iron core 164 and the link member 158*b* to each other. Further, the movable portion 162 is capable of reciprocating displacement between a contact position where the contact portions 157 come into contact with the car guide rail 2 and a separated position where the contact portions 157 are separated away from contact with the car guide rail 2.

The drive portion 163 has a stationary iron core 166 including a pair of regulating portions 166*a* and 166*b* regulating the displacement of the movable iron core 164 and a side wall portion 166*c* that connects the regulating members 166*a*, 166*b* to each other and, surrounding the movable iron core 164, a first coil 167 which is accommodated within the stationary iron core 166 and which, when supplied with electric current, causes the movable iron core 164 to be displaced into contact with the regulating portion 166*a*, a second coil 168 which is accommodated within the stationary iron core 166 and which, when supplied with electric current, causes the movable iron core 164 to be displaced into contact with the other regulating portion 166*b*, and an annular permanent magnet 169 arranged between the first coil 167 and the second coil 168.

The regulating member 166*a* is so arranged that the movable iron core 164 abuts on the regulating member 166*a* when the movable portion 162 is at the separated position. Further, the other regulating member 166*b* is so arranged that the movable iron core 164 abuts on the regulating member 166*b* when the movable portion 162 is at the contact position.

The first coil 167 and the second coil 168 are annular electromagnets that surround the movable portion 162. Further, the first coil 167 is arranged between the permanent magnet 169 and the regulating portion 166*a*, and the second coil 168 is arranged between the permanent magnet 169 and the other regulating portion 166*b*.

With the movable iron core 164 abutting on the regulating portion 166*a*, a space serving as a magnetic resistance exists between the movable iron core 164 and the other regulating member 166*b*, with the result that the amount of magnetic flux generated by the permanent magnet 169 becomes larger on the first coil 167 side than on the second coil 168 side. Thus, the movable iron core 164 is retained in position while still abutting on the regulating member 166*a*.

Further, with the movable iron core 164 abutting on the other regulating portion 166*b*, a space serving as a magnetic resistance exists between the movable iron core 164 and the regulating member 166*a*, with the result that the amount of magnetic flux generated by the permanent magnet 169 becomes larger on the second coil 168 side than on the first coil 167 side. Thus, the movable iron core 164 is retained in position while still abutting on the other regulating member 166*b*.

Electric power serving as an actuation signal from the output portion 32 can be input to the second coil 168. When input with the actuation signal, the second coil 168 generates a magnetic flux acting against the force that keeps the movable iron core 164 in abutment with the regulating portion 166*a*. Further, electric power serving as a recovery signal from the output portion 32 can be input to the first coil 167. When input with the recovery signal, the first coil 167 generates a magnetic flux acting against the force that keeps the movable iron core 164 in abutment with the other regulating portion 166*b*.

Otherwise, this embodiment is of the same construction as Embodiment 2.

Next, operation is described. During normal operation, the movable portion 162 is located at the separated position, with the movable iron core 164 being held in abutment on the regulating portion 166*a* by the holding force of the permanent magnet 169. With the movable iron core 164 abutting on the regulating portion 166*a*, the wedge 34 is maintained at a spacing from the guide portion 36 and separated away from the car guide rail 2.

Thereafter, as in Embodiment 2, by outputting an actuation signal to each safety gear 155 from the output portion 32, electric current is supplied to the second coil 168. This generates a magnetic flux around the second coil 168, which causes the movable iron core 164 to be displaced toward the other regulating portion 166*b*, that is, from the separated position to the contact position. As this happens, the contact portions 157 are displaced so as to approach each other, coming into contact with the car guide rail 2. Braking is thus applied to the wedge 34 and the actuator portion 155.

Thereafter, the guide portion 36 continues its descent, thus approaching the wedge 34 and the actuator portion 155. As a result, the wedge 34 is guided along the inclined surface 44, causing the car guide rail 2 to be held between the wedge 34 and the contact surface 45. Thereafter, the car 3 is braked through operations identical to those of Embodiment 2.

During the recovery phase, a recovery signal is transmitted from the output portion 32 to the first coil 167. As a result, a magnetic flux is generated around the first coil 167, causing the movable iron core 164 to be displaced from the contact position to the separated position. Thereafter, the press contact of the wedge 34 and the contact surface 45 with the car guide rail 2 is released in the same manner as in Embodiment 2.

In the elevator apparatus as described above, the actuating mechanism 159 causes the pair of contact portions 157 to be displaced through the intermediation of the link members 158*a*, 158*b*, whereby, in addition to the same effects as those of Embodiment 2, it is possible to reduce the number of actuating mechanisms 159 required for displacing the pair of contact portions 157.

Embodiment 10

Figure 17:
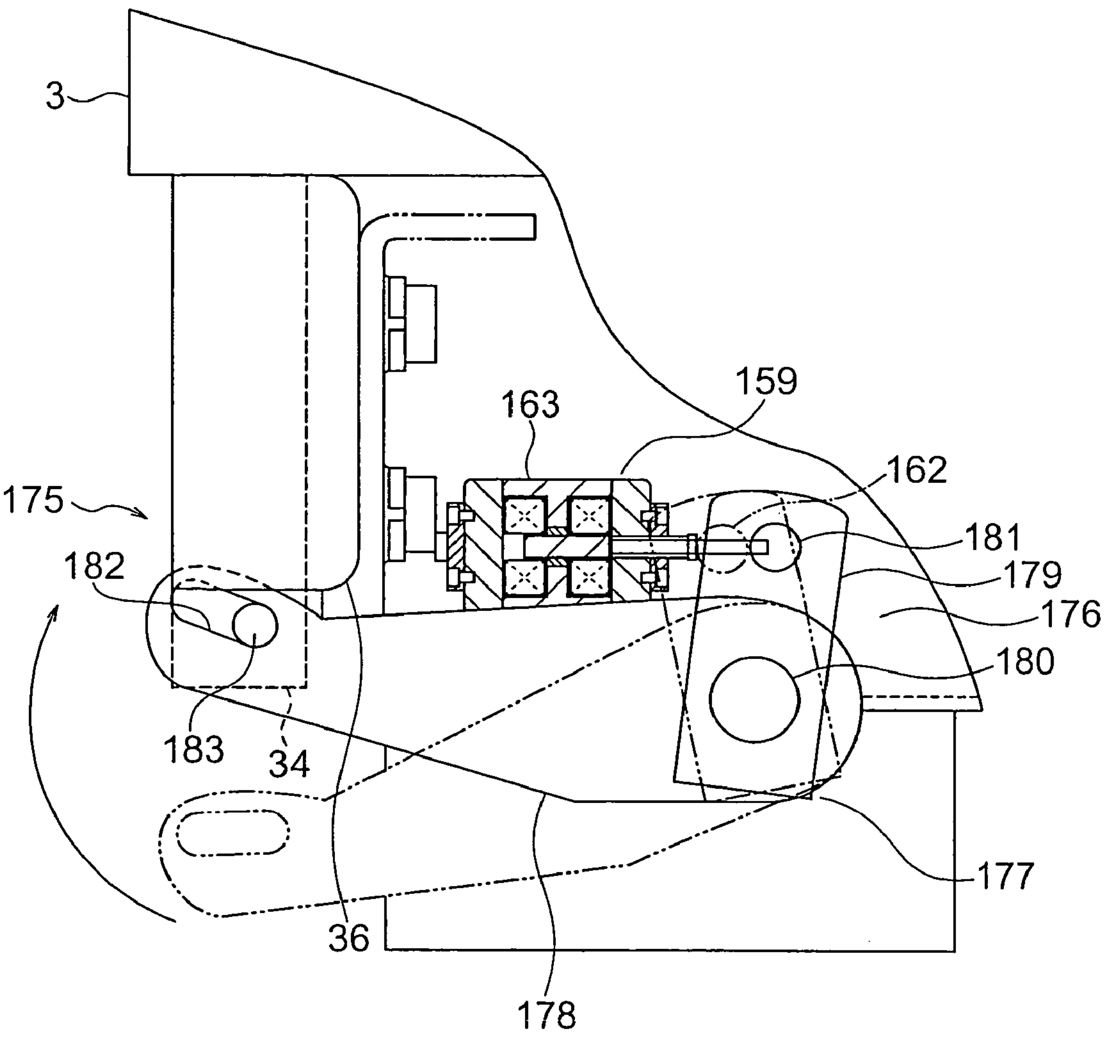
FIG. 17 is a partially cutaway side view showing a safety gear according to Embodiment 10 of the present invention.

FIG. 17 is a partially cutaway side view showing a safety gear according to Embodiment 10 of the present invention. Referring to FIG. 17, a safety gear 175 has the wedge 34, an actuator portion 176 connected to a lower portion of the wedge 34, and the guide portion 36 arranged above the wedge 34 and fixed to the car 3.

The actuator portion 176 has the actuating mechanism 159 constructed in the same manner as that of Embodiment 9, and a link member 177 displaceable through displacement of the movable portion 162 of the actuating mechanism 159.

The actuating mechanism 159 is fixed to a lower portion of the car 3 so as to allow reciprocating displacement of the movable portion 162 in the horizontal direction with respect to the car 3. The link member 177 is pivotably provided to a stationary shaft 180 fixed to a lower portion of the car 3. The stationary shaft 180 is arranged below the actuating mechanism 159.

The link member 177 has a first link portion 178 and a second link portion 179 which extend in different directions from the stationary shaft 180 taken as the start point. The overall configuration of the link member 177 is substantially a prone shape. That is, the second link portion 179 is fixed to the first link portion 178, and the first link portion 178 and the second link portion 179 are integrally pivotable about the stationary shaft 180.

The length of the first link portion 178 is larger than that of the second link portion 179. Further, an elongate hole 182 is provided at the distal end portion of the first link portion 178. A slide pin 183, which is slidably passed through the elongate hole 182, is fixed to a lower portion of the wedge 34. That is, the wedge 34 is slidably connected to the distal end portion of the first link portion 178. The distal end portion of the movable portion 162 is pivotably connected to the distal end portion of the second link portion 179 through the intermediation of a connecting pin 181.

The link member 177 is capable of reciprocating movement between a separated position where it keeps the wedge 34 separated away from and below the guide portion 36 and an actuating position where it causes the wedge 34 to wedge in between the car guide rail and the guide portion 36. The movable portion 162 is projected from the drive portion 163 when the link member 177 is at the separated position, and it is retracted into the drive portion 163 when the link member is at the actuating position.

Next, operation is described. During normal operation, the link member 177 is located at the separated position due to the retracting motion of the movable portion 162 into the drive portion 163. At this time, the wedge 34 is maintained at a spacing from the guide portion 36 and separated away from the car guide rail.

Thereafter, in the same manner as in Embodiment 2, an actuation signal is output from the output portion 32 to each safety gear 175, causing the movable portion 162 to advance. As a result, the link member 177 is pivoted about the stationary shaft 180 for displacement into the actuating position. This causes the wedge 34 to come into contact with the guide portion 36 and the car guide rail, wedging in between the guide portion 36 and the car guide rail. Braking is thus applied to the car 3.

During the recovery phase, a recovery signal is transmitted from the output portion 32 to each safety gear 175, causing the movable portion 162 to be urged in the retracting direction. The car 3 is raised in this state, thus releasing the wedging of the wedge 34 in between the guide portion 36 and the car guide rail.

The above-described elevator apparatus also provides the same effects as those of Embodiment 2.

Embodiment 11

Figure 18:
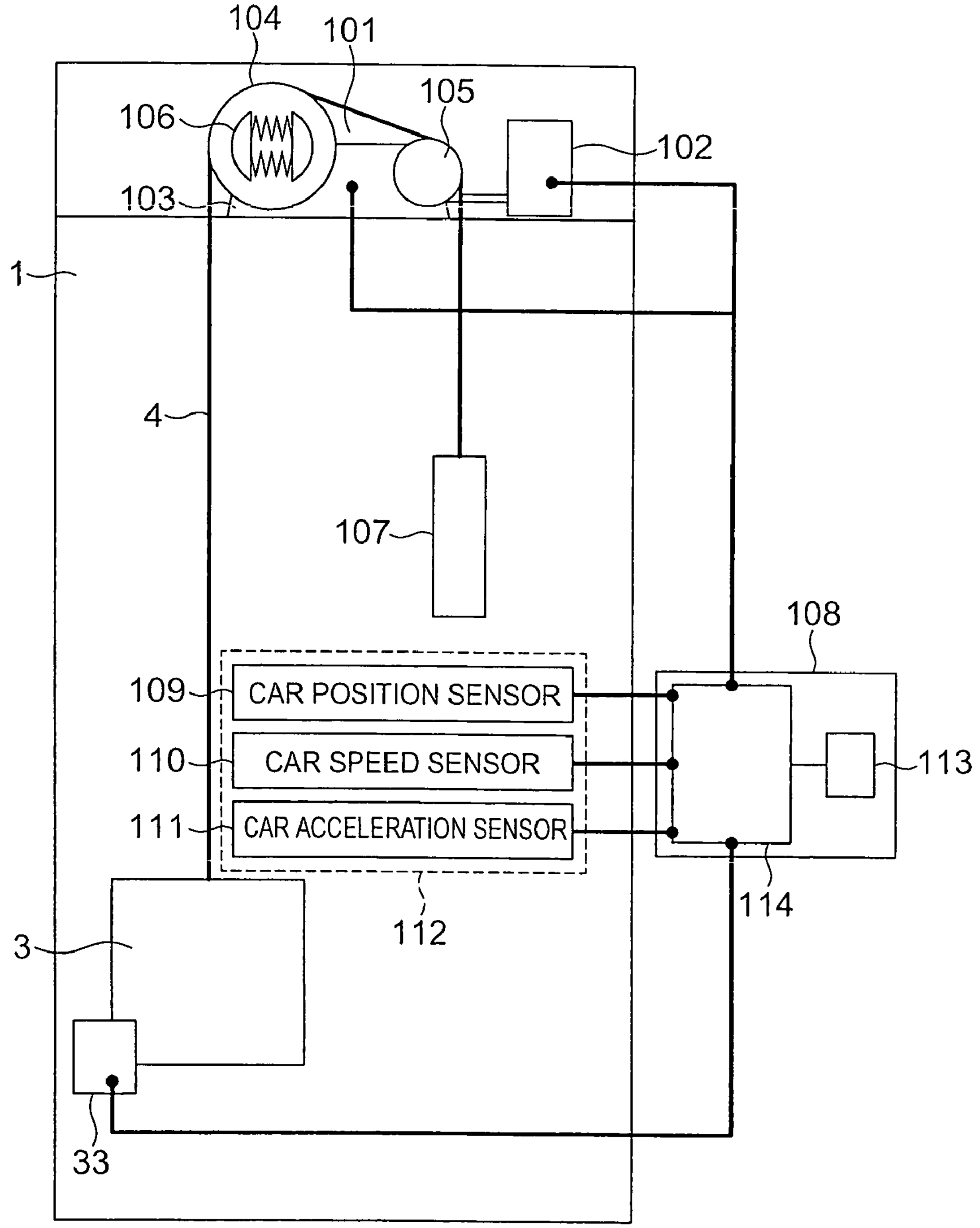
FIG. 18 is a schematic diagram showing an elevator apparatus according to Embodiment 11 of the present invention.

FIG. 18 is a schematic diagram showing an elevator apparatus according to Embodiment 11 of the present invention. In FIG. 18, a hoisting machine 101 serving as a driving device and a control panel 102 are provided in an upper portion within the hoistway 1. The control panel 102 is electrically connected to the hoisting machine 101 and controls the operation of the elevator. The hoisting machine 101 has a driving device main body 103 including a motor and a driving sheave 104 rotated by the driving device main body 103. A plurality of main ropes 4 are wrapped around the sheave 104. The hoisting machine 101 further includes a deflector sheave 105 around which each main rope 4 is wrapped, and a hoisting machine braking device (deceleration braking device) 106 for braking the rotation of the drive sheave 104 to decelerate the car 3. The car 3 and a counter weight 107 are suspended in the hoistway 1 by means of the main ropes 4. The car 3 and the counterweight 107 are raised and lowered in the hoistway 1 by driving the hoisting machine 101.

The safety gear 33, the hoisting machine braking device 106, and the control panel 102 are electrically connected to a monitor device 108 that constantly monitors the state of the elevator. A car position sensor 109, a car speed sensor 110, and a car acceleration sensor 111 are also electrically connected to the monitor device 108. The car position sensor 109, the car speed sensor 110, and the car acceleration sensor 111 respectively serve as a car position detecting portion for detecting the speed of the car 3, a car speed detecting portion for detecting the speed of the car 3, and a car acceleration detecting portion for detecting the acceleration of the car 3. The car position sensor 109, the car speed sensor 110, and the car acceleration sensor 111 are provided in the hoistway 1.

Detection means 112 for detecting the state of the elevator includes the car position sensor 109, the car speed sensor 110, and the car acceleration sensor 111. Any of the following may be used for the car position sensor 109: an encoder that detects the position of the car 3 by measuring the amount of rotation of a rotary member that rotates as the car 3 moves; a linear encoder that detects the position of the car 3 by measuring the amount of linear displacement of the car 3; an optical displacement measuring device which includes, for example, a projector and a photodetector provided in the hoistway 1 and a reflection plate provided in the car 3, and which detects the position of the car 3 by measuring how long it takes for light projected from the projector to reach the photodetector.

The monitor device 108 includes a memory portion 113 and an output portion (calculation portion) 114. The memory portion 113 stores in advance a variety of (in this embodiment, two) abnormality determination criteria (set data) serving as criteria for judging whether or not there is an abnormality in the elevator. The output portion 114 detects whether or not there is an abnormality in the elevator based on information from the detection means 112 and the memory portion 113. The two kinds of abnormality determination criteria stored in the memory portion 113 in this embodiment are car speed abnormality determination criteria relating to the speed of the car 3 and car acceleration abnormality determination criteria relating to the acceleration of the car 3.

Figure 19:
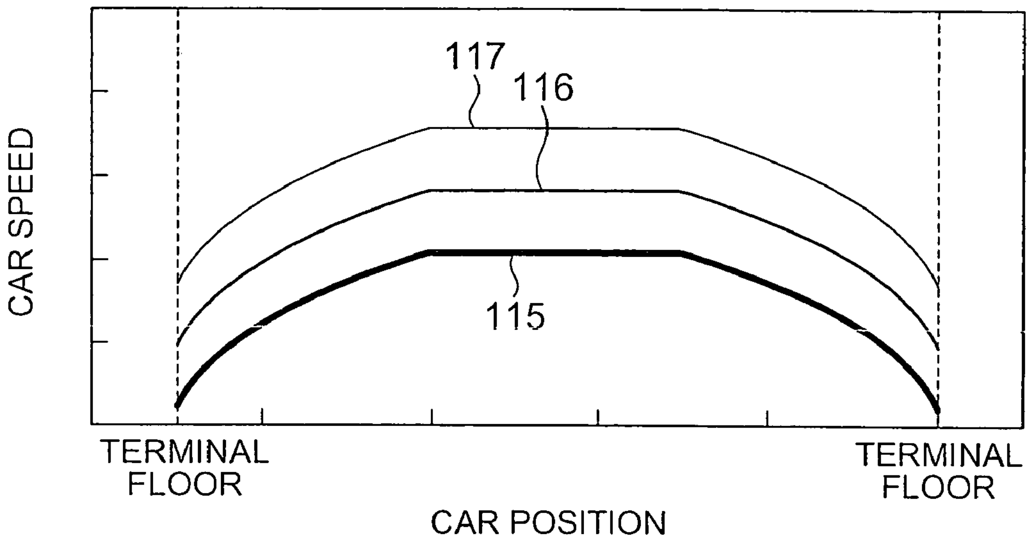
FIG. 19 is a graph showing the car speed abnormality determination criteria stored in the memory portion of FIG. 18.

FIG. 19 is a graph showing the car speed abnormality determination criteria stored in the memory portion 113 of FIG. 18. In FIG. 19, an ascending/descending section of the car 3 in the hoistway 1 (a section between one terminal floor and an other terminal floor) includes acceleration/deceleration sections and a constant speed section located between the acceleration/deceleration sections. The car 3 accelerates/decelerates in the acceleration/deceleration sections respectively located in the vicinity of the one terminal floor and the other terminal floor. The car 3 travels at a constant speed in the constant speed section.

The car speed abnormality determination criteria has three detection patterns each associated with the position of the car 3. That is, a normal speed detection pattern (normal level) 115 that is the speed of the car 3 during normal operation, a first abnormal speed detection pattern (first abnormal level) 116 having a larger value than the normal speed detection pattern 115, and a second abnormal speed detection pattern (second abnormal level) 117 having a larger value than the first abnormal speed detection pattern 116 are set, each in association with the position of the car 3.

The normal speed detection pattern 115, the first abnormal speed detection pattern 116, and a second abnormal speed detection pattern 117 are set so as to have a constant value in the constant speed section, and to have a value continuously becoming smaller toward the terminal floor in each of the acceleration and deceleration sections. The difference in value between the first abnormal speed detection pattern 116 and the normal speed detection pattern 115, and the difference in value between the second abnormal speed detection pattern 117 and the first abnormal speed detection pattern 116, are set to be substantially constant at all locations in the ascending/descending section.

Figure 20:
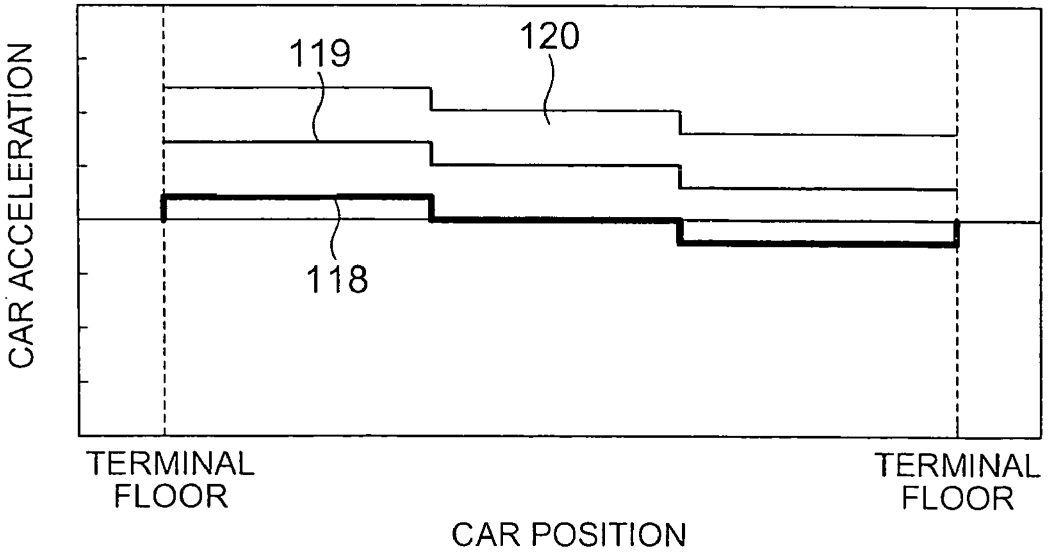
FIG. 20 is a graph showing the car acceleration abnormality determination criteria stored in the memory portion of FIG. 18.

FIG. 20 is a graph showing the car acceleration abnormality determination criteria stored in the memory portion 113 of FIG. 18. In FIG. 20, the car acceleration abnormality determination criteria has three detection patterns each associated with the position of the car 3. That is, a normal acceleration detection pattern (normal level) 118 that is the acceleration of the car 3 during normal operation, a first abnormal acceleration detection pattern (first abnormal level) 119 having a larger value than the normal acceleration detection pattern 118, and a second abnormal acceleration detection pattern (second abnormal level) 120 having a larger value than the first abnormal acceleration detection pattern 119 are set, each in association with the position of the car 3.

The normal acceleration detection pattern 118, the first abnormal acceleration detection pattern 119, and the second abnormal acceleration detection pattern 120 are each set so as to have a value of zero in the constant speed section, a positive value in one of the acceleration/deceleration section, and a negative value in the other acceleration/deceleration section. The difference in value between the first abnormal acceleration detection pattern 119 and the normal acceleration detection pattern 118, and the difference in value between the second abnormal acceleration detection pattern 120 and the first abnormal acceleration detection pattern 119, are set to be substantially constant at all locations in the ascending/descending section.

That is, the memory portion 113 stores the normal speed detection pattern 115, the first abnormal speed detection pattern 116, and the second abnormal speed detection pattern 117 as the car speed abnormality determination criteria, and stores the normal acceleration detection pattern 118, the first abnormal acceleration detection pattern 119, and the second abnormal acceleration detection pattern 120 as the car acceleration abnormality determination criteria.

The safety gear 33, the control panel 102, the hoisting machine braking device 106, the detection means 112, and the memory portion 113 are electrically connected to the output portion 114. Further, a position detection signal, a speed detection signal, and an acceleration detection signal are input to the output portion 114 continuously over time from the car position sensor 109, the car speed sensor 110, and the car acceleration sensor 111. The output portion 114 calculates the position of the car 3 based on the input position detection signal. The output portion 114 also calculates the speed of the car 3 and the acceleration of the car 3 based on the input speed detection signal and the input acceleration detection signal, respectively, as a variety of (in this example, two) abnormality determination factors.

The output portion 114 outputs an actuation signal (trigger signal) to the hoisting machine braking device 106 when the speed of the car 3 exceeds the first abnormal speed detection pattern 116, or when the acceleration of the car 3 exceeds the first abnormal acceleration detection pattern 119. At the same time, the output portion 114 outputs a stop signal to the control panel 102 to stop the drive of the hoisting machine 101. When the speed of the car 3 exceeds the second abnormal speed detection pattern 117, or when the acceleration of the car 3 exceeds the second abnormal acceleration detection pattern 120, the output portion 114 outputs an actuation signal to the hoisting machine braking device 106 and the safety gear 33. That is, the output portion 114 determines to which braking means it should output the actuation signals according to the degree of the abnormality in the speed and the acceleration of the car 3.

Otherwise, this embodiment is of the same construction as Embodiment 2.

Next, operation is described. When the position detection signal, the speed detection signal, and the acceleration detection signal are input to the output portion 114 from the car position sensor 109, the car speed sensor 110, and the car acceleration sensor 111, respectively, the output portion 114 calculates the position, the speed, and the acceleration of the car 3 based on the respective detection signals thus input. After that, the output portion 114 compares the car speed abnormality determination criteria and the car acceleration abnormality determination criteria obtained from the memory portion 113 with the speed and the acceleration of the car 3 calculated based on the respective detection signals input. Through this comparison, the output portion 114 detects whether or not there is an abnormality in either the speed or the acceleration of the car 3.

During normal operation, the speed of the car 3 has approximately the same value as the normal speed detection pattern, and the acceleration of the car 3 has approximately the same value as the normal acceleration detection pattern. Thus, the output portion 114 detects that there is no abnormality in either the speed or the acceleration of the car 3, and normal operation of the elevator continues.

When, for example, the speed of the car 3 abnormally increases and exceeds the first abnormal speed detection pattern 116 due to some cause, the output portion 114 detects that there is an abnormality in the speed of the car 3. Then, the output portion 114 outputs an actuation signal and a stop signal to the hoisting machine braking device 106 and the control panel 102, respectively. As a result, the hoisting machine 101 is stopped, and the hoisting machine braking device 106 is operated to brake the rotation of the drive sheave 104.

When the acceleration of the car 3 abnormally increases and exceeds the first abnormal acceleration set value 119, the output portion 114 outputs an actuation signal and a stop signal to the hoisting machine braking device 106 and the control panel 102, respectively, thereby braking the rotation of the drive sheave 104.

If the speed of the car 3 continues to increase after the actuation of the hoisting machine braking device 106 and exceeds the second abnormal speed set value 117, the output portion 114 outputs an actuation signal to the safety gear 33 while still outputting the actuation signal to the hoisting machine braking device 106. Thus, the safety gear 33 is actuated and the car 3 is braked through the same operation as that of Embodiment 2.

Further, when the acceleration of the car 3 continues to increase after the actuation of the hoisting machine braking device 106, and exceeds the second abnormal acceleration set value 120, the output portion 114 outputs an actuation signal to the safety gear 33 while still outputting the actuation signal to the hoisting machine braking device 106. Thus, the safety gear 33 is actuated.

With such an elevator apparatus, the monitor device 108 obtains the speed of the car 3 and the acceleration of the car 3 based on the information from the detection means 112 for detecting the state of the elevator. When the monitor device 108 judges that there is an abnormality in the obtained speed of the car 3 or the obtained acceleration of the car 3, the monitor device 108 outputs an actuation signal to at least one of the hoisting machine braking device 106 and the safety gear 33. That is, judgment of the presence or absence of an abnormality is made by the monitor device 108 separately for a variety of abnormality determination factors such as the speed of the car and the acceleration of the car. Accordingly, an abnormality in the elevator can be detected earlier and more reliably. Therefore, it takes a shorter time for the braking force on the car 3 to be generated after occurrence of an abnormality in the elevator.

Further, the monitor device 108 includes the memory portion 113 that stores the car speed abnormality determination criteria used for judging whether or not there is an abnormality in the speed of the car 3, and the car acceleration abnormality determination criteria used for judging whether or not there is an abnormality in the acceleration of the car 3. Therefore, it is easy to change the judgment criteria used for judging whether or not there is an abnormality in the speed and the acceleration of the car 3, respectively, allowing easy adaptation to design changes or the like of the elevator.

Further, the following patterns are set for the car speed abnormality determination criteria: the normal speed detection pattern 115, the first abnormal speed detection pattern 116 having a larger value than the normal speed detection pattern 115, and the second abnormal speed detection pattern 117 having a larger value than the first abnormal speed detection pattern 116. When the speed of the car 3 exceeds the first abnormal speed detection pattern 116, the monitor device 108 outputs an actuation signal to the hoisting machine braking device 106, and when the speed of the car 3 exceeds the second abnormal speed detection pattern 117, the monitor device 108 outputs an actuation signal to the hoisting machine braking device 106 and the safety gear 33. Therefore, the car 3 can be braked stepwise according to the degree of this abnormality in the speed of the car 3. As a result, the frequency of large shocks exerted on the car 3 can be reduced, and the car 3 can be more reliably stopped.

Further, the following patterns are set for the car acceleration abnormality determination criteria: the normal acceleration detection pattern 118, the first abnormal acceleration detection pattern 119 having a larger value than the normal acceleration detection pattern 118, and the second abnormal acceleration detection pattern 120 having a larger value than the first abnormal acceleration detection pattern 119. When the acceleration of the car 3 exceeds the first abnormal acceleration detection pattern 119, the monitor device 108 outputs an actuation signal to the hoisting machine braking device 106, and when the acceleration of the car 3 exceeds the second abnormal acceleration detection pattern 120, the monitor device 108 outputs an actuation signal to the hoisting machine braking device 106 and the safety gear 33. Therefore, the car 3 can be braked stepwise according to the degree of an abnormality in the acceleration of the car 3. Normally, an abnormality occurs in the acceleration of the car 3 before an abnormality occurs in the speed of the car 3. As a result, the frequency of large shocks exerted on the car 3 can be reduced, and the car 3 can be more reliably stopped.

Further, the normal speed detection pattern 115, the first abnormal speed detection pattern 116, and the second abnormal speed detection pattern 117 are each set in association with the position of the car 3. Therefore, the first abnormal speed detection pattern 116 and the second abnormal speed detection pattern 117 each can be set in association with the normal speed detection pattern 115 at all locations in the ascending/descending section of the car 3. In the acceleration/deceleration sections, in particular, the first abnormal speed detection pattern 116 and the second abnormal speed detection pattern 117 each can be set to a relatively small value because the normal speed detection pattern 115 has a small value. As a result, the impact acting on the car 3 upon braking can be mitigated.

It should be noted that in the above-described example, the car speed sensor 110 is used when the monitor 108 obtains the speed of the car 3. However, instead of using the car speed sensor 110, the speed of the car 3 may be obtained from the position of the car 3 detected by the car position sensor 109. That is, the speed of the car 3 may be obtained by differentiating the position of the car 3 calculated by using the position detection signal from the car position sensor 109.

Further, in the above-described example, the car acceleration sensor 111 is used when the monitor 108 obtains the acceleration of the car 3. However, instead of using the car acceleration sensor 111, the acceleration of the car 3 may be obtained from the position of the car 3 detected by the car position sensor 109. That is, the acceleration of the car 3 may be obtained by differentiating, twice, the position of the car 3 calculated by using the position detection signal from the car position sensor 109.

Further, in the above-described example, the output portion 114 determines to which braking means it should output the actuation signals according to the degree of the abnormality in the speed and acceleration of the car 3 constituting the abnormality determination factors. However, the braking means to which the actuation signals are to be output may be determined in advance for each abnormality determination factor.

Embodiment 12

Figure 21:
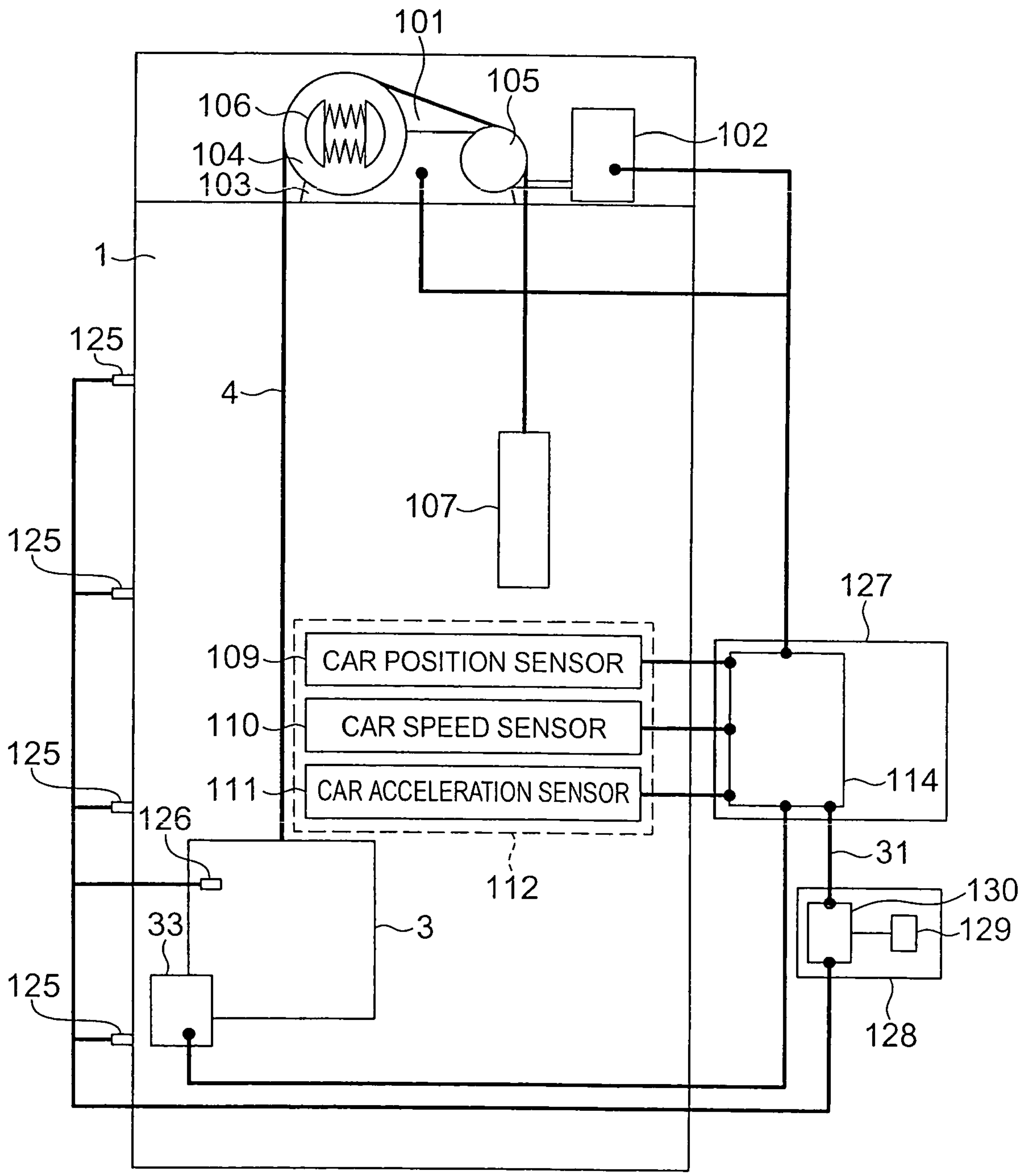
FIG. 21 is a schematic diagram showing an elevator apparatus according to Embodiment 12 of the present invention.

FIG. 21 is a schematic diagram showing an elevator apparatus according to Embodiment 12 of the present invention. In FIG. 21, a plurality of hall call buttons 125 are provided in the hall of each floor. A plurality of destination floor buttons 126 are provided in the car 3. A monitor device 127 has the output portion 114. An abnormality determination criteria generating device 128 for generating a car speed abnormality determination criteria and a car acceleration abnormality determination criteria is electrically connected to the output portion 114. The abnormality determination criteria generating device 128 is electrically connected to each hall call button 125 and each destination floor button 126. A position detection signal is input to the abnormality determination criteria generating device 128 from the car position sensor 109 via the output portion 114.

The abnormality determination criteria generating device 128 includes a memory portion 129 and a generation portion 130. The memory portion 129 stores a plurality of car speed abnormality determination criteria and a plurality of car acceleration abnormality determination criteria, which serve as abnormal judgment criteria for all the cases where the car 3 ascends and descends between the floors. The generation portion 130 selects a car speed abnormality determination criteria and a car acceleration abnormality determination criteria one by one from the memory portion 129, and outputs the car speed abnormality determination criteria and the car acceleration abnormality determination criteria to the output portion 114.

Each car speed abnormality determination criteria has three detection patterns each associated with the position of the car 3, which are similar to those of FIG. 19 of Embodiment 11. Further, each car acceleration abnormality determination criteria has three detection patterns each associated with the position of the car 3, which are similar to those of FIG. 20 of Embodiment 11.

The generation portion 130 calculates a detection position of the car 3 based on information from the car position sensor 109, and calculates a target floor of the car 3 based on information from at least one of the hall call buttons 125 and the destination floor buttons 126. The generation portion 130 selects one by one a car speed abnormality determination criteria and a car acceleration abnormality determination criteria used for a case where the calculated detection position and the target floor are one and the other of the terminal floors.

Otherwise, this embodiment is of the same construction as Embodiment 11.

Next, operation is described. A position detection signal is constantly input to the generation portion 130 from the car position sensor 109 via the output portion 114. When a passenger or the like selects any one of the hall call buttons 125 or the destination floor buttons 126 and a call signal is input to the generation portion 130 from the selected button, the generation portion 130 calculates a detection position and a target floor of the car 3 based on the input position detection signal and the input call signal, and selects one out of both a car speed abnormality determination criteria and a car acceleration abnormality determination criteria. After that, the generation portion 130 outputs the selected car speed abnormality determination criteria and the selected car acceleration abnormality determination criteria to the output portion 114.

The output portion 114 detects whether or not there is an abnormality in the speed and the acceleration of the car 3 in the same way as in Embodiment 11. Thereafter, this embodiment is of the same operation as Embodiment 9.

With such an elevator apparatus, the car speed abnormality determination criteria and the car acceleration abnormality determination criteria are generated based on the information from at least one of the hall call buttons 125 and the destination floor buttons 126. Therefore, it is possible to generate the car speed abnormality determination criteria and the car acceleration abnormality determination criteria corresponding to the target floor. As a result, the time it takes for the braking force on the car 3 to be generated after occurrence of an abnormality in the elevator can be reduced even when a different target floor is selected.

It should be noted that in the above-described example, the generation portion 130 selects one out of both the car speed abnormality determination criteria and car acceleration abnormality determination criteria from among a plurality of car speed abnormality determination criteria and a plurality of car acceleration abnormality determination criteria stored in the memory portion 129. However, the generation portion may directly generate an abnormal speed detection pattern and an abnormal acceleration detection pattern based on the normal speed pattern and the normal acceleration pattern of the car 3 generated by the control panel 102.

Embodiment 13

Figure 22:
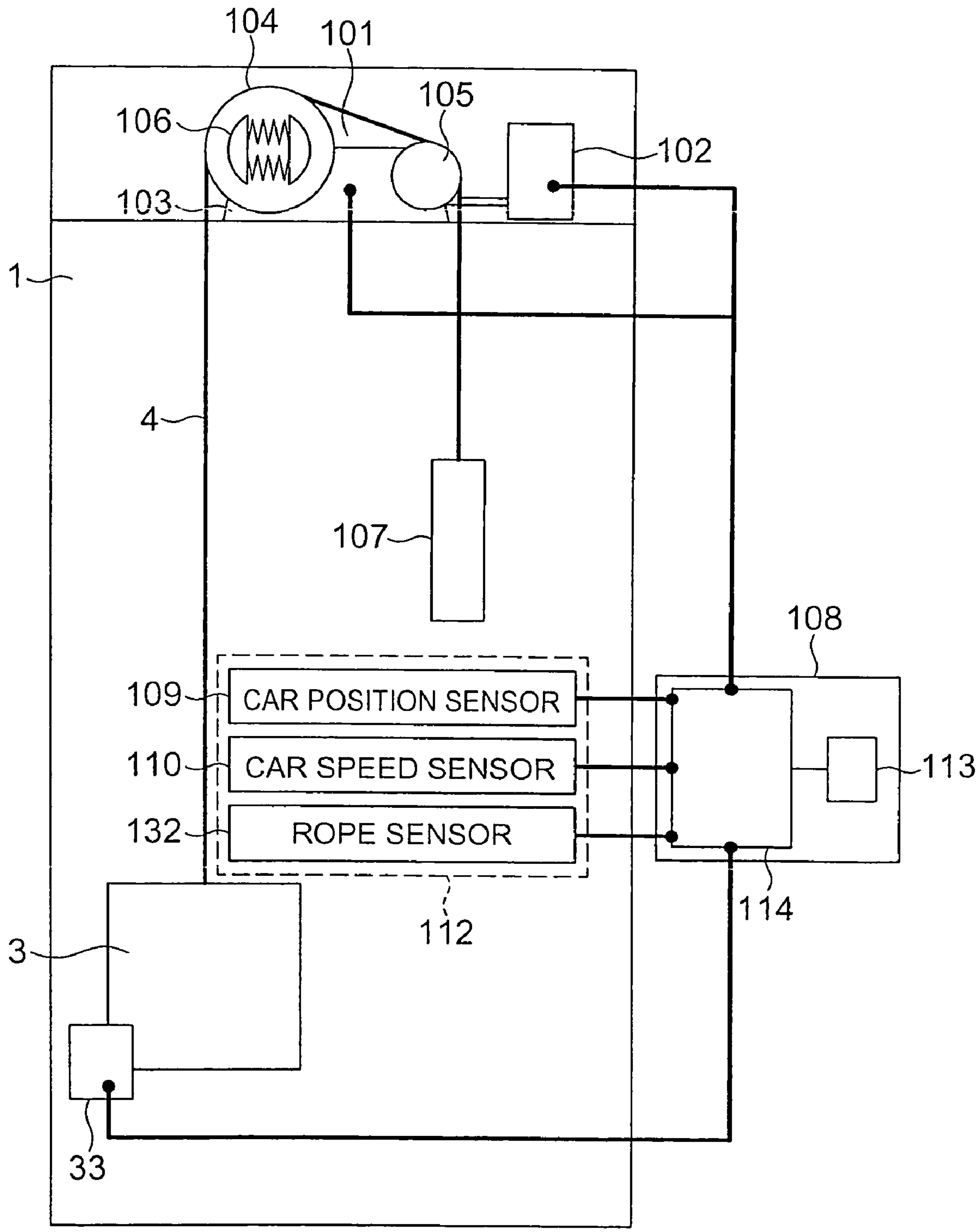
FIG. 22 is a schematic diagram showing an elevator apparatus according to Embodiment 13 of the present invention.
Figure 23:
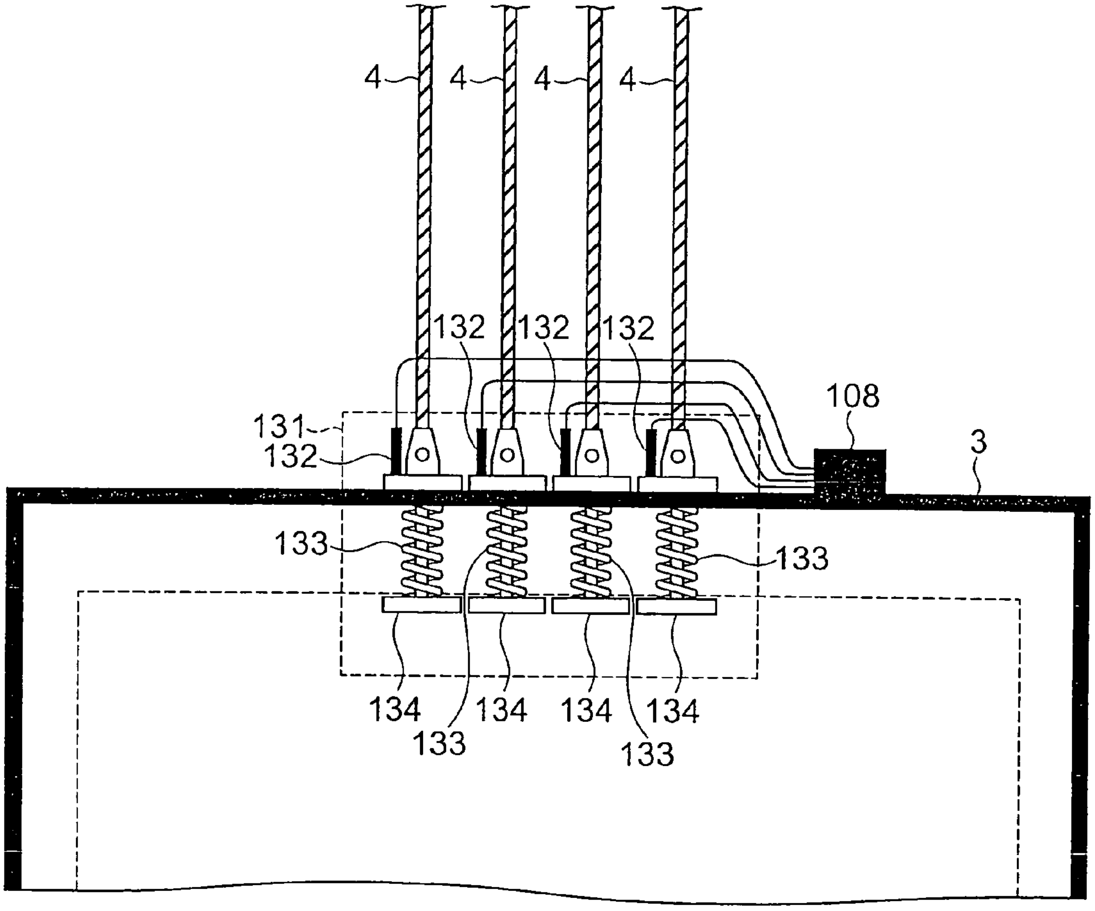
FIG. 23 is a diagram showing the rope fastening device and the rope sensors of FIG. 22.

FIG. 22 is a schematic diagram showing an elevator apparatus according to Embodiment 13 of the present invention. In this example, each of the main ropes 4 is connected to an upper portion of the car 3 via a rope fastening device 131 (FIG. 23). The monitor device 108 is mounted on an upper portion of the car 3. The car position sensor 109, the car speed sensor 110, and a plurality of rope sensors 132 are electrically connected to the output portion 114. Rope sensors 132 are provided in the rope fastening device 131, and each serve as a rope break detecting portion for detecting whether or not a break has occurred in each of the ropes 4. The detection means 112 includes the car position sensor 109, the car speed sensor 110, and the rope sensors 132.

The rope sensors 132 each output a rope brake detection signal to the output portion 114 when the main ropes 4 break. The memory portion 113 stores the car speed abnormality determination criteria similar to that of Embodiment 11 shown in FIG. 19, and a rope abnormality determination criteria used as a reference for judging whether or not there is an abnormality in the main ropes 4.

A first abnormal level indicating a state where at least one of the main ropes 4 have broken, and a second abnormal level indicating a state where all of the main ropes 4 has broken are set for the rope abnormality determination criteria.

The output portion 114 calculates the position of the car 3 based on the input position detection signal. The output portion 114 also calculates the speed of the car 3 and the state of the main ropes 4 based on the input speed detection signal and the input rope brake signal, respectively, as a variety of (in this example, two) abnormality determination factors.

The output portion 114 outputs an actuation signal (trigger signal) to the hoisting machine braking device 106 when the speed of the car 3 exceeds the first abnormal speed detection pattern 116 (FIG. 19), or when at least one of the main ropes 4 breaks. When the speed of the car 3 exceeds the second abnormal speed detection pattern 117 (FIG. 19), or when all of the main ropes 4 break, the output portion 114 outputs an actuation signal to the hoisting machine braking device 106 and the safety gear 33. That is, the output portion 114 determines to which braking means it should output the actuation signals according to the degree of an abnormality in the speed of the car 3 and the state of the main ropes 4.

Figure 24:
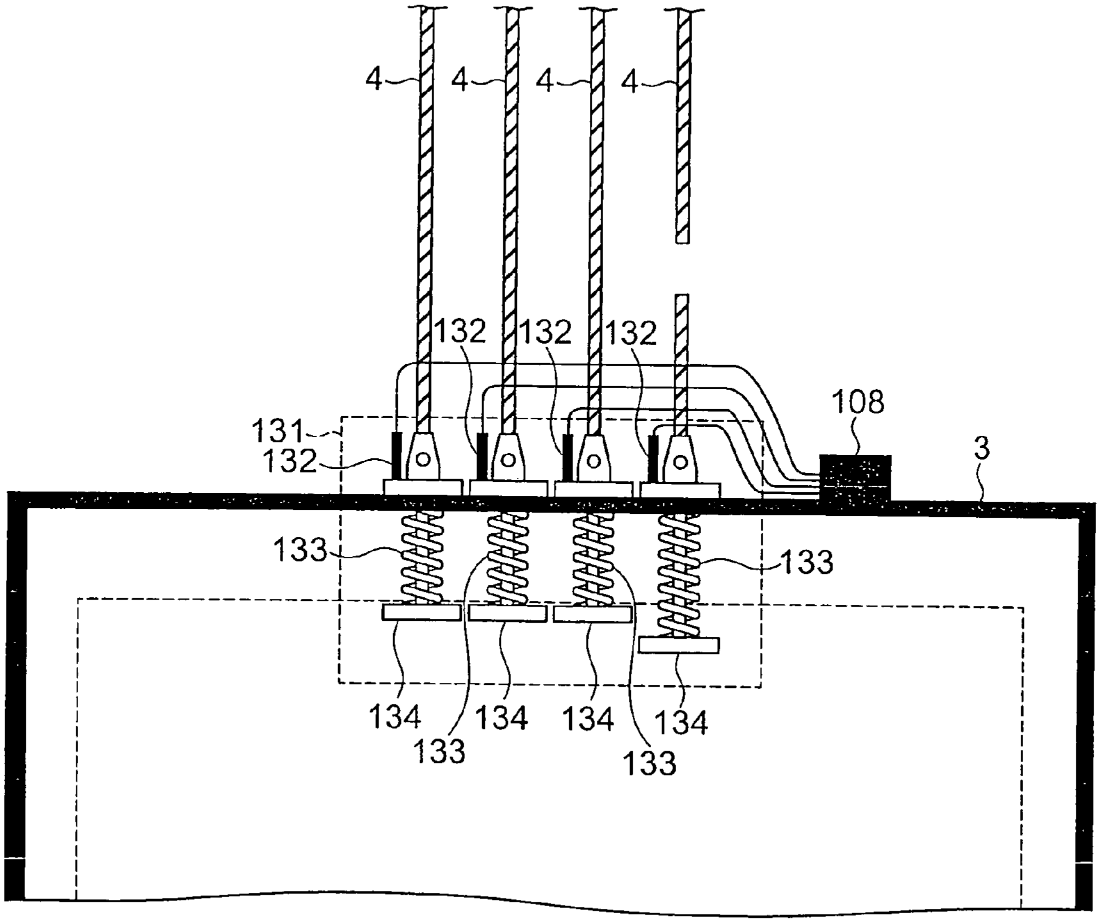
FIG. 24 is a diagram showing a state where one of the main ropes of FIG. 23 has broken.

FIG. 23 is a diagram showing the rope fastening device 131 and the rope sensors 132 of FIG. 22. FIG. 24 is a diagram showing a state where one of the main ropes 4 of FIG. 23 has broken. In FIGS. 23 and 24, the rope fastening device 131 includes a plurality of rope connection portions 134 for connecting the main ropes 4 to the car 3. The rope connection portions 134 each include an spring 133 provided between the main rope 4 and the car 3. The position of the car 3 is displaceable with respect to the main ropes 4 by the expansion and contraction of the springs 133.

The rope sensors 132 are each provided to the rope connection portion 134. The rope sensors 132 each serve as a displacement measuring device for measuring the amount of expansion of the spring 133. Each rope sensor 132 constantly outputs a measurement signal corresponding to the amount of expansion of the spring 133 to the output portion 114. A measurement signal obtained when the expansion of the spring 133 returning to its original state has reached a predetermined amount is input to the output portion 114 as a break detection signal. It should be noted that each of the rope connection portions 134 may be provided with a scale device that directly measures the tension of the main ropes 4.

Otherwise, this embodiment is of the same construction as Embodiment 11.

Next, operation is described. When the position detection signal, the speed detection signal, and the break detection signal are input to the output portion 114 from the car position sensor 109, the car speed sensor 110, and each rope sensor 131, respectively, the output portion 114 calculates the position of the car 3, the speed of the car 3, and the number of main ropes 4 that have broken based on the respective detection signals thus input. After that, the output portion 114 compares the car speed abnormality determination criteria and the rope abnormality determination criteria obtained from the memory portion 113 with the speed of the car 3 and the number of broken main ropes 4 calculated based on the respective detection signals input. Through this comparison, the output portion 114 detects whether or not there is an abnormality in both the speed of the car 3 and the state of the main ropes 4.

During normal operation, the speed of the car 3 has approximately the same value as the normal speed detection pattern, and the number of broken main ropes 4 is zero. Thus, the output portion 114 detects that there is no abnormality in either the speed of the car 3 or the state of the main ropes 4, and normal operation of the elevator continues.

When, for example, the speed of the car 3 abnormally increases and exceeds the first abnormal speed detection pattern 116 (FIG. 19) for some reason, the output portion 114 detects that there is an abnormality in the speed of the car 3. Then, the output portion 114 outputs an actuation signal and a stop signal to the hoisting machine braking device 106 and the control panel 102, respectively. As a result, the hoisting machine 101 is stopped, and the hoisting machine raking device 106 is operated to brake the rotation of the drive sheave 104.

Further, when at least one of the main ropes 4 has broken, the output portion 114 outputs an actuation signal and a stop signal to the hoisting machine braking device 106 and the control panel 102, respectively, thereby braking the rotation of the drive sheave 104.

If the speed of the car 3 continues to increase after the actuation of the hoisting machine braking device 106 and exceeds the second abnormal speed set value 117 (FIG. 19), the output portion 114 outputs an actuation signal to the safety gear 33 while still outputting the actuation signal to the hoisting machine braking device 106. Thus, the safety gear 33 is actuated and the car 3 is braked through the same operation as that of Embodiment 2.

Further, if all the main ropes 4 break after the actuation of the hoisting machine braking device 106, the output portion 114 outputs an actuation signal to the safety gear 33 while still outputting the actuation signal to the hoisting machine braking device 106. Thus, the safety gear 33 is actuated.

With such an elevator apparatus, the monitor device 108 obtains the speed of the car 3 and the state of the main ropes 4 based on the information from the detection means 112 for detecting the state of the elevator. When the monitor device 108 judges that there is an abnormality in the obtained speed of the car 3 or the obtained state of the main ropes 4, the monitor device 108 outputs an actuation signal to at least one of the hoisting machine braking device 106 and the safety gear 33. This means that the number of targets for abnormality detection increases, allowing abnormality detection of not only the speed of the car 3 but also the state of the main ropes 4. Accordingly, an abnormality in the elevator can be detected earlier and more reliably. Therefore, it takes a shorter time for the braking force on the car 3 to be generated after occurrence of an abnormality in the elevator.

It should be noted that in the above-described example, the rope sensor 132 is disposed in the rope fastening device 131 provided to the car 3. However, the rope sensor 132 may be disposed in a rope fastening device provided to the counterweight 107.

Further in the above-described example, the present invention is applied to an elevator apparatus of the type in which the car 3 and the counterweight 107 are suspended in the hoistway 1 by connecting one end portion and the other end portion of the main rope 4 to the car 3 and the counterweight 107, respectively. However, the present invention may also be applied to an elevator apparatus of the type in which the car 3 and the counterweight 107 are suspended in the hoistway 1 by wrapping the main rope 4 around a car suspension sheave and a counterweight suspension sheave, with one end portion and the other end portion of the main rope 4 connected to structures arranged in the hoistway 1. In this case, the rope sensor is disposed in the rope fastening device provided to the structures arranged in the hoistway 1.

Embodiment 14

Figure 25:
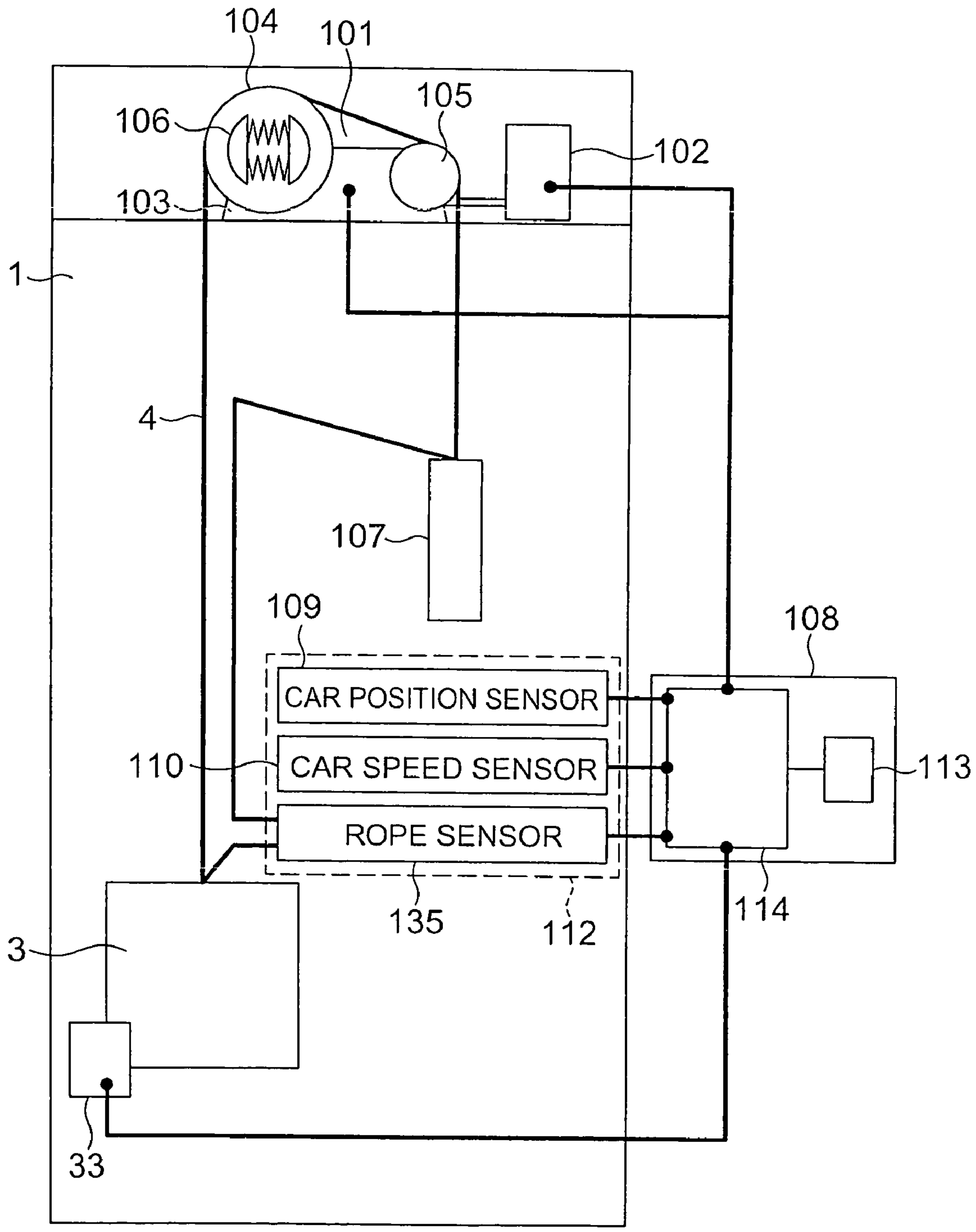
FIG. 25 is a schematic diagram showing an elevator apparatus according to Embodiment 14 of the present invention.

FIG. 25 is a schematic diagram showing an elevator apparatus according to Embodiment 14 of the present invention. In this example, a rope sensor 135 serving as a rope brake detecting portion is constituted by lead wires embedded in each of the main ropes 4. Each of the lead wires extends in the longitudinal direction of the rope 4. Both end portion of each lead wire are electrically connected to the output portion 114. A weak current flows in the lead wires. Cut-off of current flowing in each of the lead wires is input as a rope brake detection signal to the output portion 114.

Otherwise, this embodiment is of the same construction as Embodiment 13.

With such an elevator apparatus, a break in any main rope 4 is detected based on cutting off of current supply to any lead wire embedded in the main ropes 4. Accordingly, whether or not the rope has broken is more reliably detected without being affected by a change of tension of the main ropes 4 due to acceleration and deceleration of the car 3.

Embodiment 15

Figure 26:
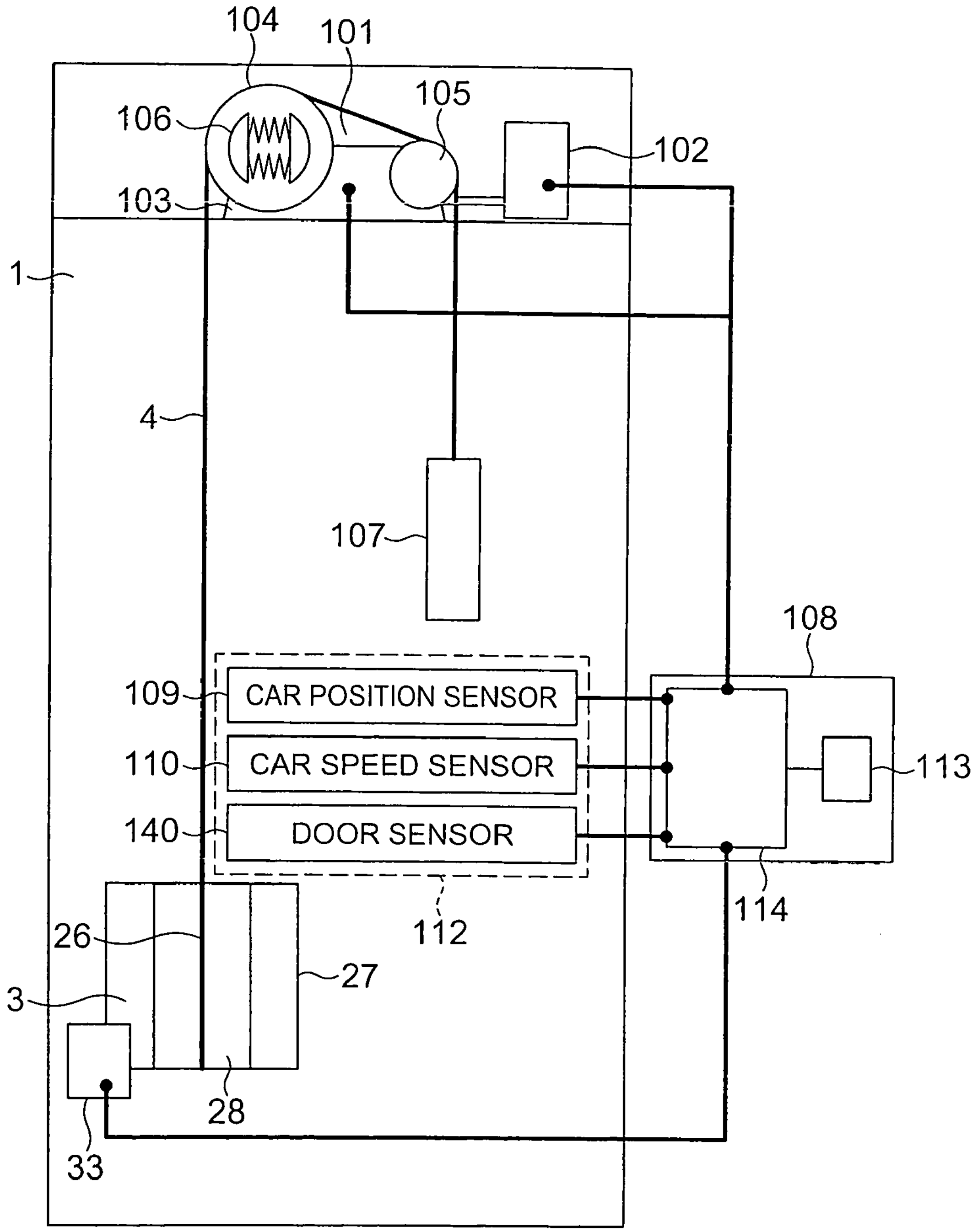
FIG. 26 is a schematic diagram showing an elevator apparatus according to Embodiment 15 of the present invention.

FIG. 26 is a schematic diagram showing an elevator apparatus according to Embodiment 15 of the present invention. In FIG. 26, the car position sensor 109, the car speed sensor 110, and a door sensor 140 are electrically connected to the output portion 114. The door sensor 140 serves as an entrance open/closed detecting portion for detecting open/closed of the car entrance 26. The detection means 112 includes the car position sensor 109, the car speed sensor 110, and the door sensor 140.

The door sensor 140 outputs a door-closed detection signal to the output portion 114 when the car entrance 26 is closed. The memory portion 113 stores the car speed abnormality determination criteria similar to that of Embodiment 11 shown in FIG. 19, and an entrance abnormality determination criteria used as a reference for judging whether or not there is an abnormality in the open/close state of the car entrance 26. If the car ascends/descends while the car entrance 26 is not closed, the entrance abnormality determination criteria regards this as an abnormal state.

The output portion 114 calculates the position of the car 3 based on the input position detection signal. The output portion 114 also calculates the speed of the car 3 and the state of the car entrance 26 based on the input speed detection signal and the input door-closing detection signal, respectively, as a variety of (in this example, two) abnormality determination factors.

The output portion 114 outputs an actuation signal to the hoisting machine braking device 104 if the car ascends/descends while the car entrance 26 is not closed, or if the speed of the car 3 exceeds the first abnormal speed detection pattern 116 (FIG. 19). If the speed of the car 3 exceeds the second abnormal speed detection pattern 117 (FIG. 19), the output portion 114 outputs an actuation signal to the hoisting machine braking device 106 and the safety gear 33.

Figure 27:
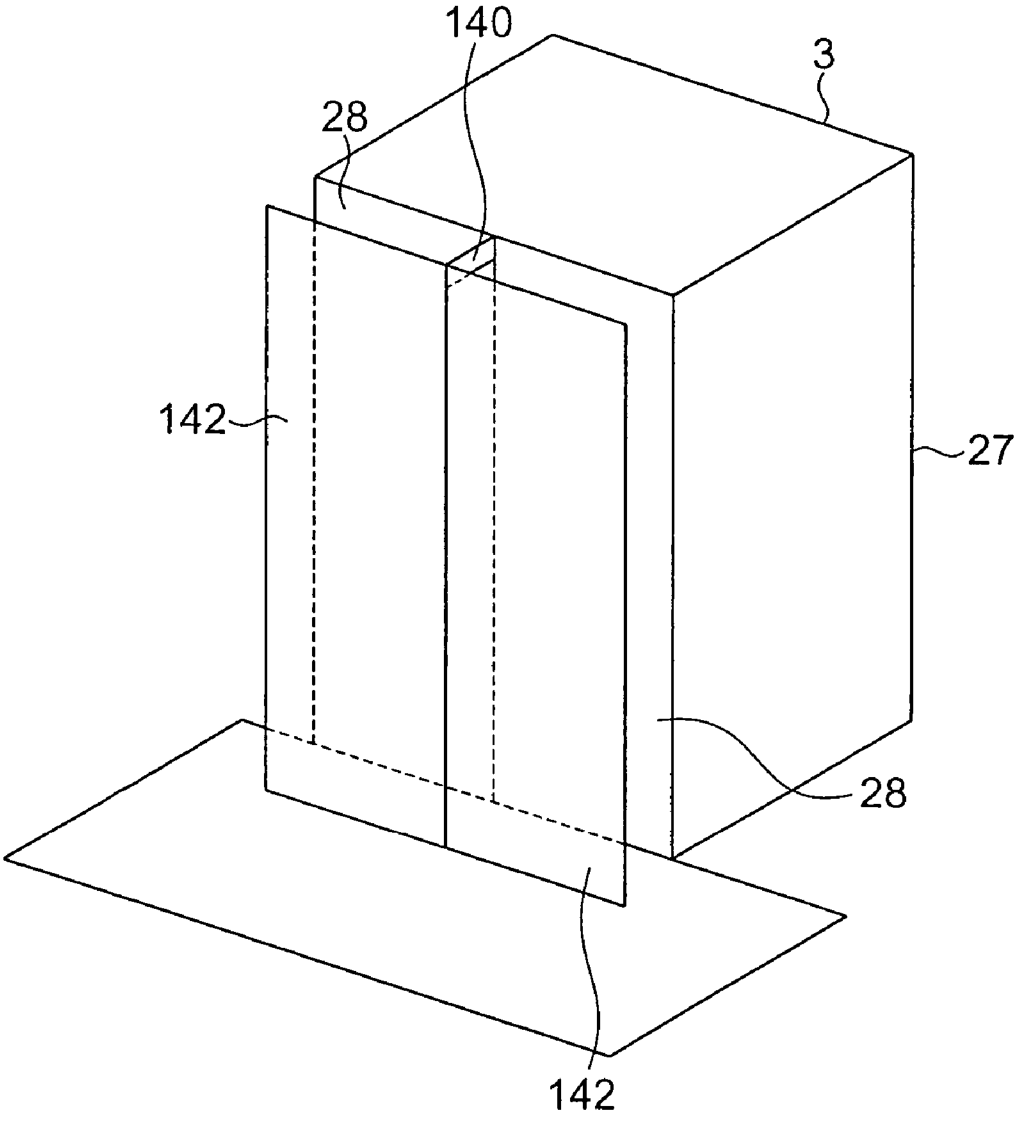
FIG. 27 is a perspective view of the car and the door sensor of FIG. 26.
Figure 28:
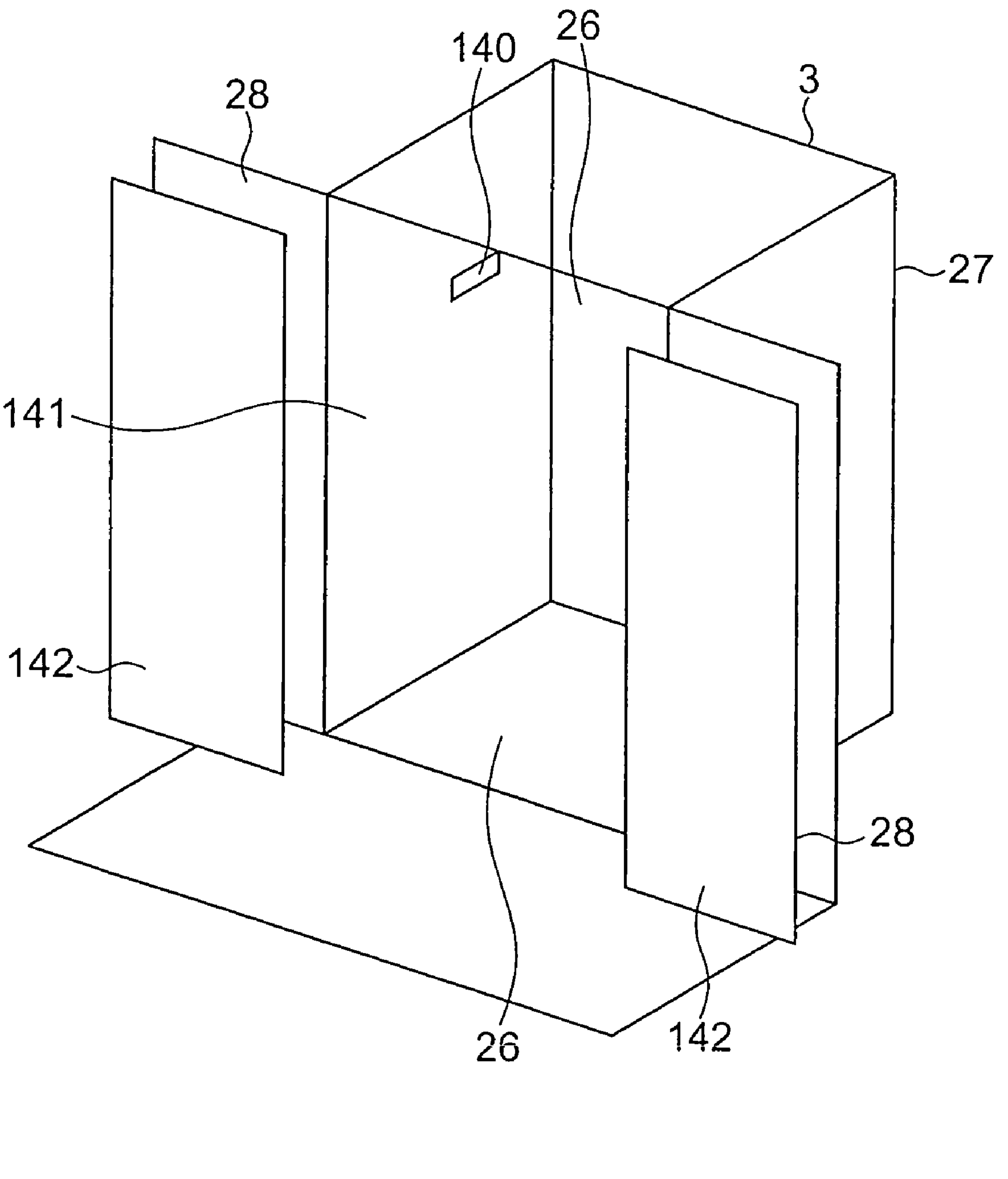
FIG. 28 is a perspective view showing a state in which the car entrance 26 of FIG. 27 is open.

FIG. 27 is a perspective view of the car 3 and the door sensor 140 of FIG. 26. FIG. 28 is a perspective view showing a state in which the car entrance 26 of FIG. 27 is open. In FIGS. 27 and 28, the door sensor 140 is provided at an upper portion of the car entrance 26 and in the center of the car entrance 26 with respect to the width direction of the car 3. The door sensor 140 detects displacement of each of the car doors 28 into the door-closed position, and outputs the door-closed detection signal to the output portion 114.

It should be noted that a contact type sensor, a proximity sensor, or the like may be used for the door sensor 140. The contact type sensor detects closing of the doors through its contact with a fixed portion secured to each of the car doors 28. The proximity sensor detects closing of the doors without contacting the car doors 28. Further, a pair of hall doors 142 for opening/closing a hall entrance 141 are provided at the hall entrance 141. The hall doors 142 are engaged to the car doors 28 by means of an engagement device (not shown) when the car 3 rests at a hall floor, and are displaced together with the car doors 28.

Otherwise, this embodiment is of the same construction as Embodiment 11.

Next, operation is described. When the position detection signal, the speed detection signal, and the door-closed detection signal are input to the output portion 114 from the car position sensor 109, the car speed sensor 110, and the door sensor 140, respectively, the output portion 114 calculates the position of the car 3, the speed of the car 3, and the state of the car entrance 26 based on the respective detection signals thus input. After that, the output portion 114 compares the car speed abnormality determination criteria and the drive device state abnormality determination criteria obtained from the memory portion 113 with the speed of the car 3 and the state of the car of the car doors 28 calculated based on the respective detection signals input. Through this comparison, the output portion 114 detects whether or not there is an abnormality in each of the speed of the car 3 and the state of the car entrance 26.

During normal operation, the speed of the car 3 has approximately the same value as the normal speed detection pattern, and the car entrance 26 is closed while the car 3 ascends/descends. Thus, the output portion 114 detects that there is no abnormality in each of the speed of the car 3 and the state of the car entrance 26, and normal operation of the elevator continues.

When, for instance, the speed of the car 3 abnormally increases and exceeds the first abnormal speed detection pattern 116 (FIG. 19) for some reason, the output portion 114 detects that there is an abnormality in the speed of the car 3. Then, the output portion 114 outputs an actuation signal and a stop signal to the hoisting machine braking device 106 and the control panel 102, respectively. As a result, the hoisting machine 101 is stopped, and the hoisting machine braking device 106 is actuated to brake the rotation of the drive sheave 104.

Further, the output portion 114 also detects an abnormality in the car entrance 26 when the car 3 ascends/descends while the car entrance 26 is not closed. Then, the output portion 114 outputs an actuation signal and a stop signal to the hoisting machine braking device 106 and the control panel 102, respectively, thereby braking the rotation of the drive sheave 104.

When the speed of the car 3 continues to increase after the actuation of the hoisting machine braking device 106, and exceeds the second abnormal speed set value 117 (FIG. 19), the output portion 114 outputs an actuation signal to the safety gear 33 while still outputting the actuation signal to the hoisting machine braking device 106. Thus, the safety gear 33 is actuated and the car 3 is braked through the same operation as that of Embodiment 2.

With such an elevator apparatus, the monitor device 108 obtains the speed of the car 3 and the state of the car entrance 26 based on the information from the detection means 112 for detecting the state of the elevator. When the monitor device 108 judges that there is an abnormality in the obtained speed of the car 3 or the obtained state of the car entrance 26, the monitor device 108 outputs an actuation signal to at least one of the hoisting machine braking device 106 and the safety gear 33. This means that the number of targets for abnormality detection increases, allowing abnormality detection of not only the speed of the car 3 but also the state of the car entrance 26. Accordingly, abnormalities of the elevator can be detected earlier and more reliably. Therefore, it takes less time for the braking force on the car 3 to be generated after occurrence of an abnormality in the elevator.

It should be noted that while in the above-described example, the door sensor 140 only detects the state of the car entrance 26, the door sensor 140 may detect both the state of the car entrance 26 and the state of the elevator hall entrance 141. In this case, the door sensor 140 detects displacement of the elevator hall doors 142 into the door-closed position, as well as displacement of the car doors 28 into the door-closed position. With this construction, abnormality in the elevator can be detected even when only the car doors 28 are displaced due to a problem with the engagement device or the like that engages the car doors 28 and the elevator hall doors 142 with each other.

Embodiment 16

Figure 29:
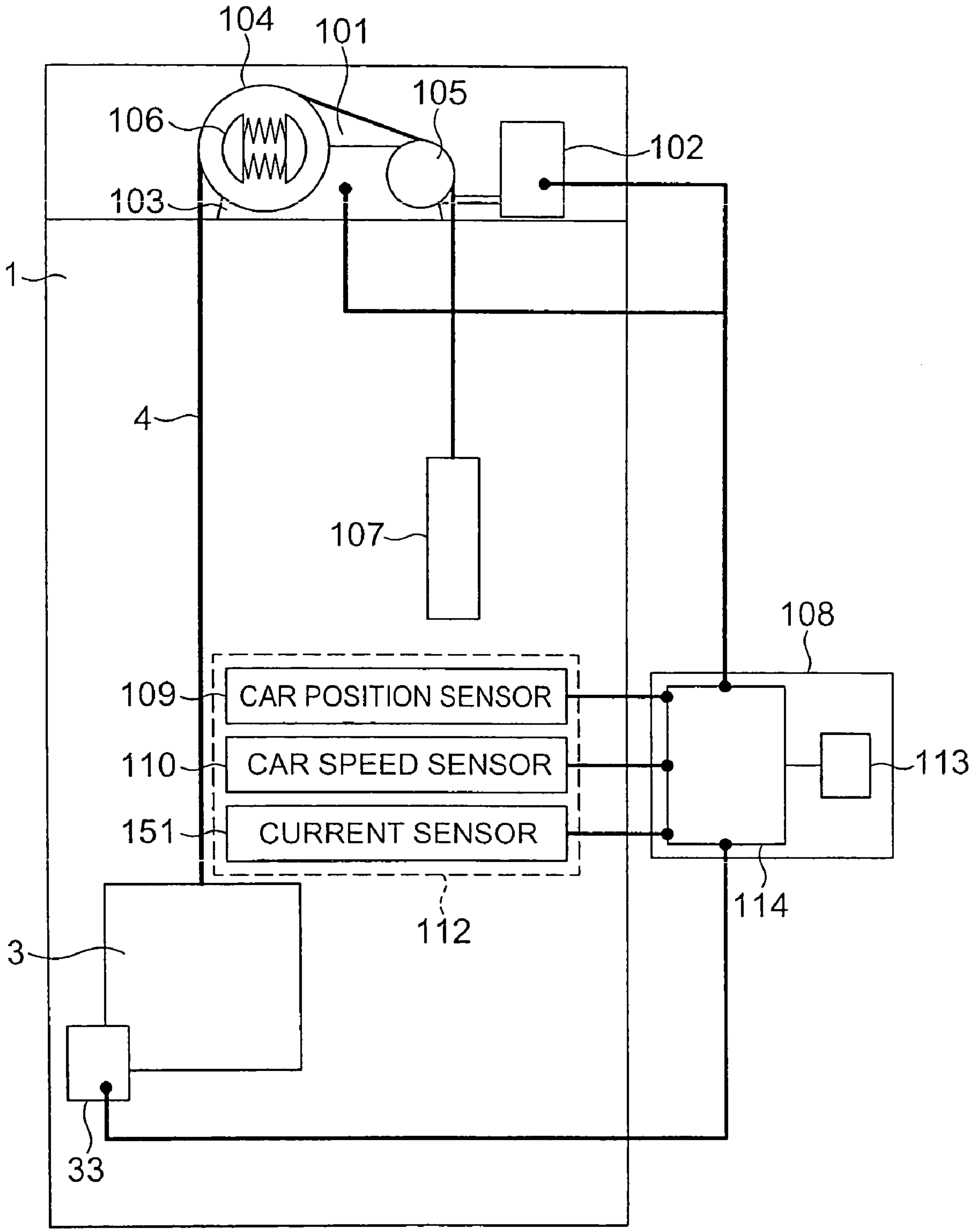
FIG. 29 is a schematic diagram showing an elevator apparatus according to Embodiment 16 of the present invention.
Figure 30:
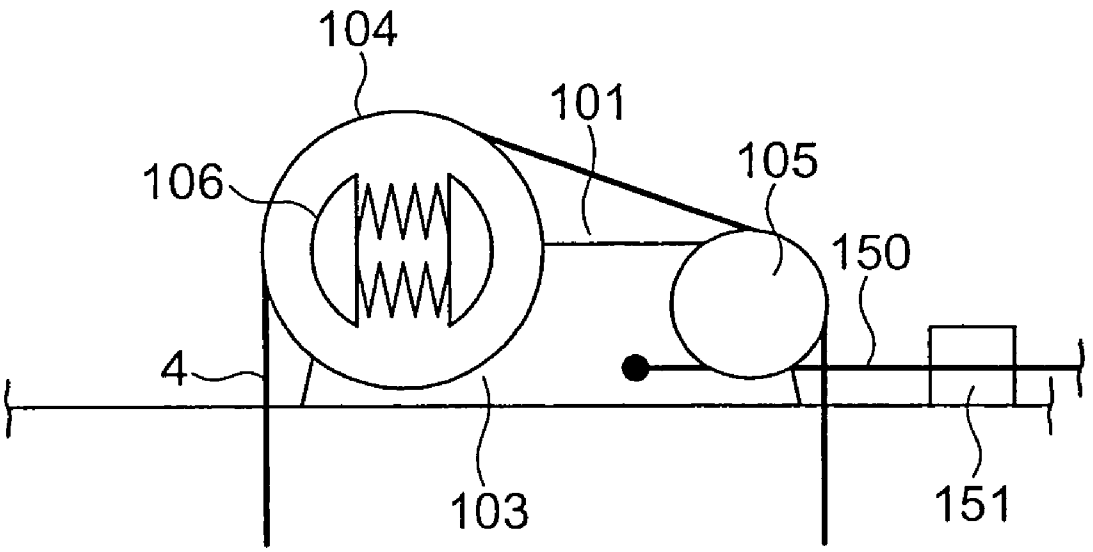
FIG. 30 is a diagram showing an upper portion of the hoistway of FIG. 29.

FIG. 29 is a schematic diagram showing an elevator apparatus according to Embodiment 16 of the present invention. FIG. 30 is a diagram showing an upper portion of the hoistway 1 of FIG. 29. In FIGS. 29 and 30, a power supply cable 150 is electrically connected to the hoisting machine 110. Drive power is supplied to the hoisting machine 101 via the power supply cable 150 through control of the control panel 102.

A current sensor 151 serving as a drive device detection portion is provided to the power supply cable 150. The current sensor 151 detects the state of the hoisting machine 101 by measuring the current flowing in the power supply cable 150. The current sensor 151 outputs to the output portion 114 a current detection signal (drive device state detection signal) corresponding to the value of a current in the power supply cable 150. The current sensor 151 is provided in the upper portion of the hoistway 1. A current transformer (CT) that measures an induction current generated in accordance with the amount of current flowing in the power supply cable 150 is used as the current sensor 151, for example.

The car position sensor 109, the car speed sensor 110, and the current sensor 151 are electrically connected to the output portion 114. The detection means 112 includes the car position sensor 109, the car speed sensor 110, and the current sensor 151.

The memory portion 113 stores the car speed abnormality determination criteria similar to that of Embodiment 11 shown in FIG. 19, and a drive device abnormality determination criteria used as a reference for determining whether or not there is an abnormality in the state of the hoisting machine 101.

The drive device abnormality determination criteria has three detection patterns. That is, a normal level that is the current value flowing in the power supply cable 150 during normal operation, a first abnormal level having a larger value than the normal level, and a second abnormal level having a larger value than the first abnormal level, are set for the drive device abnormality determination criteria.

The output portion 114 calculates the position of the car 3 based on the input position detection signal. The output portion 114 also calculates the speed of the car 3 and the state of the hoisting device 101 based on the input speed detection signal and the input current detection signal, respectively, as a variety of (in this example, two) abnormality determination factors.

The output portion 114 outputs an actuation signal (trigger signal) to the hoisting machine braking device 106 when the speed of the car 3 exceeds the first abnormal speed detection pattern 116 (FIG. 19), or when the amount of the current flowing in the power supply cable 150 exceeds the value of the first abnormal level of the drive device abnormality determination criteria. When the speed of the car 3 exceeds the second abnormal speed detection pattern 117 (FIG. 19), or when the amount of the current flowing in the power supply cable 150 exceeds the value of the second abnormal level of the drive device abnormality determination criteria, the output portion 114 outputs an actuation signal to the hoisting machine braking device 106 and the safety gear 33. That is, the output portion 114 determines to which braking means it should output the actuation signals according to the degree of abnormality in each of the speed of the car 3 and the state of the hoisting machine 101.

Otherwise, this embodiment is of the same construction as embodiment 11.

Next, operation is described. When the position detection signal, the speed detection signal, and the current detection signal are input to the output portion 114 from the car position sensor 109, the car speed sensor 110, and the current sensor 151, respectively, the output portion 114 calculates the position of the car 3, the speed of the car 3, and the amount of current flowing in the power supply cable 151 based on the respective detection signals thus input. After that, the output portion 114 compares the car speed abnormality determination criteria and the drive device state abnormality determination criteria obtained from the memory portion 113 with the speed of the car 3 and the amount of the current flowing into the current supply cable 150 calculated based on the respective detection signals input. Through this comparison, the output portion 114 detects whether or not there is an abnormality in each of the speed of the car 3 and the state of the hoisting machine 101.

During normal operation, the speed of the car 3 has approximately the same value as the normal speed detection pattern 115 (FIG. 19), and the amount of current flowing in the power supply cable 150 is at the normal level. Thus, the output portion 114 detects that there is no abnormality in each of the speed of the car 3 and the state of the hoisting machine 101, and normal operation of the elevator continues.

If, for instance, the speed of the car 3 abnormally increases and exceeds the first abnormal speed detection pattern 116 (FIG. 19) for some reason, the output portion 114 detects that there is an abnormality in the speed of the car 3. Then, the output portion 114 outputs an actuation signal and a stop signal to the hoisting machine braking device 106 and the control panel 102, respectively. As a result, the hoisting machine 101 is stopped, and the hoisting machine braking device 106 is actuated to brake the rotation of the drive sheave 104.

If the amount of current flowing in the power supply cable 150 exceeds the first abnormal level in the drive device state abnormality determination criteria, the output portion 114 outputs an actuation signal and a stop signal to the hoisting machine braking device 106 and the control panel 102, respectively, thereby braking the rotation of the drive sheave 104.

When the speed of the car 3 continues to increase after the actuation of the hoisting machine braking device 106, and exceeds the second abnormal speed set value 117 (FIG. 19), the output portion 114 outputs an actuation signal to the safety gear 33 while still outputting the actuation signal to the hoisting machine braking device 106. Thus, the safety gear 33 is actuated and the car 3 is braked through the same operation as that of Embodiment 2.

When the amount of current flowing in the power supply cable 150 exceeds the second abnormal level of the drive device state abnormality determination criteria after the actuation of the hoisting machine braking device 106, the output portion 114 outputs an actuation signal to the safety gear 33 while still outputting the actuation signal to the hoisting machine braking device 106. Thus, the safety gear 33 is actuated.

With such an elevator apparatus, the monitor device 108 obtains the speed of the car 3 and the state of the hoisting machine 101 based on the information from the detection means 112 for detecting the state of the elevator. When the monitor device 108 judges that there is an abnormality in the obtained speed of the car 3 or the state of the hoisting machine 101, the monitor device 108 outputs an actuation signal to at least one of the hoisting machine braking device 106 and the safety gear 33. This means that the number of targets for abnormality detection increases, and it takes a shorter time for the braking force on the car 3 to be generated after occurrence of an abnormality in the elevator.

It should be noted that in the above-described example, the state of the hoisting machine 101 is detected using the current sensor 151 for measuring the amount of the current flowing in the power supply cable 150. However the state of the hoisting machine 101 may be detected using a temperature sensor for measuring the temperature of the hoisting machine 101.

Further, in Embodiments 11 through 16 described above, the output portion 114 outputs an actuation signal to the hoisting machine braking device 106 before outputting an actuation signal to the safety gear 33. However, the output portion 114 may instead output an actuation signal to one of the following brakes: a car brake for braking the car 3 by gripping the car guide rail 2, which is mounted on the car 3 independently of the safety gear 33; a counterweight brake mounted on the counterweight 107 for braking the counterweight 107 by gripping a counterweight guide rail for guiding the counter weight 107; and a rope brake mounted in the hoistway 1 for braking the main ropes 4 by locking up the main ropes 4.

Further, in Embodiments 1 through 16 described above, the electric cable is used as the transmitting means for supplying power from the output portion to the safety gear. However, a wireless communication device having a transmitter provided at the output portion and a receiver provided at the safety gear may be used instead. Alternatively, an optical fiber cable that transmits an optical signal may be used.

Further, in Embodiments 1 through 16, the safety gear applies braking with respect to overspeed (motion) of the car in the downward direction. However, the safety gear may apply braking with respect to overspeed (motion) of the car in the upward direction by using the safety gear fixed upside down to the car.

Embodiment 17

Next, reference will be made to FIG. 31, which is a block diagram showing an elevator control apparatus according to Embodiment 17 of the present invention. The elevator control apparatus according to Embodiment 17 of the present invention is constituted by a computer (microcomputer).

Figure 31:
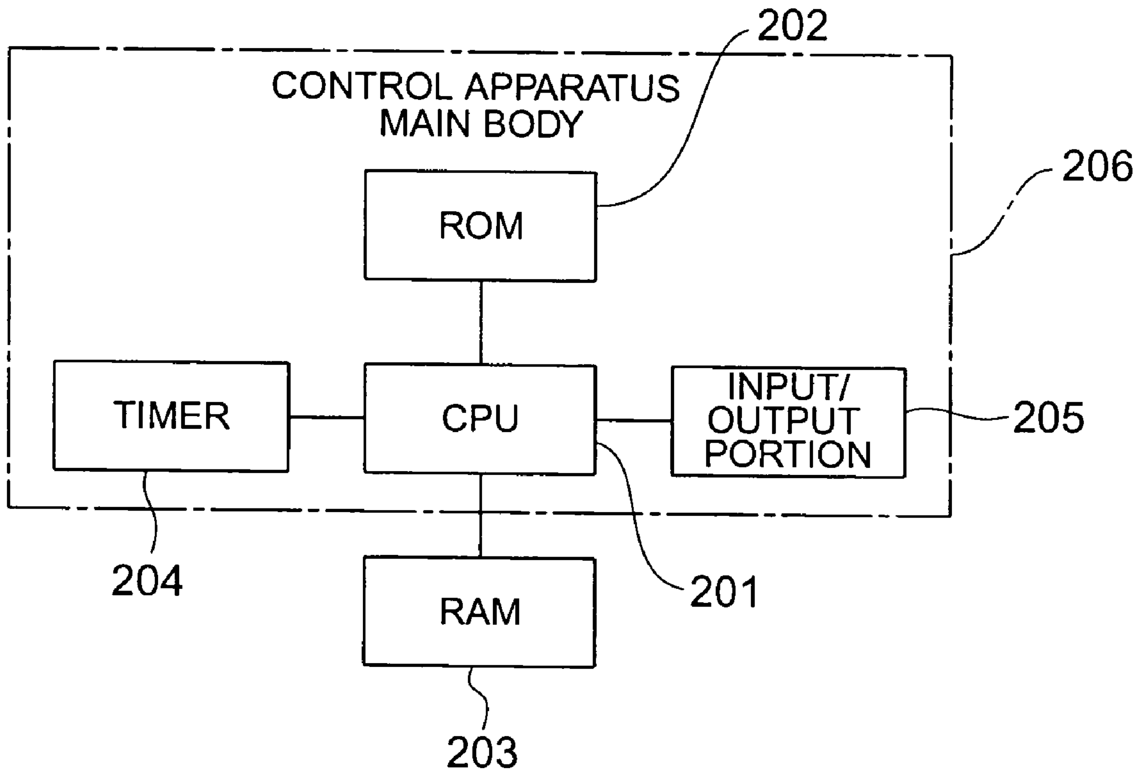
FIG. 31 is a block diagram showing an elevator control apparatus according to Embodiment 17 of the present invention.

Referring to FIG. 31, a ROM 202 as a program storage portion, a RAM 203, a timer 204, and an input/output portion 205 are connected to a CPU 201 as a processing portion. A program concerning the control for operating an elevator and the like are stored in the ROM 202.

The CPU 201 performs a plurality of calculation processings based on the program stored in the ROM 202. The RAM 203 is designed such that information can be written thereinto and read therefrom through the CPU 201.

The operation of the elevator is controlled according to a timer interrupt control method in which an interrupt calculation (a program composed of a combination of a plurality of calculation processings) is carried out within a preset calculation cycle (program execution cycle) time (e.g., 50 milliseconds). The interrupt cycle time is calculated from a signal output from the timer 204.

Pieces of information required for the control for operating the elevator are input to the input/output portion 205. Those pieces of information are transmitted from, for example, the variety of the sensors (the detecting portions) as described in Embodiments 1 to 16 of the present invention, the car interior button device, the hall button device, and the like. A command signal calculated and generated by the CPU 201 is output to the drive device, the braking device, the safety gear, the door device, the announcing device, the car interior button device, the hall button device, and the like via the input/output portion 205.

A control apparatus main body 206 according to Embodiment 17 of the present invention includes the CPU 201, the ROM 202, the timer 204, and the input/output portion 205. When calculation processings are performed, the control apparatus main body 206 writes pieces of processed information corresponding to the respective calculation processings into the RAM 203, and monitors whether or not a sequence of the performance of the calculation processings is normal by reference to a pattern of the pieces of the processed information written into the RAM 203.

The writing of the pieces of the processed information and the confirmation of the pattern thereof are carried out as part of an interrupt calculation processing. In other words, programs for writing the pieces of the processed information and confirming the pattern thereof are stored in the ROM 202 as part of the program for controlling the operation of the elevator. Accordingly, the pattern of the pieces of the processed information is confirmed every time the cycle of the interrupt calculation elapses.

Figure 32:
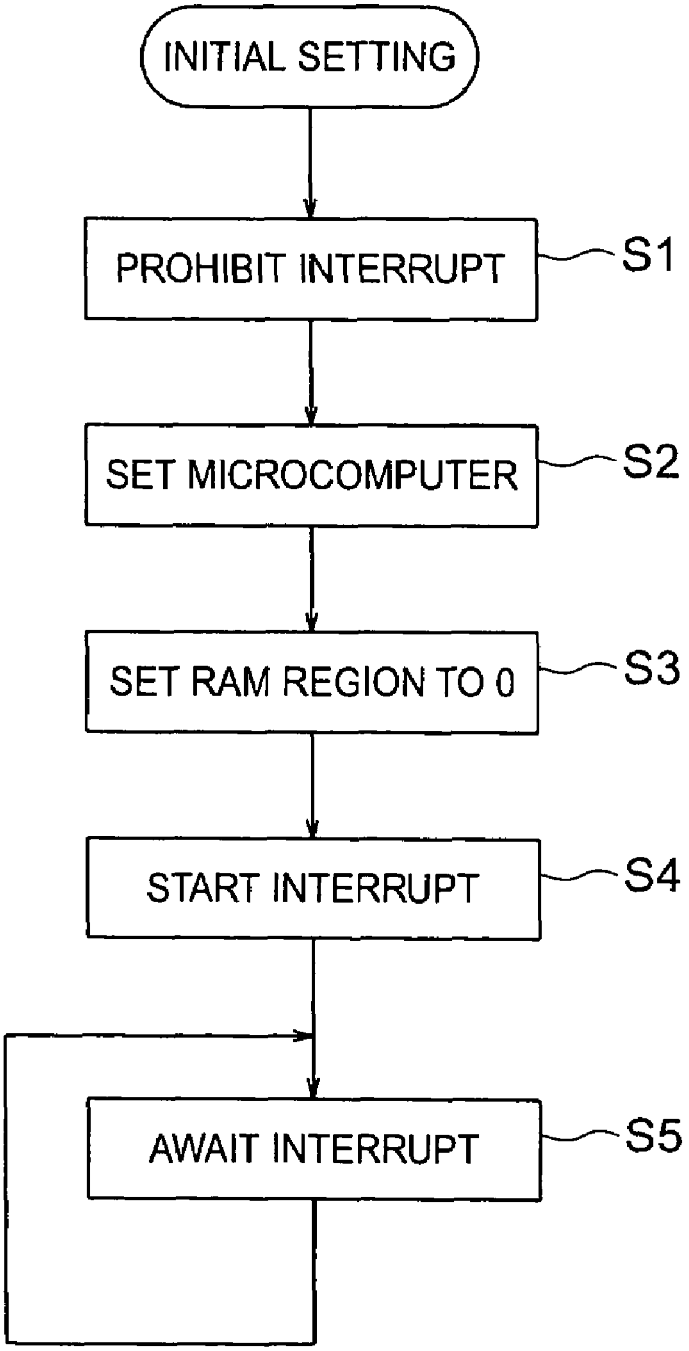
FIG. 32 is a flowchart showing an initial operation of the elevator control apparatus of FIG. 31.

FIG. 32 is a flowchart showing an initial operation of the elevator control apparatus of FIG. 31. An initial setting of the elevator control apparatus is carried out when the elevator is activated. All interrupt calculations are prohibited at a time point when the initial setting is started (step S1). After that, an initial setting of the microcomputer is carried out (step S2), and a RAM region is set to 0 (step S3). After that, an interrupt calculation is allowed to be carried out (step S4), and an interrupt awaiting state is established (step S5). The interrupt calculation is repeatedly carried out every time a calculation cycle time elapses.

Figure 33:
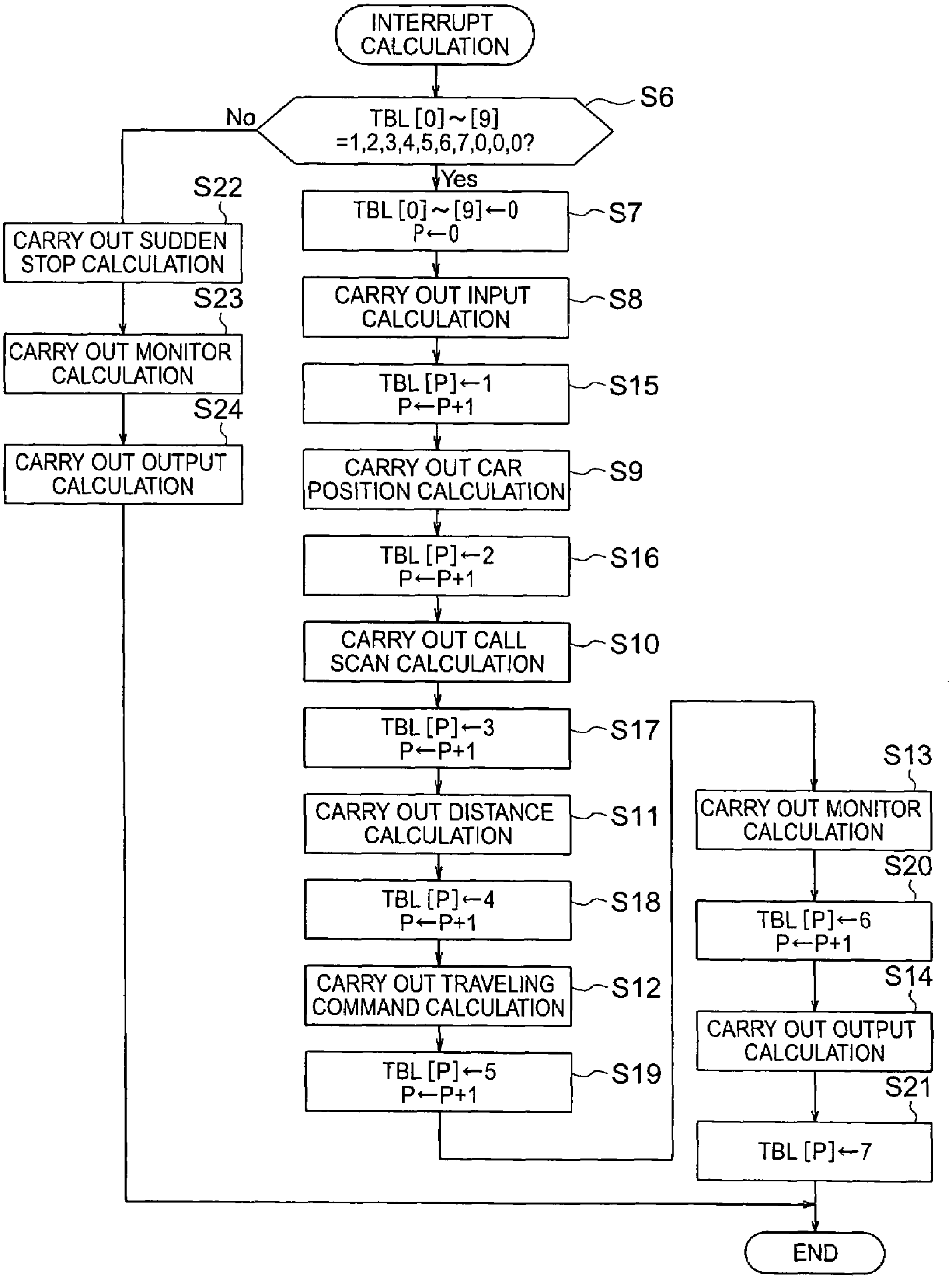
FIG. 33 is a flowchart showing a flow of an interrupt calculation in the elevator control apparatus of FIG. 31.

FIG. 33 is a flowchart showing a flow of an interrupt calculation in the elevator control apparatus of FIG. 31. When the interrupt calculation is started, a pattern of processed information written into the RAM 203 is first confirmed (step S6). In this case, a numerical value (an identification value) preset for each task (each functional unit) of a calculation processing is used as the processed information. The processed information is written into tables set within a predetermined region in the RAM 203.

FIG. 34 is an explanatory diagram showing a normal pattern of the processed information written into the RAM 203 of FIG. 31. In this example, identification values 1 to 7, which are allocated to seven calculation processings, are written into corresponding TBL's [0] to [6], respectively. TBL's [7] to [9] have no corresponding calculation processing and thus remain 0.

When the pattern of the processed information is normal, the TBL's [0] to [9] and storage pointers of the tables are initialized to 0 as shown in FIG. 35 (step S7). After that, an input calculation for inputting a signal required for a calculation (step S8), a car position calculation for calculating a current position of the car (step S9), a call scan calculation (step S10) for detecting whether or not there is a call registration, a distance calculation (step S11) for calculating a distance from the current position of the car to a destination floor, and a traveling command calculation (step S12) for calculating a traveling command for the car based on the distance from the current position of the car to the destination floor are carried out sequentially.

When the traveling command calculation is carried out, a monitor calculation for displaying a state of the elevator on a monitor is carried out (step S13). Finally, an output calculation for outputting a command signal required for causing the car to travel is carried out (step S14).

Immediately after the respective calculations have been carried out, the identification values are written into the corresponding tables respectively (steps S15 to S21). In other words, a processing of making each of the calculations and a processing of writing the identification values into the tables are alternately performed.

To be more specific, immediately after the input calculation as the first calculation has been carried out, 1 is written into TBL [P], and 1 is added to a storage pointer P (step S15). Then, immediately after the car position calculation has been carried out, 2 is written into TBL [P], and 1 is added to the storage pointer P (step S16). Such processings are sequentially performed. Then, immediately after the output calculation as the last calculation has been carried out, 7 is written into TBL [6].

The pattern of the identification values thus written is confirmed when a subsequent interrupt calculation is started (step S6). When the sequence of the performance of the calculation processings is normal, the pattern of the identification values is created as shown in FIG. 34. When the sequence of the performance of the calculation processings is incorrect or when the same calculation processing is repeatedly performed in a single interrupt calculation cycle, the pattern of the identification values becomes different from the one shown in FIG. 34, so the control apparatus main body 206 detects an abnormality.

When an abnormality is detected in the sequence of the performance of the calculation processings, a sudden stop calculation for bringing the car to a sudden stop is carried out (step S22). When the abnormality is detected in the sequence of the performance of the calculation processings, an abnormality detection signal is transmitted to a room for monitoring the elevator. When the sudden stop calculation is carried out, a monitor calculation is carried out (step S23), and an output calculation is carried out (step S24). The interrupt calculation processing is thereby ended.

In the elevator control apparatus configured as described above, an abnormality in the sequence of the performance of calculation processings can be swiftly detected and the calculations pertinent to the control for operating the elevator can thereby be carried out by using the computer more reliably while enhancing overall reliability. Further, a self-looping abnormality ascribable to a program abnormality can also be detected.

The cause of the abnormality in the sequence of the performance of the calculation processings is difficult to fathom, so it takes along time to remedy a malfunction. The abnormality in the sequence of the performance of the calculation processings may result from an abnormality in the microcomputer or the program. However, when neither the microcomputer nor the program is abnormal, the most probable cause is considered to be a failure to end the interrupt calculation within the calculation cycle time (an excess of calculation time).

Although the excess of calculation time does not usually occur, it occurs through a temporary increase in calculation time when, for example, a long time is required for a call scan calculation because a call button is operated many times. The excess of calculation time is also considered to occur through a gradual increase in calculation time resulting from repeated alterations, improvements, and the like of software.

Meanwhile, the elevator control apparatus according to Embodiment 17 of the present invention can detect an abnormality in the sequence of the performance of calculation processings earlier and prevent the occurrence of a secondary malfunction, thereby enhancing overall reliability.

The control apparatus main body 206 confirms the pattern of the processed information every time the preset calculation cycle time elapses, thereby making it possible to constantly monitor the presence or absence of an abnormality and further enhance overall reliability.

In addition, when it is judged that there is an abnormality in the sequence of the performance of the calculation processings, the car is brought to a sudden stop. Therefore, the occurrence of a more serious malfunction can be prevented.

Embodiment 18

Figure 36:
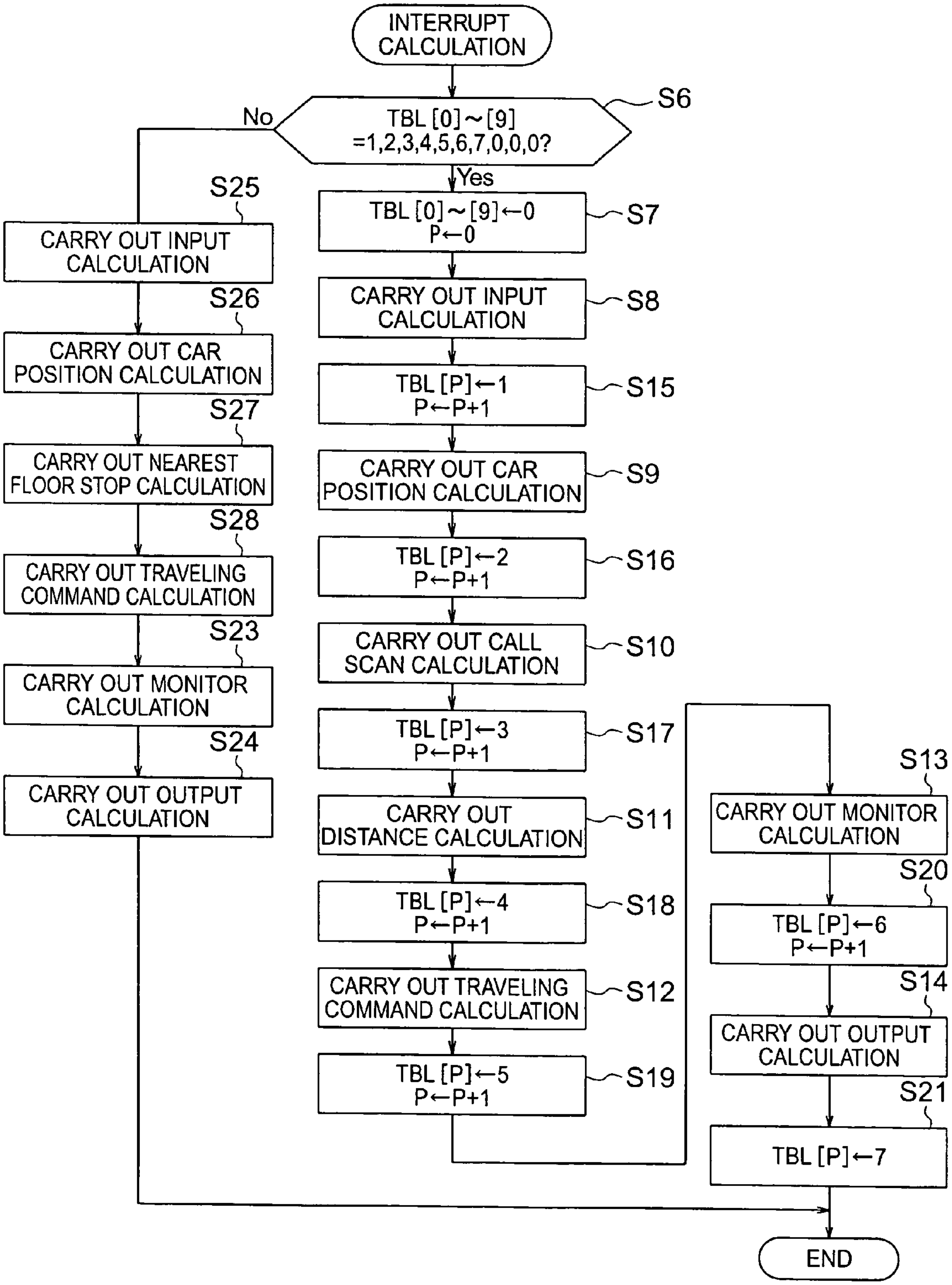
FIG. 36 is a flowchart showing a flow of an interrupt calculation in an elevator control apparatus according to Embodiment 18 of the present invention.

Next, reference will be made to FIG. 36, which is a flowchart showing the flow of an interrupt calculation in an elevator control apparatus according to Embodiment 18 of the present invention. In this example, when the sequence of the performance of calculation processings is normal, the same calculation processings as in Embodiment 17 of the present invention are performed (steps S7 to S21). On the other hand, when it is judged that the sequence of the performance of the calculation processings is abnormal, an input calculation (step S25) and a car position calculation (step S26) are carried out, and then a nearest floor stop calculation for stopping the car at a nearest floor is carried out (step S27).

When the nearest floor stop calculation is carried out, a traveling command calculation (step S28) is carried out to output a command signal required for causing the car to travel to the nearest floor. After that, a monitor calculation (step S23) and an output calculation (step S24) are carried out.

The elevator control apparatus configured as described above can move the car to the nearest floor and then stop it when it is judged that the sequence of the performance of the calculation processings is abnormal, thereby allowing passengers in the car to get off at a hall smoothly.

Embodiment 19

Figure 37:
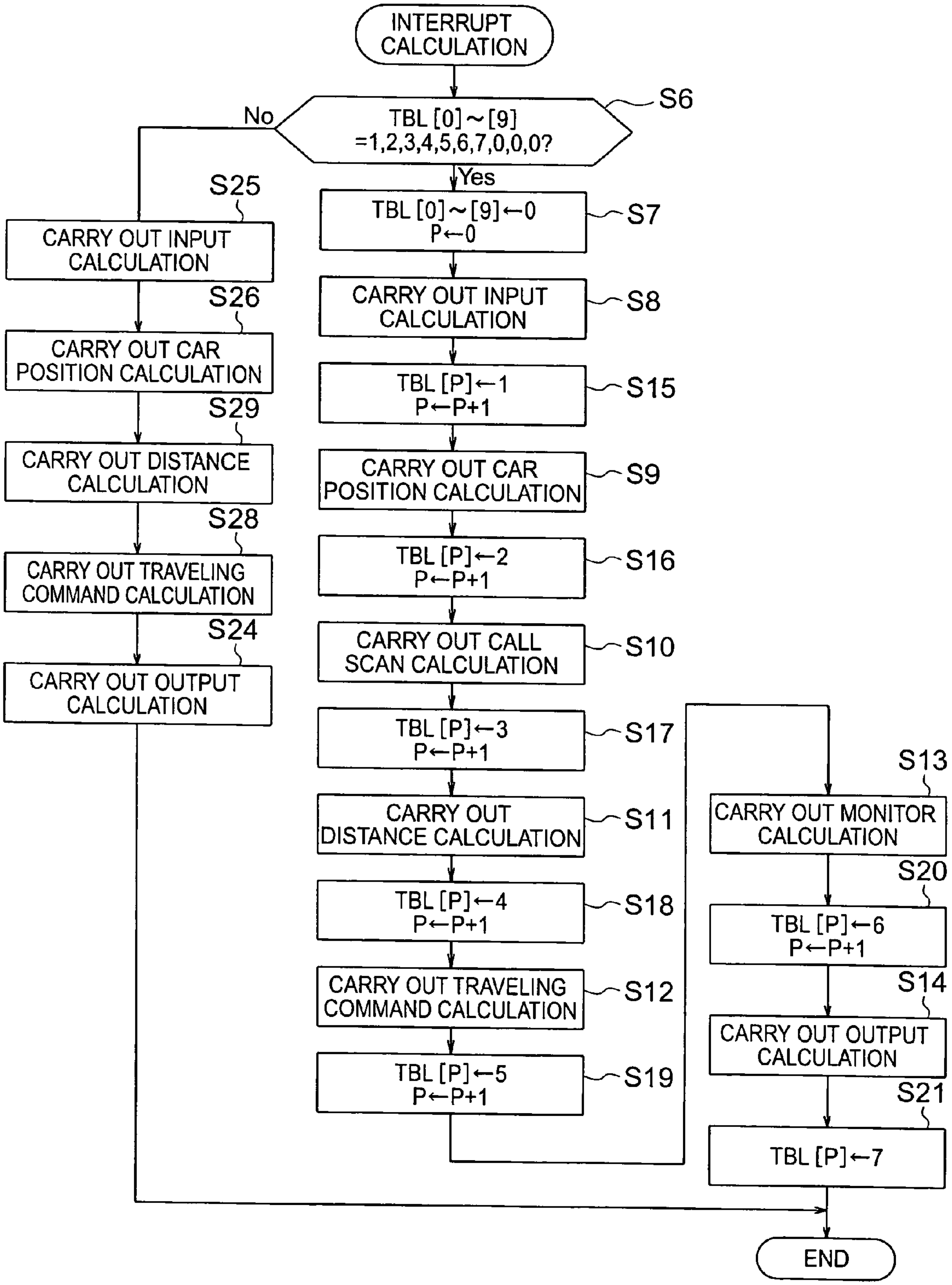
FIG. 37 is a flowchart showing a flow of an interrupt calculation in an elevator control apparatus according to Embodiment 19 of the present invention.

Next, reference will be made to FIG. 37, which is a flowchart showing a flow of an interrupt calculation in an elevator control apparatus according to Embodiment 19 of the present invention. In this example, when the sequence of the performance of calculation processings is normal, the same calculation processings as in Embodiment 17 of the present invention are performed (steps S7 to S21). On the other hand, when it is judged that the sequence of the performance of the calculation processings is abnormal, some of the calculations carried out during normal operation are omitted, and only minimum required ones of the calculations are carried out to continue operation. That is, in this example, while a call scan calculation and a monitor calculation are omitted, an input calculation (step S25), a car position calculation (step S26), a distance calculation (step S29), a traveling command calculation (step S28), and an output calculation (step S24) are carried out.

When no destination floor is determined when an abnormality is detected, the nearest floor is set as a destination floor.

According to the elevator control apparatus configured as described above, when it is judged that the sequence of the performance of the calculation processings is abnormal, the elevator control apparatus can ensure a time for minimum required ones of calculations through omission of some of the calculations and thus continuing operation of the car.

Embodiment 20

Next, reference will be made to FIG. 38, which is a flowchart showing a flow of an interrupt calculation in an elevator control apparatus according to Embodiment 20 of the present invention. In this example, when the sequence of the performance of calculation processings is normal, the same calculation processings as in Embodiment 17 of the present invention are carried out (steps S7 to S21). On the other hand, when it is judged that the sequence of the performance of the calculation processings is abnormal, a sudden stop calculation (step S22) is carried out, and an operational state of the elevator at this moment is recorded as a history (a history calculation) (step S31). The history is recorded in, for example, a preset region in the RAM 203. After the history calculation has been carried out, a monitor calculation (step S23) and an output calculation (step S24) are carried out.

Figure 38:
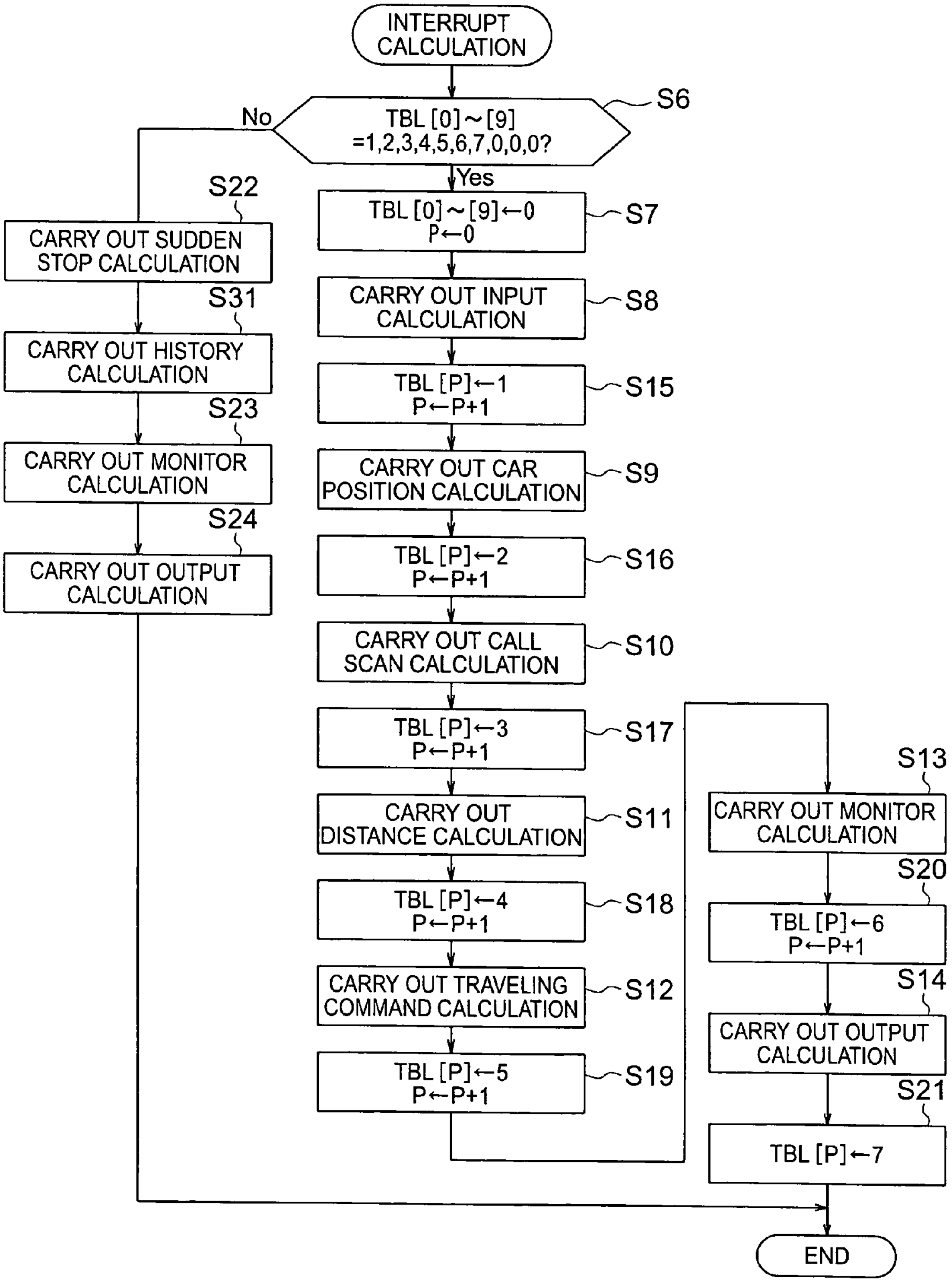
FIG. 38 is a flowchart showing a flow of an interrupt calculation in an elevator control apparatus according to Embodiment 20 of the present invention.
Figure 39:
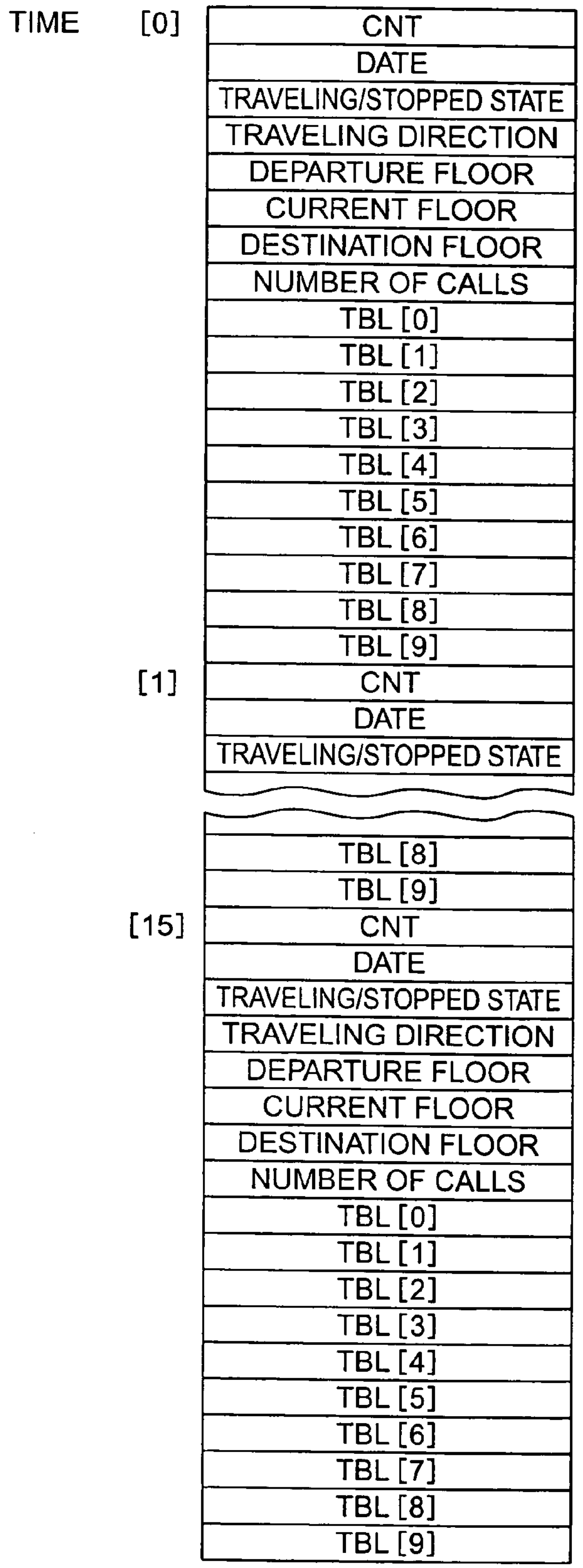
FIG. 39 is an explanatory diagram showing an example of data recorded through a history calculation of FIG. 38.

FIG. 39 is an explanatory diagram showing an example of data recorded through the history calculation of FIG. 38. The operational state of the elevator, which is recorded as the history, includes, for example, a CNT value, a date, a traveling/stopped state, a traveling direction, a departure floor, a current floor, a destination floor, a number of calls, TBL's [0] to [9], and the like. An abnormality occurring once is recorded as a piece of TIME data (history data). In addition, TIME data corresponding to 16 times (TBL's [0] to [15]) are saved. When the number of times of recording the TIME data exceeds 16 times, the latest piece and the oldest piece of the TIME data are saved and erased, respectively.

The CNT value is used to calculate a time point corresponding to the occurrence of an abnormality in the sequence of the calculation processings from a difference between a data value, which is created to be incremented every time an interrupt calculation is carried out, and the CNT value at the time of inspection.

Figure 40:
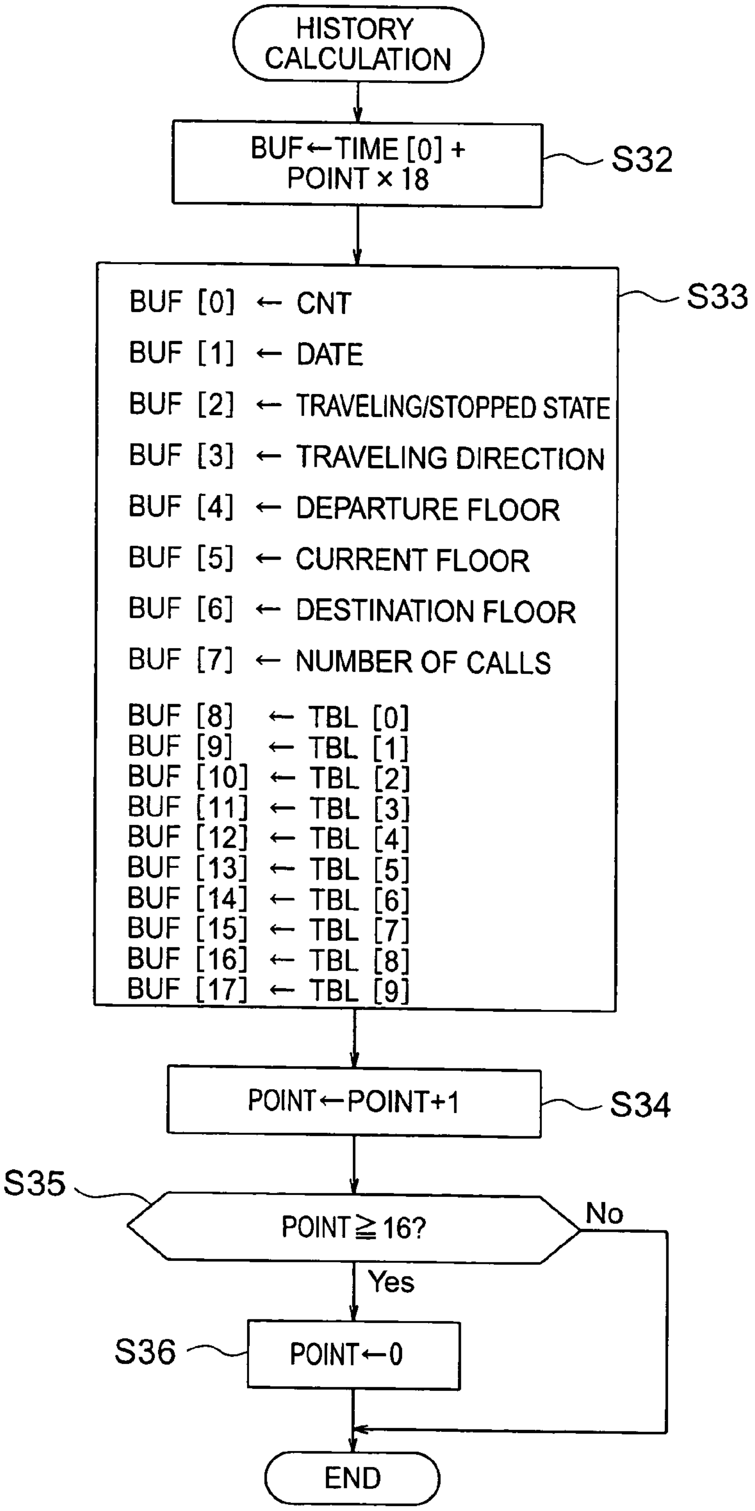
FIG. 40 is a flowchart showing a flow of the history calculation of FIG. 38.

FIG. 40 is a flowchart showing the flow of the history calculation of FIG. 38. In the history calculation, a history storing address is calculated from a POINT and a BUF (step S32), data on an operational state of the elevator are stored (step S33), and then the POINT is updated for a subsequent history (step S34). After that, it is confirmed whether or not the POINT has reached 16 (step S35). When the POINT does not reach 16, the history calculation is ended. When the POINT reaches 36, a POINT for a subsequent history is reset to 0 (step S36). Then, the history calculation is ended.

In the elevator control apparatus configured as described above, the TIME data corresponding to the time point when an abnormality occurs in the sequence of the performance of the calculation processings are saved. Therefore, the TIME data can be used to prevent the occurrence of an abnormality in the control apparatus or fathom a cause of the occurrence of the abnormality by being confirmed during, for example, the maintenance and inspection of the elevator. The time required for remedying a malfunction can also be shortened by confirming the TIME data upon the occurrence of an abnormality.

The history data recorded in the history calculation should not be limited to the above-mentioned examples. However, it is preferable that a combination of at least one piece of the data on a traveling/stopped state of the car, a traveling direction of the car, a departure floor, a current floor, a destination floor, and a number of calls and a pattern of processed information is used as the history data.

Embodiment 21

Figure 41:
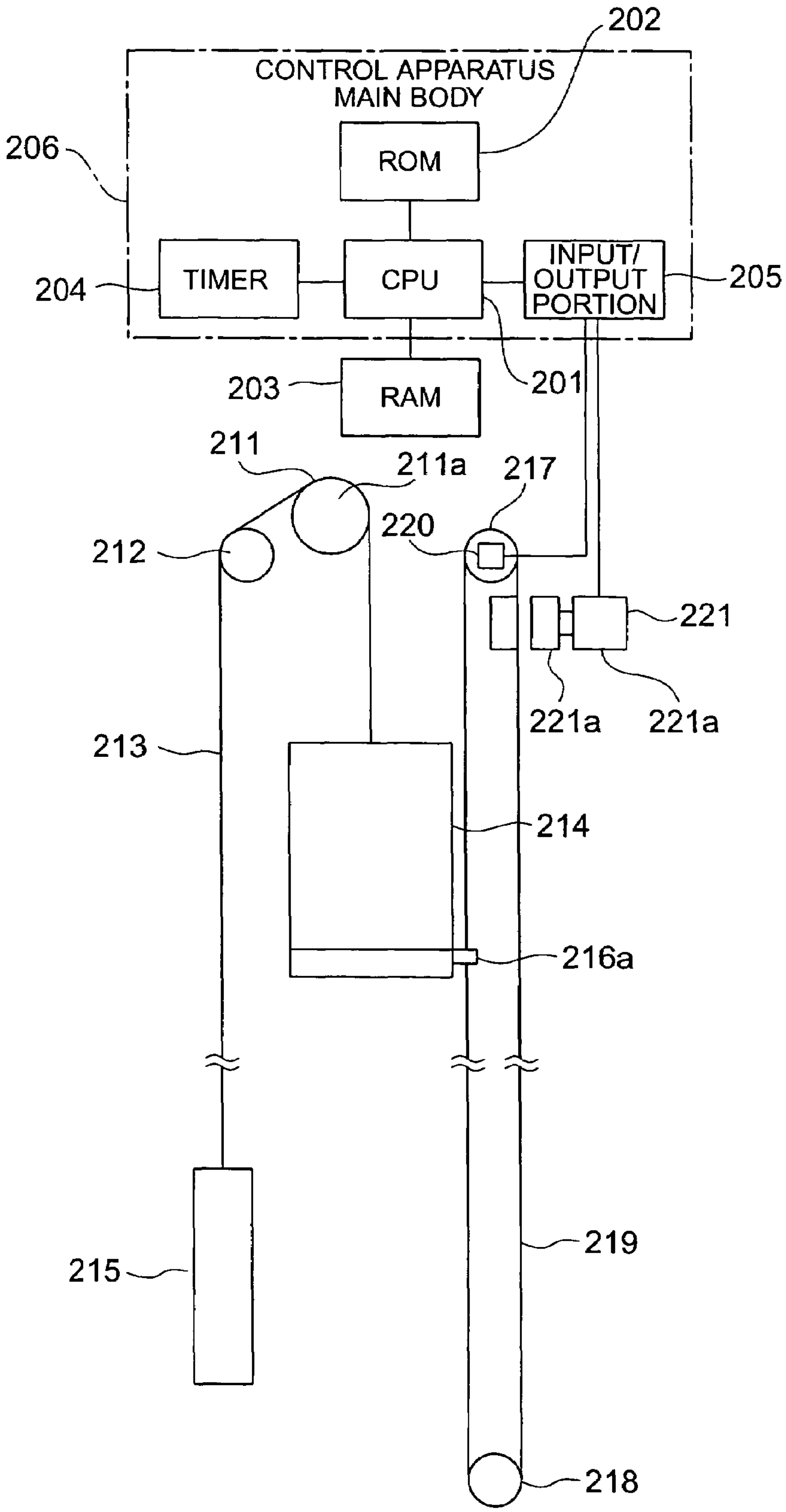
FIG. 41 is a block diagram showing an elevator apparatus according to Embodiment 21 of the present invention.

Next, FIG. 41 is a block diagram showing an elevator apparatus according to Embodiment 21 of the present invention. In the example illustrated in each of Embodiments 17 to 20 of the present invention, the present invention is applied to the elevator control apparatus for controlling the basic operation of the car, namely, the operation control apparatus. In Embodiment 21 of the present invention, on the other hand, the present invention is applied to an elevator control apparatus for detecting an abnormality such as an overspeed to shift an elevator to a safe state, namely, a safety system. The safety system, which can be provided separately from a control panel, may be mounted on, for example, a car.

Referring to the figure, a drive unit (a hoisting machine) 211 and a deflector pulley 212 are provided in an upper portion of a hoistway. A main rope 213 is wound around a drive sheave 211*a* of the drive device 211 and the deflector pulley 212. A car 214 and a counterweight 215 are suspended within the hoistway by using the main rope 213.

A mechanical safety gear 216 for stopping the car 214 as an emergency measure through engagement with a guide rail (not shown) is mounted on a lower portion of the car 214. A speed governor sheave 217 is disposed in an upper portion of a hoistway. A tension pulley 218 is disposed in a lower portion of the hoistway. A speed governor rope 219 is wound around the speed governor sheave 217 and the tension pulley 218. The speed governor rope 219 is connected at both ends thereof to an actuating lever 216*a* of the safety gear 216. Accordingly, the speed governor sheave 217 is rotated at a speed corresponding to a traveling speed of the car 214.

A sensor 220 (e.g., an encoder) for outputting a signal for detecting a position and a speed of the car 214 is provided on the speed governor sheave 217. The signal from the sensor 220 is input to the input/output portion 205.

A speed governor rope gripping device 221 for gripping the speed governor rope 219 to stop circulation thereof is provided in the upper portion of the hoistway. The speed governor rope gripping device 221 has a grip portion 221*a* for gripping the speed governor rope 219, and an electromagnetic actuator 221*b* for driving the grip portion 221*a*.

When a command signal from the input/output portion 205 is input to the speed governor rope gripping device 221, the grip portion 221*a* is displaced due to a driving force of the electromagnetic actuator 221*b*, so the speed governor rope 219 is stopped from moving. When the speed governor rope 219 is stopped, the actuating lever 216*a* is operated through a movement of the car 214. As a result, the safety gear 216 operates to stop the car 214.

In the safety system as well, after the same initial operation as in FIG. 32 has been performed, an interrupt awaiting state is established. An interrupt calculation in the safety system is also repeatedly carried out every time a calculation cycle time elapses.

Figure 42:
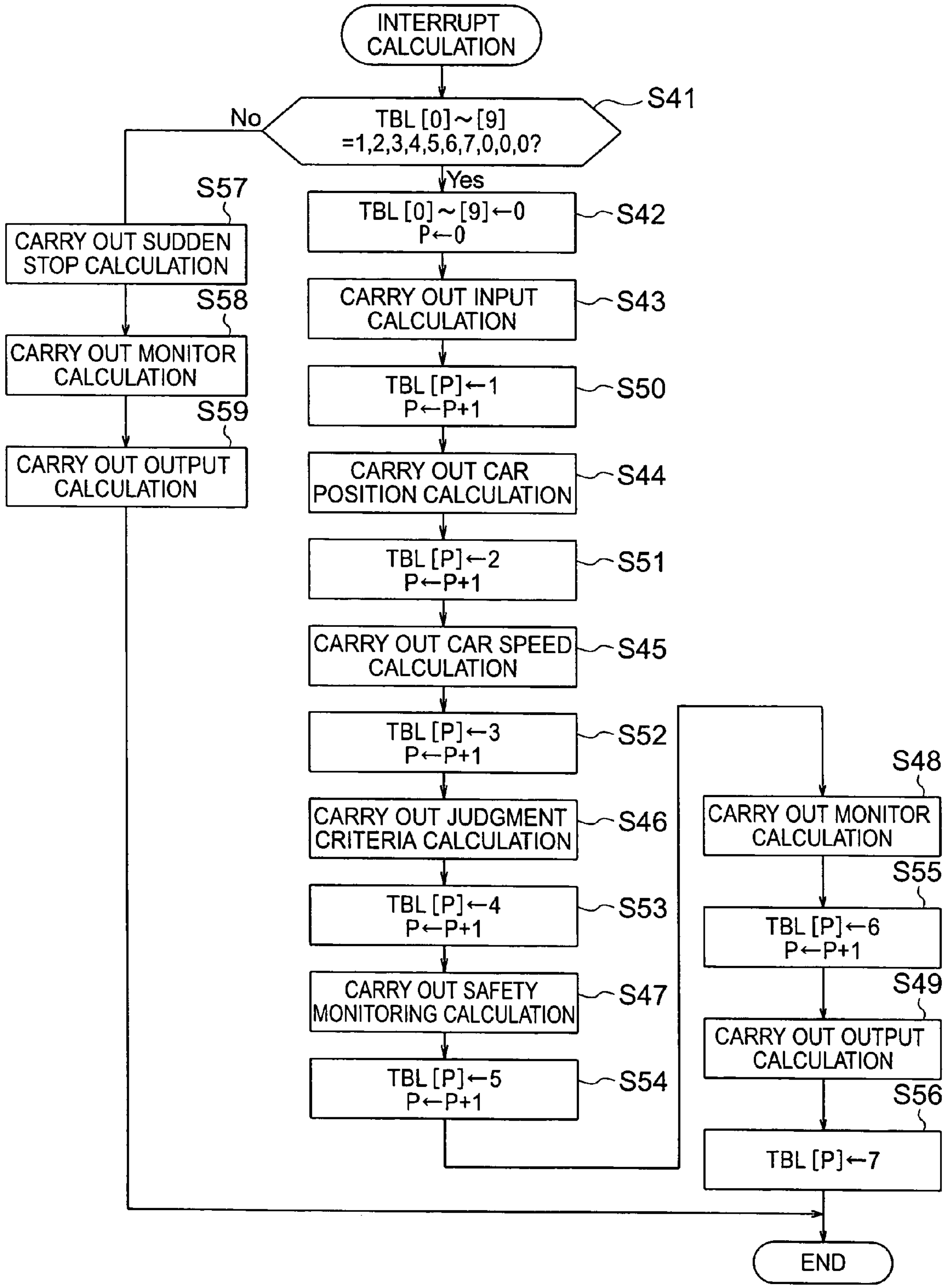
FIG. 42 is a flowchart showing a flow of an interrupt calculation carried out by an elevator control apparatus (safety system) of FIG. 41.

FIG. 42 is a flowchart showing a flow of the interrupt calculation in the elevator control apparatus (the safety system) of FIG. 41. When the interrupt calculation is started, a pattern of processed information written into the RAM 203 is first confirmed (step S41). When the pattern of the processed information is normal, TBL's [0] to [9] and storage pointers of tables are initialized to 0 (step S42). After that, an input calculation (step S43) for inputting a signal required for the calculation, a car position calculation (step S44) for calculating a current position of the car and a distance from the current position of the car to a terminal floor, a car speed calculation (step S45) for calculating a speed of the car from a moving distance of the car, and a judgment criteria calculation (step S46) for calculating a judgment criterial value (e.g., FIG. 19) of an abnormal speed corresponding to the distance to the terminal floor are carried out.

After that, a safety monitoring calculation for detecting a car speed abnormality from the speed of the car and the criterial value is carried out (step S47). When the safety monitoring calculation or a sudden stop calculation is carried out, a monitor calculation for displaying a state of the elevator on a monitor is carried out (step S48). Finally, an output calculation for outputting a command signal required for allowing the car to travel or bringing the car to a sudden stop is carried out in accordance with a result of the safety monitoring calculation (step S49).

Immediately after the respective calculations have been carried out, the identification values are written into the corresponding tables respectively (steps S50 to S56). In other words, a processing of making each of the calculations and a processing of writing the identification values into the tables are alternately performed.

To be more specific, immediately after the input calculation as the first calculation has been carried out, 1 is written into TBL [P], and 1 is added to a storage pointer P (step S15). Then, immediately after the car position calculation has been carried out, 2 is written into TBL [P], and 1 is added to the storage pointer P (step S16). Such processings are sequentially performed. Then, immediately after the output calculation as the last calculation has been carried out, 7 is written into TBL [6].

The pattern of the identification values thus written is confirmed when a subsequent interrupt calculation is started (step S41). When the sequence of the performance of the calculation processings is normal, the pattern of the identification values is created as shown in FIG. 34. When the sequence of the performance of the calculation processings is incorrect or when the same calculation processing is repeatedly performed in a single interrupt calculation cycle, the pattern of the identification values becomes different from the one shown in FIG. 34, so the control apparatus main body 206 detects an abnormality.

When an abnormality is detected in the sequence of the performance of the calculation processings, a sudden stop calculation for bringing the car to a sudden stop is carried out (step S57). When the abnormality is detected in the sequence of the performance of the calculation processings, an abnormality detection signal is transmitted to a room for monitoring the elevator. When the sudden stop calculation is carried out, a monitor calculation is carried out (step S58), and an output calculation for outputting a command signal required for bringing the car to a sudden stop is carried out (step S59). The interrupt calculation processing is thereby ended.

As described above, also in the safety apparatus which serves as the elevator control apparatus, an abnormality in the sequence of the performance of calculation processings can be swiftly detected and the calculations pertinent to the control for operating the elevator can thereby be carried out by using the computer more reliably while enhancing overall reliability. Further, a self-looping abnormality ascribable to a program abnormality can also be detected. In other words, the present invention can be applied to the operation to the operation control apparatus and the safety apparatus.

In Embodiment 21 of the present invention, a command signal from the safety system is output to the speed governor rope gripping device 221. However, the command signal may be output to the safety gear having the actuator as shown in each of Embodiments 1 to 16 of the present invention.

In Embodiment 17 of the present invention, the speed governor rope gripping device 221 and the mechanical safety gear 216 as shown in Embodiment 21 of the present invention may be combined with each other to bring the car to a sudden stop.

Further, in each of Embodiments 17 to 21 of the present invention, the program for monitoring the sequence of the performance of the calculation processings is stored in the ROM 202. However, this program may also be used as a program stored in a recording medium, for example, a hard disk, a CD, or the like.

Still further, in each of Embodiments 17 to 21 of the present invention, the pieces of the processed information are allocated to all the calculation processings, respectively. However, they are not absolutely required to be allocated to all the calculation processings, respectively. In other words, the pieces of the processed information may be added only to those calculation processings whose sequence of performance is desired to be monitored.

The invention claimed is:

1. An elevator control apparatus comprising:
- a RAM; and
- a control apparatus main body including,
  - a program storage portion configured to store a program concerning operational control of an elevator, and
  - a processing portion configured to perform within an interrupt cycle time a plurality of calculation processings based on the program, and to restart the calculation processings when the interrupt cycle time elapses, at least two of the plurality of calculation processings determining different states of the elevator,
- wherein the program, when executed by the processing portion, causes the control apparatus main body to write pieces of processed information corresponding to the calculation processings, respectively, into the RAM when the calculation processings are performed, and to monitor whether or not a sequence of performance of the calculation processings is normal with reference to a pattern of the pieces of the processed information written into the RAM.

2. The elevator control apparatus according to claim 1, wherein the pieces of the processed information are identification values corresponding to the plurality of calculation processings determining different states of the elevator, respectively.

3. The elevator control apparatus according to claim 1, wherein the control apparatus main body confirms the pattern of the pieces of the processed information every time a predetermined calculation cycle elapses.

4. The elevator control apparatus according to claim 3, wherein the pieces of the processed information are written into the RAM and the pattern of the pieces of the processed information is confirmed as a part of an interrupt calculation processing for controlling operation of the elevator.

5. The elevator control apparatus according to claim 1, wherein the control apparatus main body performs a calculation processing for bringing a car to an unexpected stop when it is determined that there is an abnormality in the sequence of the performance of the calculation processings.

6. The elevator control apparatus according to claim 1, wherein the control apparatus main body performs a calculation processing for stopping a car at a nearest floor when it is determined that there is an abnormality in the sequence of the performance of the calculation processings.

7. The elevator control apparatus according to claim 1, wherein the control apparatus main body omits one or some of calculations to be carried out during normal operation and performs only the other calculations when it is determined that there is an abnormality in the sequence of the performance of the calculation processings.

8. The elevator control apparatus according to claim 1, wherein the control apparatus main body records as a history data an operational state of the elevator at a time when it is determined that there is an abnormality in the sequence of the performance of the calculation processings.

9. The elevator control apparatus according to claim 8, wherein the control apparatus main body performs a calculation processing for saving history data corresponding to a preset number of times.

10. The elevator control apparatus according to claim 8, wherein the history data include data regarding at least one of a traveling/stopped state of a car, a traveling direction of the car, a departure floor, a current floor, a destination floor, and a number of calls, and the pattern of the processed information.

11. A method for controlling an elevator, comprising:
- performing within an interrupt cycle time a plurality of calculation processings, at least two of the plurality of calculation processings determining different states of the elevator;
- writing pieces of processed information corresponding to the calculation processings, respectively, into a memory when the calculation processings are performed;
- monitoring whether or not a sequence of performance of the calculation processings is normal with reference to a pattern of the pieces of the processed information written into the memory;
- transmitting an abnormality detection signal when an abnormality is detected in the monitoring step; and
- restarting the calculation processings when the interrupt cycle time elapses.

12. An elevator control apparatus comprising:
- memory; and
- a control apparatus main body including,
  - a program storage portion configured to store a program, and
  - means for performing within an interrupt cycle time a plurality of calculation processings based on the program, and for restarting the calculation processings when the interrupt cycle time elapses, at least two of the plurality of calculation processings determining different states of the elevator;
- wherein the performing means causes the control apparatus main body to write pieces of processed information corresponding to the calculation processings, respectively, into the memory when the calculation processings are performed, and monitors whether or not a sequence of performance of the calculation processings is normal with reference to a pattern of the pieces of the processed information written into the memory.

* * * * *